United States Patent
Dandurand et al.

(10) Patent No.: US 11,305,829 B2
(45) Date of Patent: Apr. 19, 2022

(54) TRACK SYSTEM FOR TRACTION OF A VEHICLE

(71) Applicant: CAMSO INC., Magog (CA)

(72) Inventors: Jules Dandurand, Sherbrooke (CA); Andy Levesque, Coaticook (CA)

(73) Assignee: CAMSO INC., Magog (CA)

( * ) Notice: Subject to any disclaimer, the term of this patent is extended or adjusted under 35 U.S.C. 154(b) by 739 days.

(21) Appl. No.: 16/046,318

(22) Filed: Jul. 26, 2018

(65) Prior Publication Data

US 2018/0327036 A1 Nov. 15, 2018

Related U.S. Application Data

(63) Continuation-in-part of application No. PCT/CA2017/051567, filed on Dec. 20, 2017.

(Continued)

(51) Int. Cl.
*B62D 55/24* (2006.01)
*B32B 3/30* (2006.01)
(Continued)

(52) U.S. Cl.
CPC ............. *B62D 55/244* (2013.01); *B32B 3/30* (2013.01); *B32B 27/20* (2013.01); *B62D 55/26* (2013.01);
(Continued)

(58) Field of Classification Search
CPC ....... B62D 55/24; B62D 55/244; B62D 55/26
See application file for complete search history.

(56) References Cited

U.S. PATENT DOCUMENTS 2,514,429 A * 7/1950 Waugh ...................... F16G 1/28
474/251
3,480,339 A 11/1969 Kell
(Continued)

FOREIGN PATENT DOCUMENTS

CN 104742992 A 7/2015
JP 04362481 A * 12/1992 ............. B62D 55/26

OTHER PUBLICATIONS

International Search Report dated Mar. 27, 2018 in connection with International Patent Application PCT/CA2017/051567, 4 pages.
(Continued)

*Primary Examiner* — Jason R Bellinger
(74) *Attorney, Agent, or Firm* — Smart & Biggar LLP

(57) ABSTRACT

A track system for traction of a vehicle (e.g., a snowmobile, an all-terrain vehicle (ATV) etc.) including a track and a track-engaging assembly for driving and guiding the track around the track-engaging assembly. The track system has features to enhance its performance. The track may include reinforcing material (e.g., reinforcing polymeric material) that is stronger (e.g., stiffer, harder, and/or more resistant to wear) than elastomeric material of the track, such as to improve rigidity characteristics of the track, reduce noise generated by the track system, improve a resistance to wear of the track, enhance heat management (e.g., improve heat dissipation or reduce heat build-up) within the track, and/or reduce a weight of the track. The reinforcing material may be provided as one or more thin layers constituting at least part (e.g., of a periphery) of one or more components of the track (e.g., a carcass, traction projections, and/or drive/guide lugs).

48 Claims, 47 Drawing Sheets

Related U.S. Application Data

(60) Provisional application No. 62/436,845, filed on Dec. 20, 2016.

(51) Int. Cl.
*B32B 27/20* (2006.01)
*B62D 55/26* (2006.01)
*B62M 27/02* (2006.01)

(52) U.S. Cl.
CPC ......... *B62M 27/02* (2013.01); *B32B 2605/00* (2013.01); *B62M 2027/027* (2013.01)

(56) References Cited

U.S. PATENT DOCUMENTS

| | | | |
|---|---|---|---|
| 5,447,365 A | | 9/1995 | Muramatsu et al. |
| 10,392,060 B2* | | 8/2019 | Dandurand ............ B62D 55/27 |
| 2003/0094854 A1 | | 5/2003 | Rodgers et al. |
| 2005/0103540 A1 | | 5/2005 | Lavoie |
| 2007/0126286 A1 | | 6/2007 | Feldmann et al. |
| 2009/0224598 A1 | | 9/2009 | St-Amant et al. |
| 2018/0118288 A1 | | 5/2018 | Linn et al. |
| 2020/0086935 A1* | | 3/2020 | Dandurand ............ B62M 27/02 |
| 2020/0094895 A1* | | 3/2020 | Dandurand ............ B32B 27/20 |

OTHER PUBLICATIONS

International Written Opinion dated Mar. 27, 2018 in connection with International Patent Application PCT/CA2017/051567, 6 pages.

\* cited by examiner

TRACK SYSTEM FOR TRACTION OF A VEHICLE

CROSS-REFERENCE TO RELATED APPLICATIONS

This application is a continuation-in-part of International Application PCT/CA2017/051567 filed on Dec. 20, 2017 and claiming priority from U.S. Provisional Patent Application No. 62/436,845 filed on Dec. 20, 2016, all of which are hereby incorporated by reference herein.

FIELD

The invention relates generally to track systems for traction of vehicles such as snowmobiles, all-terrain vehicles (ATVs), and other off-road vehicles.

BACKGROUND

Certain vehicles may be equipped with track systems which enhance their traction and floatation on soft, slippery and/or irregular grounds (e.g., snow, ice, soil, mud, sand, etc.) on which they operate.

For example, snowmobiles allow efficient travel on snowy and in some cases icy grounds. A snowmobile comprises a track system which engages the ground to provide traction. The track system comprises a track-engaging assembly and a track that moves around the track-engaging assembly and engages the ground to generate traction. The track typically comprises an elastomeric body in which are embedded certain reinforcements, such as transversal stiffening rods providing transversal rigidity to the track, longitudinal cables providing tensional strength, and/or fabric layers. The track-engaging assembly comprises wheels and in some cases slide rails around which the track is driven.

A snowmobile, including its track system, may face a number of challenges while riding. For example, the track system may generate noise that can be significant (e.g., for a rider and/or the snowmobile's environment), the track may be exposed to factors (e.g., snow conditions, ground unevenness, etc.) that affect its traction and/or floatation and/or cause wear, etc.

Similar considerations may arise for track systems of other types of off-road vehicles (e.g., all-terrain vehicles (ATVs), agricultural vehicles, or other vehicles that travel on uneven grounds) in certain situations.

For these and other reasons, there is a need to improve track systems for traction of vehicles.

SUMMARY

In accordance with various aspects of the invention, there is provided a track system for traction of a vehicle. The track system comprises a track and a track-engaging assembly for driving and guiding the track around the track-engaging assembly. The track system may have features to enhance its traction, floatation, and/or other aspects of its performance, including the track that may comprise reinforcing material (e.g., reinforcing polymeric material) that is stronger (e.g., stiffer, harder, and/or more resistant to wear) than elastomeric material of the track, such as to improve rigidity characteristics of the track, reduce noise generated by the track system, improve a resistance to wear (e.g., to cutting, chipping, chunking, cracking and/or tearing) of the track, enhance heat management (e.g., improve heat dissipation or reduce heat build-up) within the track, and/or reduce a weight of the track. The reinforcing material may be provided as one or more thin layers constituting at least part (e.g., of a periphery) of one or more components of the track (e.g., a carcass, traction projections, and/or drive/guide lugs).

For example, in accordance with an aspect, there is provided a track for traction of a vehicle. The track is mountable around a plurality of wheels. The track comprises a ground-engaging outer surface and an inner surface opposite to the ground-engaging outer surface. The track comprises elastomeric material allowing the track to flex around the wheels and reinforcing material stronger than the elastomeric material and constituting at least part of a periphery of the track.

In accordance with another aspect, there is provided a track for traction of a vehicle. The track is mountable around a plurality of wheels. The track comprises a ground-engaging outer surface and an inner surface opposite to the ground-engaging outer surface. The track comprises elastomeric material allowing the track to flex around the wheels and ultra-high-molecular-weight polyethylene constituting at least part of a periphery of the track.

In accordance with another aspect, there is provided a track for traction of a vehicle. The track is mountable about a plurality of wheels. The track is elastomeric to flex around the wheels. The track comprises a ground-engaging outer surface, an inner surface opposite to the ground-engaging outer surface, and a plurality of traction projections that project from the ground-engaging outer surface. The track comprises a first elastomeric material and a second elastomeric material overlying the first elastomeric material. The second elastomeric material constitutes at least part of a periphery of the track and includes an elastomeric matrix and reinforcing particles embedded in the elastomeric matrix.

In accordance with another aspect, there is provided a track for traction of a vehicle. The track is mountable about a plurality of wheels. The track is elastomeric to flex around the wheels. The track comprises a ground-engaging outer surface, an inner surface opposite to the ground-engaging outer surface, and a plurality of traction projections that project from the ground-engaging outer surface. The track comprises a first elastomeric material and a second elastomeric material adjacent to the first elastomeric material. The second elastomeric material includes an elastomeric matrix and reinforcing particles embedded in the elastomeric matrix.

In accordance with another aspect, there is provided a track for traction of a vehicle. The track is mountable about a plurality of wheels. The track is elastomeric to flex around the wheels. The track comprises a ground-engaging outer surface, an inner surface opposite to the ground-engaging outer surface, and a plurality of traction projections projecting from the ground-engaging outer surface. The track comprises: an elastomeric material; and a plurality of reinforcing segments that are spaced from one another in a longitudinal direction of the track, constitute at least part of a periphery of the track, and include reinforcing material stronger than the elastomeric material.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
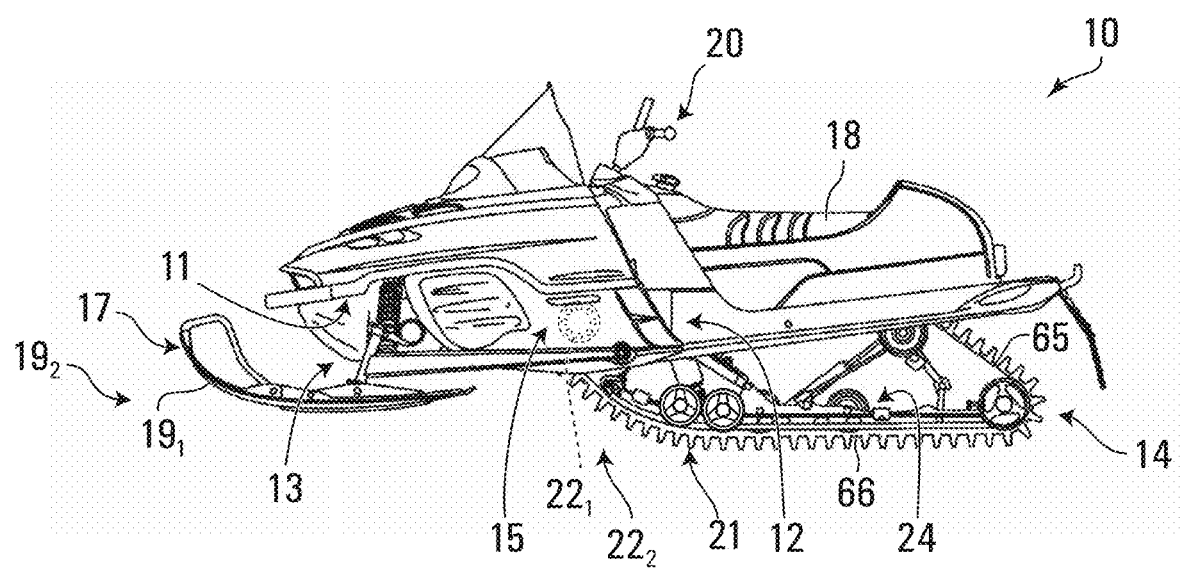
FIG. 1 shows an example of a vehicle comprising a track system in accordance with an embodiment of the invention, in which the vehicle is a snowmobile.

FIG. 1 shows an example of a vehicle 10 comprising a track system 14 in accordance with an embodiment of the invention. In this embodiment, the vehicle 10 is a snowmobile. The snowmobile 10 is designed for travelling on snow and in some cases ice.

The snowmobile 10 comprises a frame 11, a powertrain 12, the track system 14, a ski system 17, a seat 18, and a user interface 20, which enables a user to ride, steer and otherwise control the snowmobile 10. The track system 14 comprises a track 21 to engage the ground for traction of the snowmobile 10.

In various embodiments, as further discussed below, the track system 14, including the track 21, may have features to enhance its traction, floatation, and/or other aspects of its performance, including the track 21 that may comprise reinforcing material (e.g., reinforcing polymeric material) that is stronger (e.g., stiffer, harder, and/or more resistant to wear) than elastomeric material of the track 21, such as to improve rigidity characteristics of the track 21, reduce noise generated by the track system 14, improve a resistance to wear (e.g., to cutting, chipping, chunking, cracking and/or tearing) of the track 21, enhance heat management (e.g., improve heat dissipation or reduce heat build-up) within the track 21, and/or reduce a weight of the track 21.

The powertrain 12 is configured for generating motive power and transmitting motive power to the track system 14 to propel the snowmobile 10 on the ground. To that end, the powertrain 12 comprises a prime mover 15, which is a source of motive power that comprises one or more motors (e.g., an internal combustion engine, an electric motor, etc.). For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor). The prime mover 15 is in a driving relationship with the track system 14. That is, the powertrain 12 transmits motive power from the prime mover 15 to the track system 14 in order to drive (i.e., impart motion to) the track system 14.

The ski system 17 is turnable to allow steering of the snowmobile 10. In this embodiment, the ski system 17 comprises a pair of skis $19_1$, $19_2$ connected to the frame 11 via a ski-supporting assembly 13.

The seat 18 accommodates the user of the snowmobile 10. In this case, the seat 18 is a straddle seat and the snowmobile 10 is usable by a single person such that the seat 18 accommodates only that person driving the snowmobile 10. In other cases, the seat 18 may be another type of seat, and/or the snowmobile 10 may be usable by two individuals, namely one person driving the snowmobile 10 and a passenger, such that the seat 18 may accommodate both of these individuals (e.g., behind one another) or the snowmobile 10 may comprise an additional seat for the passenger.

The user interface 20 allows the user to interact with the snowmobile 10 to control the snowmobile 10. More particularly, the user interface 20 comprises an accelerator, a brake control, and a steering device that are operated by the user to control motion of the snowmobile 10 on the ground. In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

Figure 2:
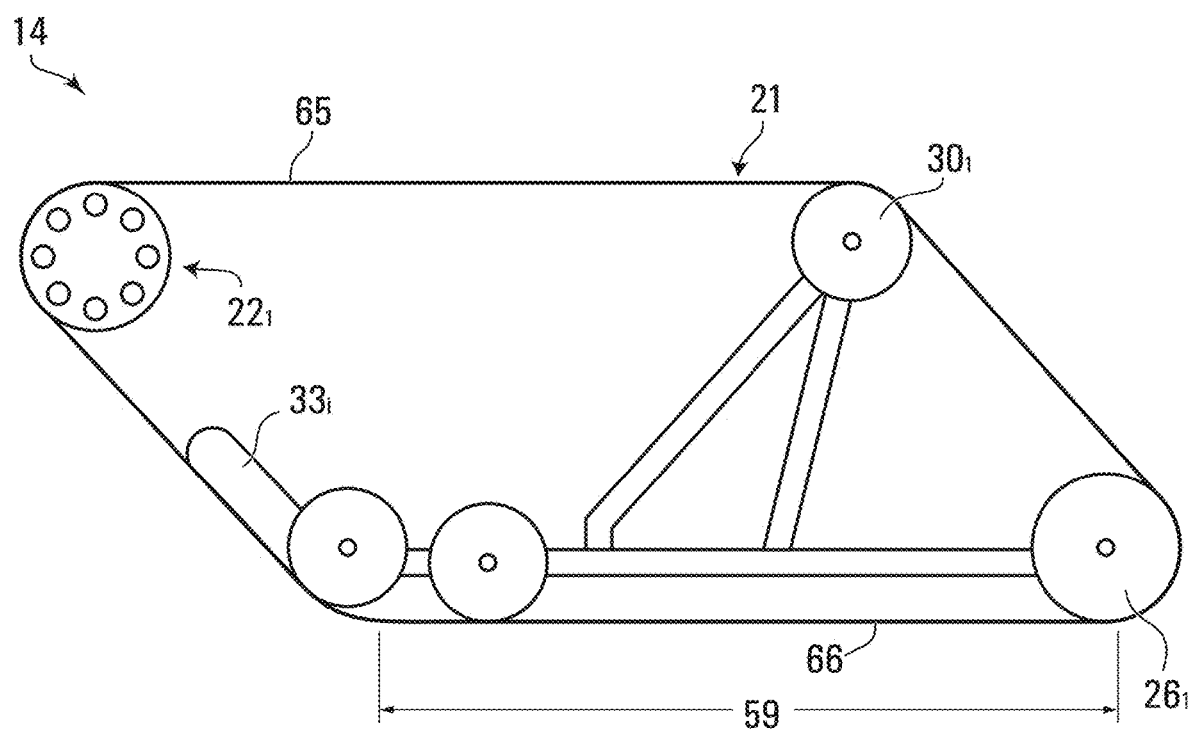
FIG. 2 shows a side view of the track system.
Figure 3:
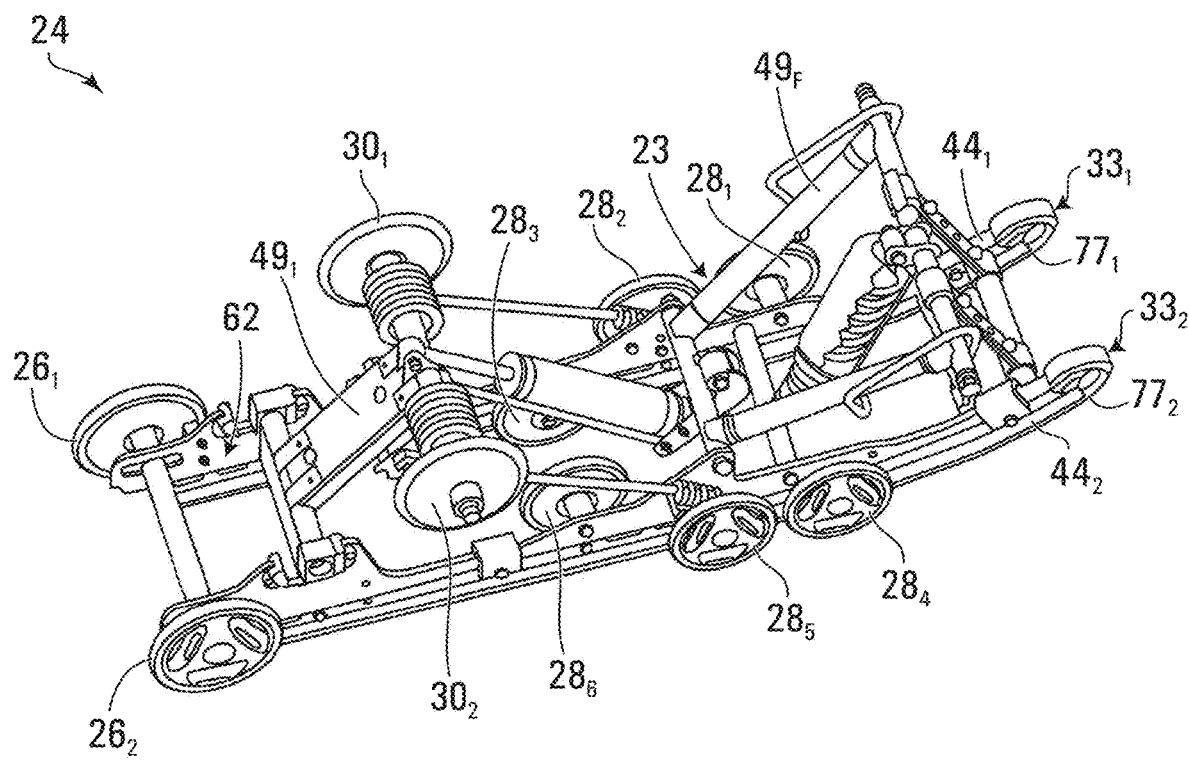
FIG. 3 shows a perspective view of a track-engaging assembly of the track system.
Figure 4:
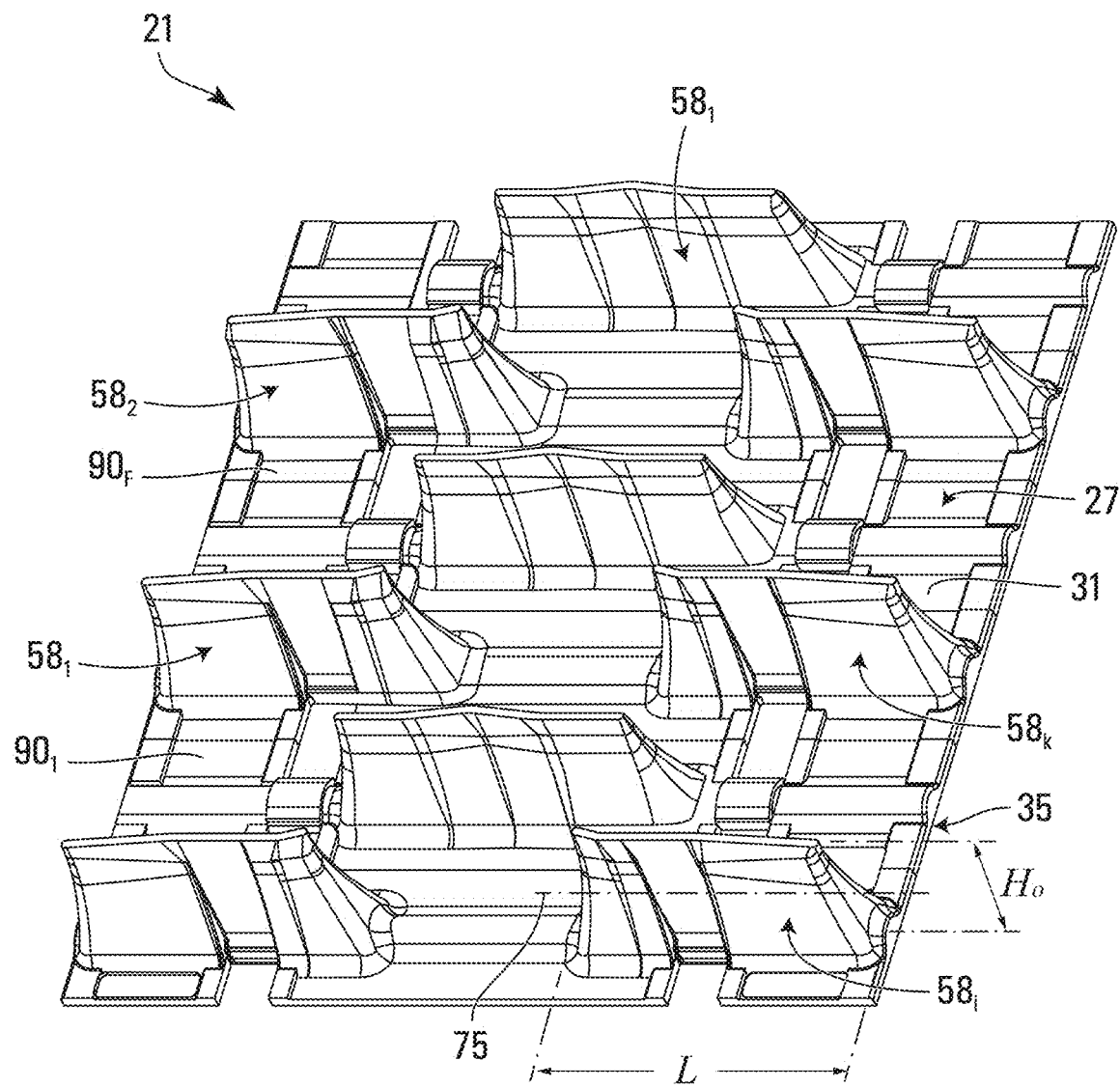
FIGS. 4 to 7 respectively show a perspective view, a plan view, an elevation view, and a longitudinal cross-sectional view of part of a track of the track system.

The track system 14 is configured to engage the ground to generate traction for the snowmobile 10. With additional reference to FIGS. 2 and 3, the track system 14 comprises the track 21 and a track-engaging assembly 24 for driving and guiding the track 21 around the track-engaging assembly 24. More particularly, in this embodiment, the track-engaging assembly 24 comprises a frame 23 and a plurality of track-contacting wheels which includes a plurality of drive wheels $22_1$, $22_2$ and a plurality of idler wheels that includes rear idler wheels $26_1$, $26_2$, lower roller wheels $28_1$-$28_6$, and upper roller wheels $30_1$, $30_2$. As it is disposed between the track 21 and the frame 11 of the snowmobile 10, the track-engaging assembly 24 can be viewed as implementing a suspension for the snowmobile 10. The track system 14 has a longitudinal direction and a first longitudinal end and a second longitudinal end that define a length of the track system 14, a widthwise direction and a width that is defined by a width W of the track 21, and a heightwise direction that is normal to its longitudinal direction and its widthwise direction.

The track 21 is configured to engage the ground to provide traction to the snowmobile 10. A length of the track 21 allows the track 21 to be mounted around the track-engaging assembly 24. In view of its closed configuration without ends that allows it to be disposed and moved around the track-engaging assembly 24, the track 21 can be referred to as an "endless" track. With additional reference to FIGS. 4 to 7, the track 21 comprises an inner side 25 for facing the track-engaging assembly 24 and a ground-engaging outer side 27 for engaging the ground. A top run 65 of the track 21 extends between the longitudinal ends of the track system 14 and over the track-engaging assembly 24 (including over the wheels $22_1$, $22_2$, $26_1$, $26_2$, $28_1$-$28_6$, $30_1$, $30_2$), and a bottom run 66 of the track 21 extends between the longitudinal ends of the track system 14 and under the track-engaging assembly 24 (including under the wheels $22_1$, $22_2$, $26_1$, $26_2$, $28_1$-$28_6$, $30_1$, $30_2$). The bottom run 66 of the track 21 defines an area of contact 59 of the track 21 with the ground which generates traction and bears a majority of a load on the track system 14, and which will be referred to as a "contact patch" of the track 21 with the ground. The track 21 has a longitudinal axis 85 which defines a longitudinal direction of the track 21 (i.e., a direction generally parallel to its longitudinal axis) and transversal directions of the track (i.e., directions transverse to its longitudinal axis), including a widthwise direction of the track (i.e., a lateral direction generally perpendicular to its longitudinal axis). The track 21 has a thickness direction normal to its longitudinal and widthwise directions.

The track 21 is elastomeric, i.e., comprises elastomeric material 53, to be flexible around the track-engaging assembly 24. The elastomeric material 53 of the track 21 can include any polymeric material with suitable elasticity. In this embodiment, the elastomeric material of the track 21 includes rubber. Various rubber compounds may be used and, in some cases, different rubber compounds may be present in different areas of the track 21. In other embodiments, the elastomeric material 53 of the track 21 may include another elastomer in addition to or instead of rubber (e.g., polyurethane elastomer).

Figure 8:
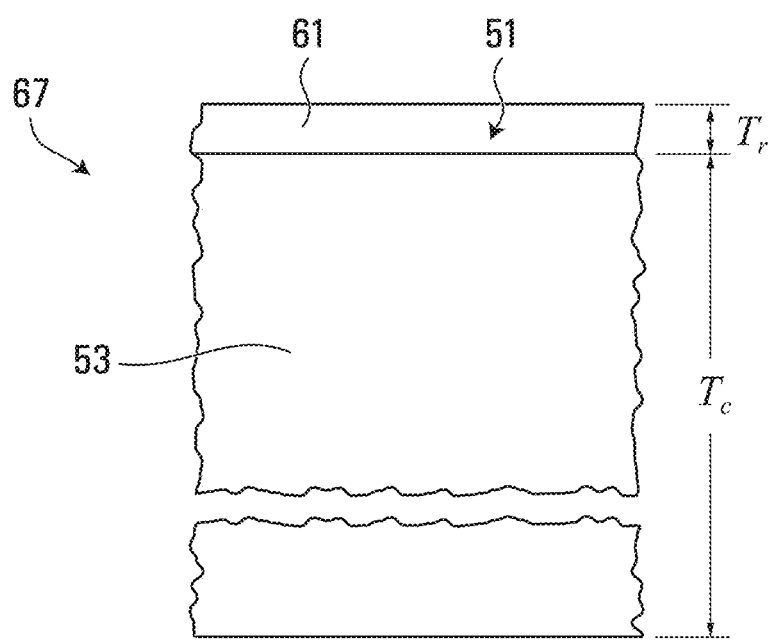
FIG. 8 shows a reinforcing material of the track overlying an elastomeric material of the track.

In this embodiment, as further discussed later, as shown in FIG. 8, the track 21 also comprises reinforcing material 51 (e.g., reinforcing polymeric material) that is significantly stronger (e.g., stiffer, harder, and/or more resistant to wear) than the elastomeric material 53. This may enhance various aspects of the track system 14, such as, for example, by improving the rigidity characteristics of the track 21, reducing the noise generated by the track system 14, improving a resistance to wear (e.g., to cutting, chipping, chunking, cracking and/or tearing) of the track 21, enhance heat management (e.g., improve heat dissipation or reduce heat build-up) within the track 21, and/or reduce a weight of the track 21.

More particularly, the track 21 comprises an endless body 35 underlying its inner side 25 and ground-engaging outer side 27. In view of its underlying nature, the body 35 will be referred to as a "carcass". The carcass 35 is elastomeric in that it comprises elastomeric material 38 which allows the carcass 35 to elastically change in shape and thus the track 21 to flex as it is in motion around the track-engaging assembly 24. The elastomeric material 38, which is part of the elastomeric material 53 of the track 21, can be any polymeric material with suitable elasticity. In this embodiment, the elastomeric material 38 includes rubber. Various rubber compounds may be used and, in some cases, different rubber compounds may be present in different areas of the carcass 35. In other embodiments, the elastomeric material 38 may include another elastomer in addition to or instead of rubber (e.g., polyurethane elastomer).

Figure 9A:
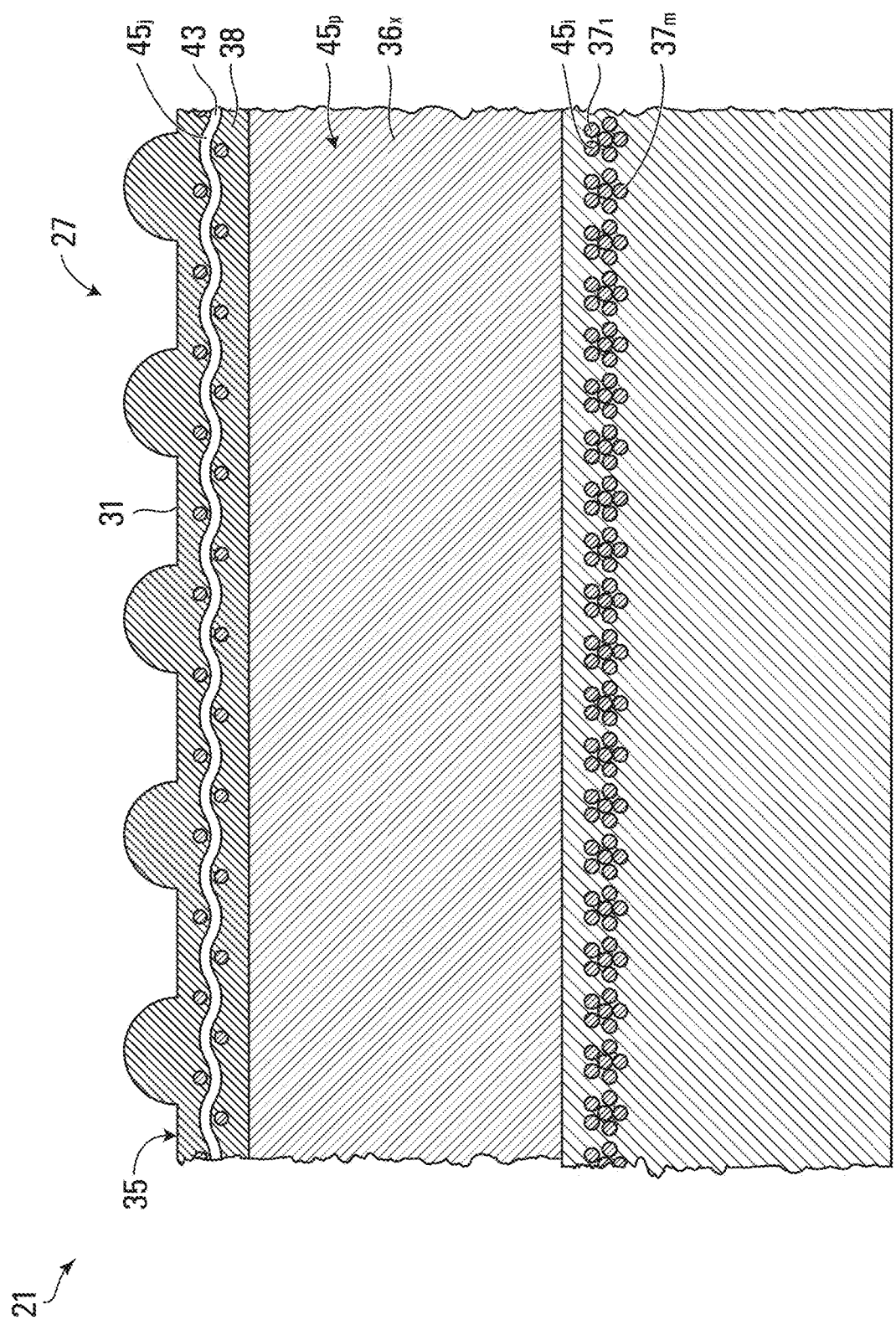
FIG. 9A shows a widthwise cross-sectional view of part of the track.
Figure 9B:
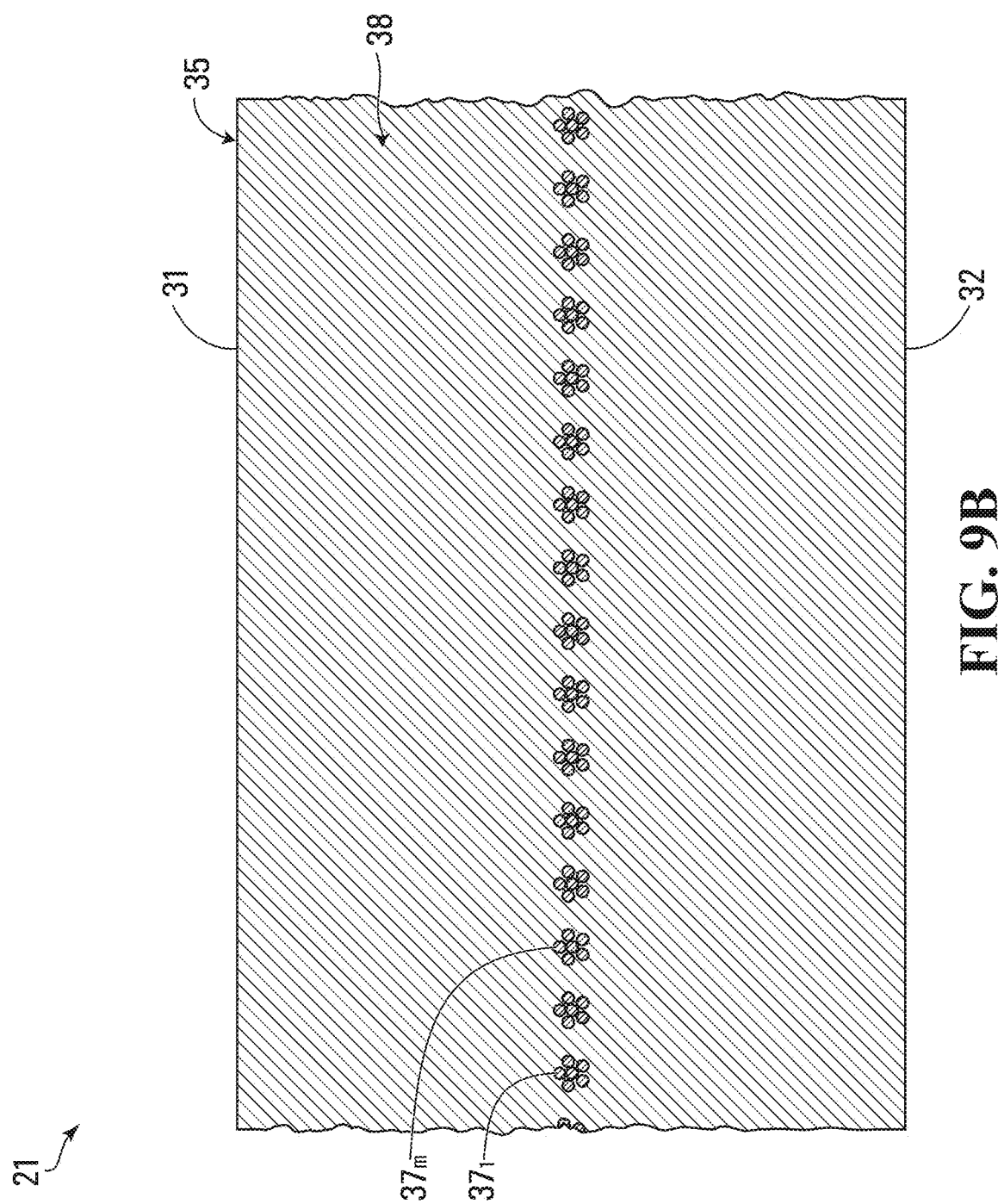
FIG. 9B shows a widthwise cross-sectional view of part of the track in accordance to another embodiment.

In this embodiment, as shown in FIGS. 9A and 9B, the carcass 35 comprises a plurality of reinforcements $45_1$-$45_P$ embedded in its rubber 38. These reinforcements $45_1$-$45_P$ can take on various forms.

For example, in this embodiment, a subset of the reinforcements $45_1$-$45_P$ is a plurality of transversal stiffening rods $36_1$-$36_N$ that extend transversally to the longitudinal direction of the track 21 to provide transversal rigidity to the track 21. More particularly, in this embodiment, the transversal stiffening rods $36_1$-$36_N$ extend in the widthwise direction of the track 21. Each of the transversal stiffening rods $36_1$-$36_N$ may have various shapes and be made of any suitably rigid material (e.g., metal, polymer or composite material).

As another example, in this embodiment, the reinforcements $45_i$, $45_j$ are reinforcing layers that are flexible in the longitudinal direction of the track 21.

For instance, in this embodiment, the reinforcement $45_i$ is a layer of reinforcing cables $37_1$-$37_M$ that are adjacent to one another and extend generally in the longitudinal direction of the track 21 to enhance strength in tension of the track 21 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible longitudinally (e.g., fibers or wires of metal, plastic or composite material). In some examples of implementation, respective ones of the reinforcing cables $37_1$-$37_M$ may be constituted by a single continuous cable length wound helically around the track 21. In other examples of implementation, respective ones of the transversal cables $37_1$-$37_M$ may be separate and independent from one another (i.e., unconnected other than by rubber of the track 21).

Also, in this embodiment, the reinforcement $45_j$ is a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods $36_1$-$36_N$, improve cohesion of the track 21, and counter its elongation.

In some embodiments, as shown in FIG. 9B, the carcass 35 may comprise only one type of reinforcement (e.g., the reinforcing cables $37_1$-$37_M$) or any other selected combination of the above-mentioned reinforcements $45_1$-$45_P$.

The carcass 35 may be molded into shape in a molding process during which the rubber 38 is cured. For example, in this embodiment, a mold may be used to consolidate layers of rubber providing the rubber 38 of the carcass 35, the reinforcing cables $37_1$-$37_M$ and the layer of reinforcing fabric 43.

The ground-engaging outer side 27 of the track 21 comprises a ground-engaging outer surface 31 of the carcass 35 and a plurality of traction projections $58_1$-$58_T$ (including traction projections $58_1$, $58_2$, $58_3$, $58_4$, $58_i$, $58_k$, $58_x$, $58_T$, and so on) that project from the ground-engaging outer surface 31 to enhance traction on the ground. The traction projections $58_1$-$58_T$, which can be referred to as "traction lugs" or "traction profiles", may have any suitable shape (e.g., straight shapes, curved shapes, shapes with straight parts and curved parts, etc.).

A height $H_o$ of a traction projection $58_x$ may have any suitable value. For example, in some embodiments, the height $H_o$ of the traction projection $58_x$ may be at least 2 inches, in some cases at least 4 inches, in some cases at least 6 inches, and in some cases even more. The height of the traction projection $58_x$ may have any other suitable value in other embodiments. The traction projection $58_x$ also has a longitudinal axis 75 and a first longitudinal end $308_1$ and a second longitudinal end $308_2$ that define a length L of the traction projection $58_x$. The longitudinal axis 75 of the traction projection $58_x$ extends transversally to the longitudinal direction of the track 21, in this example in the widthwise direction of the track 21.

In this embodiment, each of the traction projections $58_1$-$58_T$ is an elastomeric traction projection in that it comprises elastomeric material 41. The elastomeric material 41, which is part of the elastomeric material 53 of the track 21, can be any polymeric material with suitable elasticity. More particularly, in this embodiment, the elastomeric material 41 includes rubber. Various rubber compounds may be used and, in some cases, different rubber compounds may be present in different areas of each of the traction projections $58_1$-$58_T$. In other embodiments, the elastomeric material 41 may include another elastomer in addition to or instead of rubber (e.g., polyurethane elastomer).

The traction projections $58_1$-$58_T$ may be provided on the ground-engaging outer side 27 in various ways. For example, in this embodiment, the traction projections $58_1$-$58_T$ are provided on the ground-engaging outer side 27 by being molded with the carcass 35.

The inner side 25 of the track 21 comprises an inner surface 32 of the carcass 35 and a plurality of inner projections $34_1$-$34_D$ that project from the inner surface 32 and are positioned to contact the track-engaging assembly 24 (e.g., at least some of the wheels $22_1$, $22_2$, $26_1$, $26_2$, $28_1$-$28_6$, $30_1$, $30_2$) to do at least one of driving (i.e., imparting motion to) the track 21 and guiding the track 21. Since each of them is used to do at least one of driving the track 21 and guiding the track 21, the inner projections $34_1$-$34_D$ can be referred to as "drive/guide projections" or "drive/guide lugs". In some cases, a drive/guide lug $34_x$ may interact with a given one of the drive wheels $22_1$, $22_2$ to drive the track 21, in which case the drive/guide lug $34_x$ is a drive lug. In other cases, a drive/guide lug $34_x$ may interact with a given one of the idler wheels $26_1$, $26_2$, $28_1$-$28_2$, $30_1$, $30_2$ and/or another part of the track-engaging assembly 24 to guide the track 21 to maintain proper track alignment and prevent de-tracking without being used to drive the track 21, in which case the drive/guide lug $34_x$ is a guide lug. In yet other cases, a drive/guide lug $34_x$ may both (i) interact with a given one of the drive wheels $22_1$, $22_3$ to drive the track 21 and (ii) interact with a given one of the idler WHEELS $26_1$, $26_2$, $28_1$-$28_6$, $30_1$, $30_2$ and/or another part of the track-engaging assembly 24 to guide the track 21, in which case the drive/guide lug $34_x$ is both a drive lug and a guide lug. A height $H_i$ of a drive/guide lug $34_x$ may have any suitable value.

In this embodiment, each of the drive/guide lugs $34_1$-$34_D$ is an elastomeric drive/guide lug in that it comprises elastomeric material 42. The elastomeric material 42, which is part of the elastomeric material 53 of the track 21, can be any polymeric material with suitable elasticity. More particularly, in this embodiment, the elastomeric material 42 includes rubber. Various rubber compounds may be used and, in some cases, different rubber compounds may be present in different areas of each of the drive/guide lugs $34_1$-$34_D$. In other embodiments, the elastomeric material 42 may include another elastomer in addition to or instead of rubber (e.g., polyurethane elastomer).

The drive/guide lugs $34_1$-$34_D$ may be provided on the inner side 25 in various ways. For example, in this embodiment, the drive/guide lugs $34_1$-$34_D$ are provided on the inner side 25 by being molded with the carcass 35.

In this embodiment, the carcass 35 has a thickness $T_c$ which is relatively small. The thickness $T_c$ of the carcass 35 is measured from the inner surface 32 to the ground-engaging outer surface 31 of the carcass 35 between longitudinally-adjacent ones of the traction projections $58_1$-$58_T$. For example, in some embodiments, the thickness $T_c$ of the carcass 35 may be no more than 0.25 inches, in some cases no more than 0.22 inches, in some cases no more than 0.20 inches, and in some cases even less (e.g., no more than 0.18 or 0.16 inches). The thickness $T_c$ of the carcass 35 may have any other suitable value in other embodiments.

The track-engaging assembly 24 is configured to drive and guide the track 21 around the track-engaging assembly 24.

Each of the drive wheels $22_1$, $22_2$ is rotatable by an axle for driving the track 21. That is, power generated by the prime mover 15 and delivered over the powertrain 12 of the snowmobile 10 rotates the axle, which rotates the drive wheels $22_1$, $22_2$, which impart motion of the track 21. In this embodiment, each drive wheel $22_i$ comprises a drive sprocket engaging some of the drive/guide lugs $34_1$-$34_D$ of the inner side 25 of the track 21 in order to drive the track 21. In other embodiments, the drive wheel $22_i$ may be configured in various other ways. For example, in embodiments where the track 21 comprises drive holes, the drive wheel $22_i$ may have teeth that enter these holes in order to drive the track 21. As yet another example, in some embodiments, the drive wheel $22_i$ may frictionally engage the inner side 25 of the track 21 in order to frictionally drive the track 21. The drive wheels $22_1$, $22_2$ may be arranged in other configurations and/or the track system 14 may comprise more or less drive wheels (e.g., a single drive wheel, more than two drive wheels, etc.) in other embodiments.

The idler wheels $26_1$, $26_2$, $28_1$-$28_6$, $30_1$, $30_2$ are not driven by power supplied by the prime mover 15, but are rather used to do at least one of guiding the track 21 as it is driven by the drive wheels $22_1$, $22_2$, tensioning the track 21, and supporting part of the weight of the snowmobile 10 on the ground via the track 21. More particularly, in this embodiment, the rear idler wheels $26_1$, $26_2$ are trailing idler wheels that maintain the track 21 in tension, guide the track 21 as it wraps around them, and can help to support part of the weight of the snowmobile 10 on the ground via the track 21. The lower roller wheels $28_1$-$28_6$ roll on the inner side 25 of the track 21 along the bottom run 66 of the track 21 to apply the bottom run 66 on the ground. The upper roller wheels $30_1$, $30_2$ roll on the inner side 25 of the track 21 along the top run 65 of the track 21 to support and guide the top run 65 as the track 21 moves. The idler wheels $26_1$, $26_2$, $28_1$-$28_6$, $30_1$, $30_2$ may be arranged in other configurations and/or the track assembly 14 may comprise more or less idler wheels in other embodiments.

The frame 23 of the track system 14 supports various components of the track-engaging assembly 24, including, in this embodiment, the idler wheels $26_1$, $26_2$, $28_1$-$28_6$, $30_1$, $30_2$. More particularly, in this embodiment, the frame 23 comprises an elongate support 62 extending in the longitudinal direction of the track system 14 along the bottom run 66 of the track 21 and frame members $49_1$-$49_F$ extending upwardly from the elongate support 62.

Figure 5:
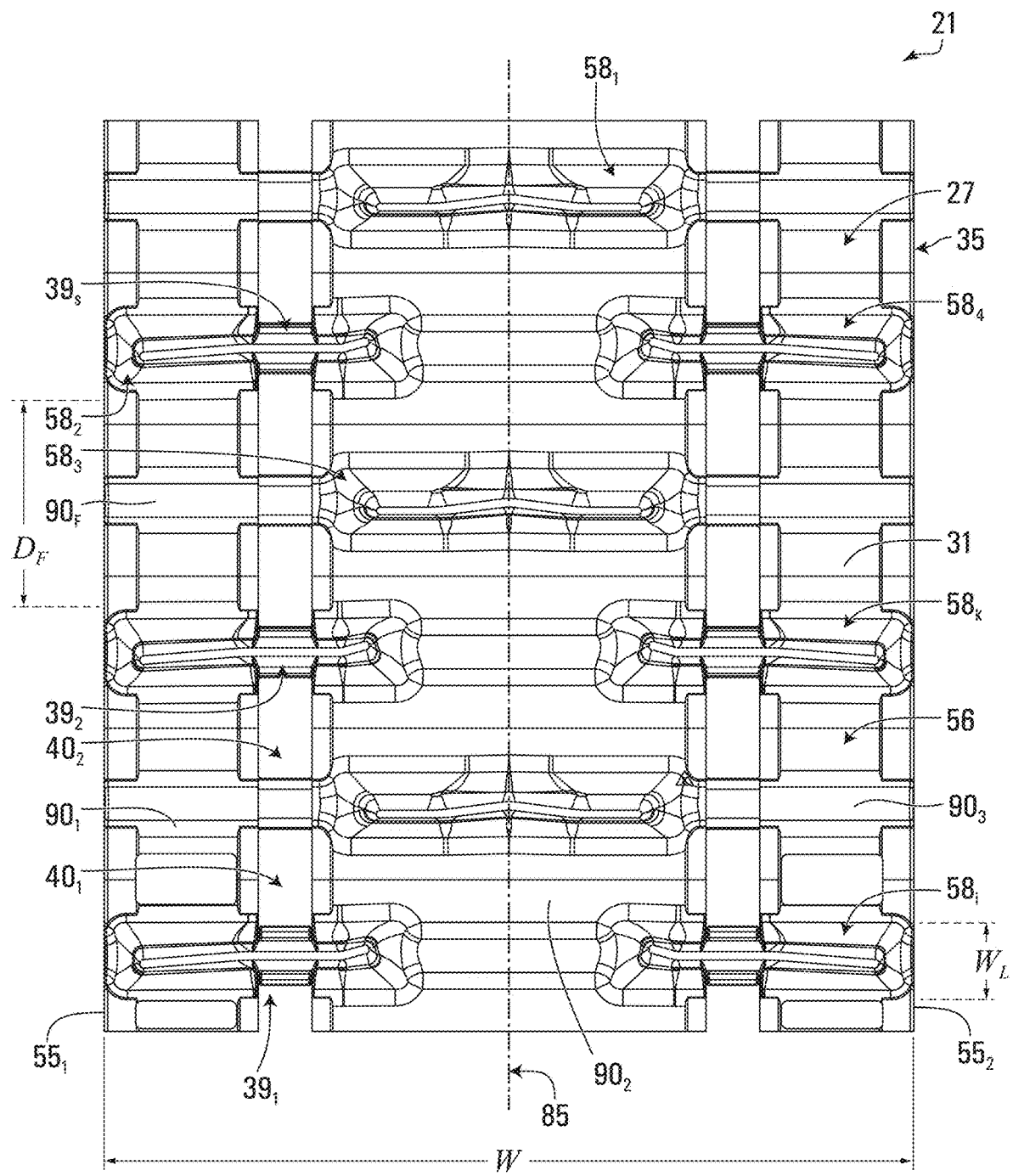
Figure 6:
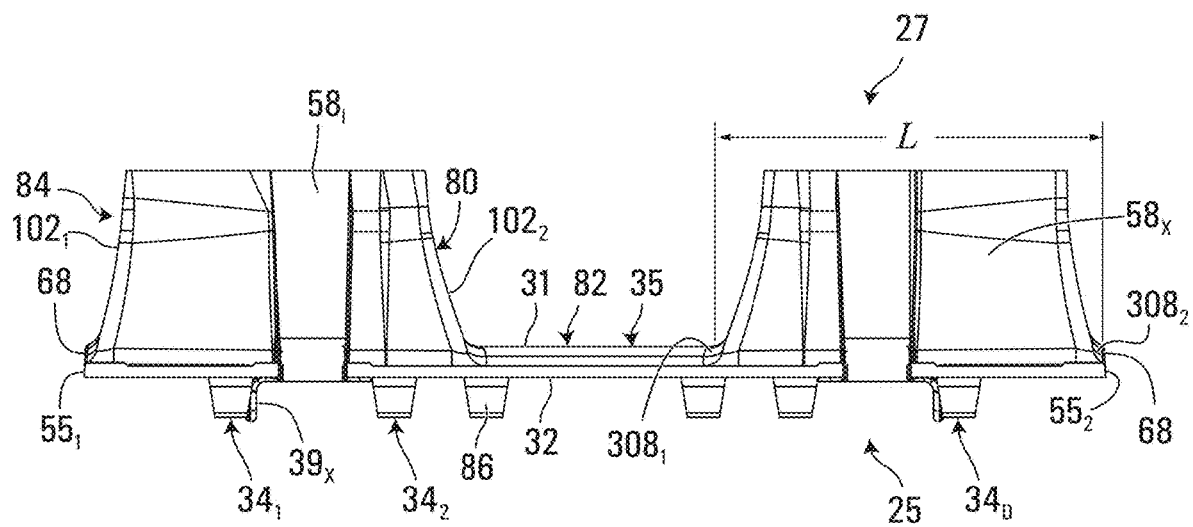
Figure 7:
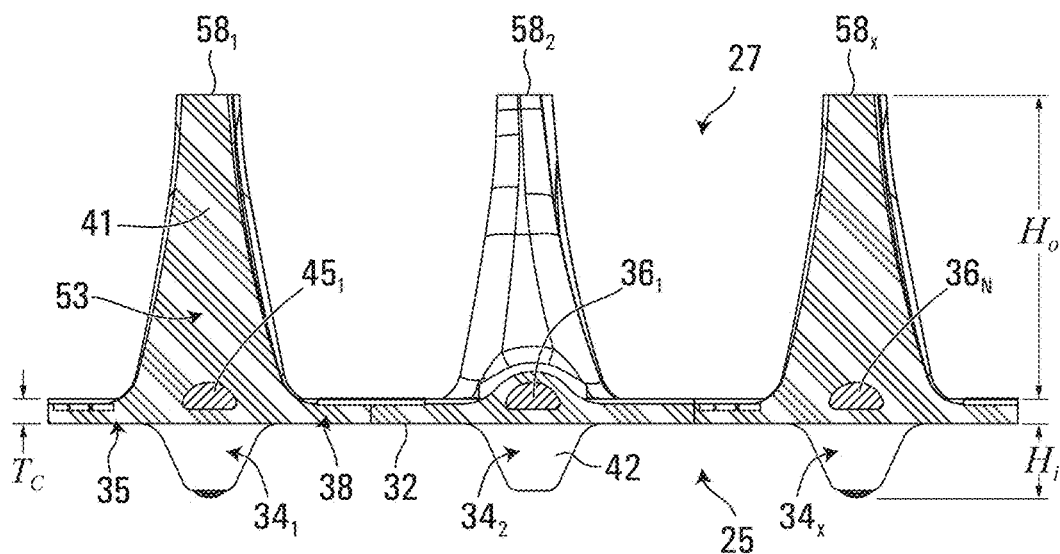

The elongate support 62 comprises rails $44_1$, $44_2$ extending in the longitudinal direction of the track system 14 along the bottom run 66 of the track 21. In this example, the idler wheels $26_1$, $26_2$, $28_1$-$28_6$ are mounted to the rails $44_1$, $44_2$. In this embodiment, the elongate support 62 comprises sliding surfaces $77_1$, $77_2$ for sliding on the inner side 25 of the track 21 along the bottom run 66 of the track 21. Thus, in this embodiment, the idler wheels $26_1$, $26_2$, $28_1$-$28_6$ and the sliding surfaces $77_1$, $77_2$ of the elongate support 62 can contact the bottom run 66 of the track 21 to guide the track 21 and apply it onto the ground for traction. In this example, the sliding surfaces $77_1$, $77_2$ can slide against the inner surface 32 of the carcass 35 and can contact respective ones of the drive/guide lugs $34_1$-$34_D$ to guide the track 21 in motion. Also, in this example, the sliding surfaces $77_1$, $77_2$ are curved upwardly in a front region of the track system 14 to guide the track 21 towards the drive wheels $22_1$, $22_2$. In some cases, as shown in FIGS. 5 and 6, the track 21 may comprise slide members $39_1$-$39_S$ that slide against the sliding surfaces $77_1$, $77_2$ to reduce friction. The slide members $39_1$-$39_S$, which can sometimes be referred to as "clips", may be mounted via holes (i.e., windows) $40_1$-$40_H$ (including holes $40_1$, $40_2$, $40_3$, $40_H$, and so on) of the track 21. In other cases, the track 21 may be free of such slide members.

In this embodiment, the elongate support 62 comprises sliders $33_1$, $33_2$ mounted to respective ones of the rails $44_1$, $44_2$ and comprising respective ones of the sliding surfaces $77_1$, $77_2$. In this embodiment, the sliders $33_1$, $33_2$ are mechanically interlocked with the rails $44_1$, $44_2$. In other embodiments, instead of or in addition to being mechanically interlocked with the rails $44_1$, $44_2$, the sliders $33_1$, $33_2$ may be fastened to the rails $44_1$, $44_2$. For example, in some embodiments, the sliders $33_1$, $33_2$ may be fastened to the rails $44_1$, $44_2$ by one or more mechanical fasteners (e.g., bolts, screws, etc.), by an adhesive, and/or by any other suitable fastener.

In some examples, each slider $33_i$ may comprise a low-friction material which may reduce friction between its sliding surface $77_i$ and the inner side 25 of the track 21. For instance, the slider $33_i$ may comprise a polymeric material having a low coefficient of friction with the rubber of the track 21. For example, in some embodiments, the slider $33_i$ may comprise a thermoplastic material (e.g., a Hifax® polypropylene). The slider $33_i$ may comprise any other suitable material in other embodiments. For instance, in some embodiments, the sliding surface $77_i$ of the slider $33_i$ may comprise a coating (e.g., a polytetrafluoroethylene (PTFE) coating) that reduces friction between it and the inner side 25 of the track 21, while a remainder of the slider $33_i$ may comprise any suitable material (e.g., a metallic material, another polymeric material, etc.).

While in embodiments considered above the sliding surface $77_i$ is part of the slider $33_i$ which is separate from and mounted to each rail $44_i$, in other embodiments, the sliding surface $77_i$ may be part of the rail $44_i$. That is, the sliding surface $77_i$ may be integrally formed (e.g., molded, cast, or machined) as part of the rail $44_i$.

The frame members $49_1$-$49_F$ extend upwardly from the elongate support 62 to hold the upper roller wheels $30_1$, $30_2$ such that the upper roller wheels $30_1$, $30_2$ roll on the inner side 25 of the track 21 along the top run 65 of the track 21.

The track-engaging assembly 24 may be implemented in any other suitable way in other embodiments.

The reinforcing material 51 of the track 21, which is significantly stronger (e.g., stiffer, harder, and/or more resistant to wear) than the elastomeric material 53 of the track 21, may be useful for various purposes. For example, in some embodiments, the reinforcing material 51 may improve the rigidity characteristics of the track 21, reduce the noise generated by the track system 14, improve the resistance to wear (e.g., to cutting, chipping, chunking, cracking and/or tearing) of the track 21, enhance heat management (e.g., improve heat dissipation or reduce heat build-up) within the track 21, and/or reduce a weight of the track 21.

In various embodiments, the reinforcing material 51 of the track 21 may constitute at least part of one or more components of the track 21, such as the carcass 35, the traction projections $58_1$-$58_T$ and/or the drive/guide lugs $34_1$-$34_D$. For example, in some embodiments, the reinforcing material 51 of the track 21 may constitute at least part of a periphery 80 of the track 21, such as at least part of a periphery 82 of the carcass 35, a periphery 84 of a traction projection $58_x$ and/or a periphery 86 of a drive/guide lug $34_x$.

The reinforcing material 51 of the track 21 has a continuous material structure and is therefore not reinforcing fabric (e.g., such as the reinforcing fabric 43) or reinforcing cables (e.g., such as the reinforcing cables $37_1$-$37_M$).

More particularly, in various embodiments, the reinforcing material 51 of the track 21 may comprise a layer of reinforcing material 61 contiguous to (e.g., overlying) the elastomeric material 53 of a given component 67 of the track 21 (e.g., the carcass 35, a traction projection $58_x$ or a drive/guide lug $34_x$). The layer of reinforcing material 61 may be thin, notably significantly thinner than the elastomeric material 53 of the given component 67 of the track 21. For example, in some embodiments, a ratio of a thickness $T_r$ of the layer of reinforcing material 61 over a thickness $T_e$ of the elastomeric material 53 of the given component 67 of the track 21 may be no more than 0.1, in some cases no more than 0.075, in some cases no more than 0.05, in some cases no more than 0.025, in some cases no more than 0.01, and in some cases even less. For instance, in some embodiments, the thickness $T_r$ of the layer of reinforcing material 61 may be no more than 0.02 inches, in some cases no more than 0.015 inches, in some cases no more than 0.012 inches, in some cases no more than 0.01 inches, in some cases no more than 0.005 inches, and in some cases even less. The layer of reinforcing material 61 may thus include a sheet (e.g., a film or other thin sheet) of the reinforcing material 51.

The reinforcing material 51 of the track 21 may be significantly stronger than the elastomeric material 53 of the track 21 in various ways. For example, in some embodiments:

The reinforcing material 51 may be stiffer than the elastomeric material 53. For instance, in some embodiments, a ratio of a modulus of elasticity (i.e., Young's modulus) of the reinforcing material 51 over a modulus of elasticity of the elastomeric material 53 may be at least 10, in some cases at least 50, in some cases at least 80, in some cases at least 100, in some cases at least 120 and in some cases even more. For example, in some embodiments, the modulus of elasticity of the reinforcing material 51 may be at least 80 MPa, in some cases at least 200 MPa, in some cases at least 500 MPa, in some cases at least 800 MPa, in some cases at least 1000 MPa and in some cases even more;

The reinforcing material 51 may be harder than the elastomeric material 53. For instance, in some embodiments, a ratio of a hardness (e.g., on a Shore D scale) of the reinforcing material 51 over a hardness of the elastomeric material 53 may be at least 1.2, in some cases at least 1.5, in some cases at least 2, in some cases at least 2.5 and in some cases even more. For example, in some embodiments, the hardness of the reinforcing material 51 may be at least 40 Shore D, in some cases at least 50 Shore D, in some cases at least 60 Shore D, in some cases at least 70 Shore D, in some cases at least 80 Shore D and in some cases even more; and/or The reinforcing material 51 may be more resistant to wear (e.g., abrasion) than the elastomeric material 53. For instance, in some embodiments, a ratio of a wear resistance of the reinforcing material 51 over a wear resistance of the elastomeric material 53 may be no more than 0.95, in some cases no more than 0.8, in some cases no more than 0.7, in some cases no more than 0.6, in some cases no more than 0.5 and in some cases even less. The wear resistance of the reinforcing material 51 can be taken as an abrasion resistance of the reinforcing material 51 and the wear resistance of the elastomeric material 53 can be taken as an abrasion resistance of the elastomeric material 53. For example, the wear resistance of each of the reinforcing material 51 and the elastomeric material 53, expressed as its abrasion resistance, may be measured under ASTM D-5963 conditions (e.g., sample dimensions; loading conditions; etc.). For instance, in some embodiments, the abrasion resistance of the reinforcing material 51 may be at least 40 mm$^3$, in some cases at least 60 mm$^3$, in some cases at least 80 mm$^3$, in some cases at least 100 mm$^3$, in some cases at least 120 mm$^3$, in some cases at least 150 mm$^3$ and in some cases even more.

In this embodiment, the reinforcing material 51 is reinforcing polymeric material. For example, in some embodiments, the reinforcing polymeric material 51 may be non-elastomeric (i.e., not be an elastomer). In some cases, the reinforcing polymeric material 51 may comprise thermoplastic material. For instance, in some embodiments, the reinforcing polymeric material 51 may comprise ultra-high-molecular-weight polyethylene (UHMW or UHMWPE). The reinforcing polymeric material 51 may comprise any other suitable polymer in other embodiments, such as polyethylene (PE) (e.g., low-density polyethylene (LDPE) or high-density polyethylene (HDPE)), polypropylene (PP), polytetrafluoroethylene (PTFE), a thermoplastic elastomer (TPE) such as thermoplastic polyurethane (TPU), polyether ether ketone (PEEK) or other polyaryletherketone (PAEK), polycarbonate, nylon or other polyamide, etc.

In some examples of implementation, the reinforcing polymeric material 51 may be a composite material. For instance, the reinforcing polymeric material 51 may be a fiber-matrix composite material that comprises a polymeric matrix in which fibers are embedded (i.e., a fiber-reinforced polymeric material). The polymeric matrix may include any suitable polymeric resin (e.g., a thermoplastic or thermosetting resin, such as epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate) (PMMA), polycarbonate, acrylonitrile butadiene styrene (ABS), nylon, polyimide, polysulfone, polyamide-imide, self-reinforcing polyphenylene, polyester, vinyl ester, vinyl ether, polyurethane, cyanate ester, phenolic resin, etc., a hybrid thermosetting-thermoplastic resin, or any other suitable resin. The fibers may be made of any suitable material (e.g., carbon fibers, aramid fibers (e.g., Kevlar fibers), boron fibers, silicon carbide fibers, etc.).

Examples of embodiments in which the reinforcing polymeric material 51 of the track 21 may be provided in various ways will now be discussed.

1. Carcass's Periphery

In some embodiments, the reinforcing polymeric material 51 of the track 21 may constitute at least part of the periphery 82 of the carcass 35, such as at least part of the inner surface 32 and/or at least part of the ground-engaging outer surface 31 of the carcass 35. This may improve rigidity characteristics of the carcass 35 and thus those of the track 21, reduce the noise generated by the track system 14, improve a resistance to wear of the carcass 35, and/or reduce a weight of the carcass 35 and thus the weight of the track 21.

Figure 10:
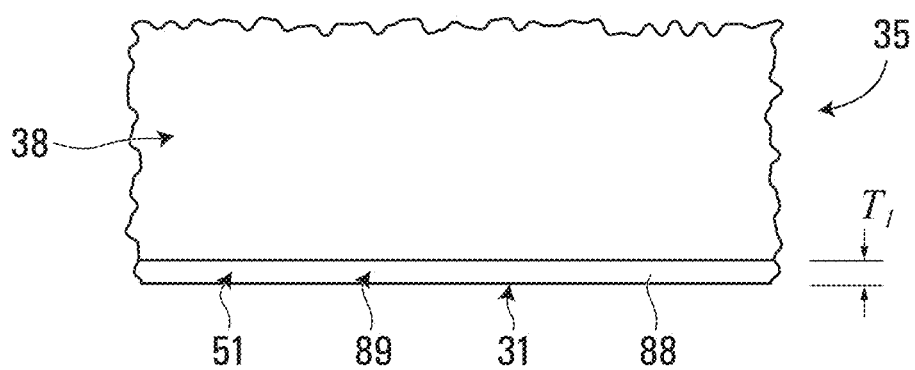
FIG. 10 shows a layer of reinforcing polymeric material of the reinforcing material of the track constituting at least part of a ground-engaging outer surface of a carcass of the track.

For example, in some embodiments, as shown in FIG. 10, the reinforcing polymeric material 51 may comprise a layer of reinforcing polymeric material 88 constituting at least part of the ground-engaging outer surface 31 of the carcass 35.

Where the layer of reinforcing polymeric material 88 is stiffer than the elastomeric material 38 of the carcass 35, this may help to increase a longitudinal rigidity of the carcass 35, i.e., a rigidity of the carcass 35 in the longitudinal direction of the track 21 which refers to the carcass's resistance to bending about an axis parallel to the widthwise direction of the track 21, and/or (2) a widthwise rigidity of the carcass 35, i.e., a rigidity of the carcass 35 in the widthwise direction of the track 21 which refers to the carcass's resistance to bending about an axis parallel to the longitudinal direction of the track 21.

Increasing the widthwise rigidity of the carcass 35 may help to improve traction and floatation.

Increasing the longitudinal rigidity of the carcass 35 may help to reduce noise generated by the track system 14, such as in cases where the carcass 35 comprises the transversal stiffening rods $36_1$-$36_N$ by reducing a difference in rigidity between areas which have the transversal stiffening rods $36_1$-$36_N$ and areas that do not have the transversal stiffening rods $36_1$-$36_N$ when the roller wheels $28_1$-$28_6$, $30_1$, $30_2$ pass over these areas. In other words, the increased longitudinal rigidity of the carcass 35 may reduce deformation of the carcass 35 against impacts such as when the roller wheels $28_1$-$28_6$, $30_1$, $30_2$ roll over the carcass 35. This in turn may cause a reduction in noise generated by the track system 14.

Figure 40:
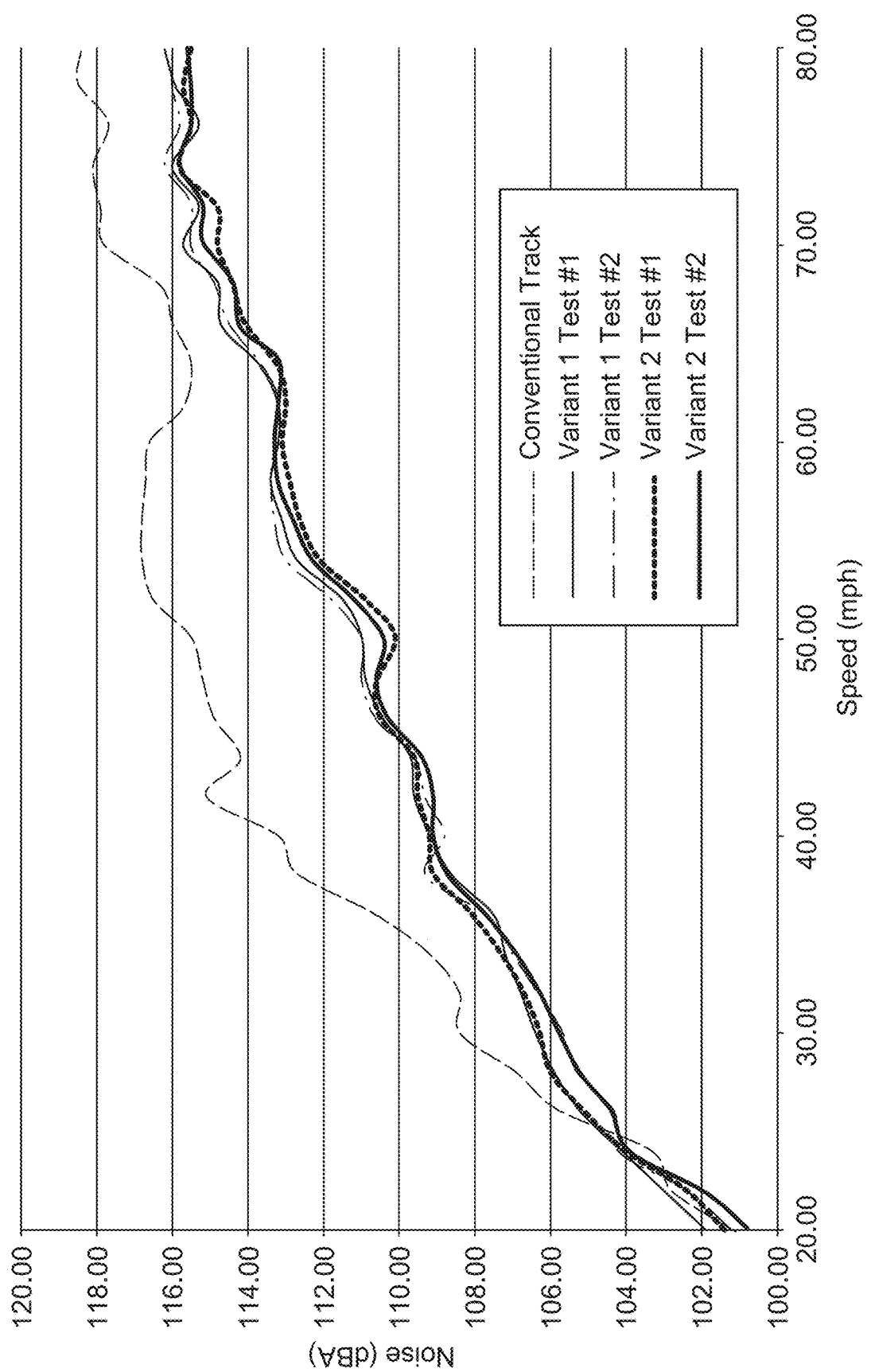
FIG. 40 shows a graph of test data evaluating noise generated at given speeds by a conventional track compared to the track of FIG. 10.
Figure 41:
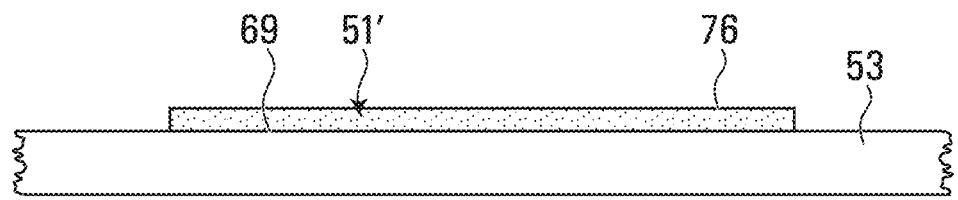
FIG. 41 shows an example of a variant in which the reinforcing material includes a polymeric matrix loaded with reinforcing particles disposed on a portion of the elastomeric material of the track.
Figure 42:
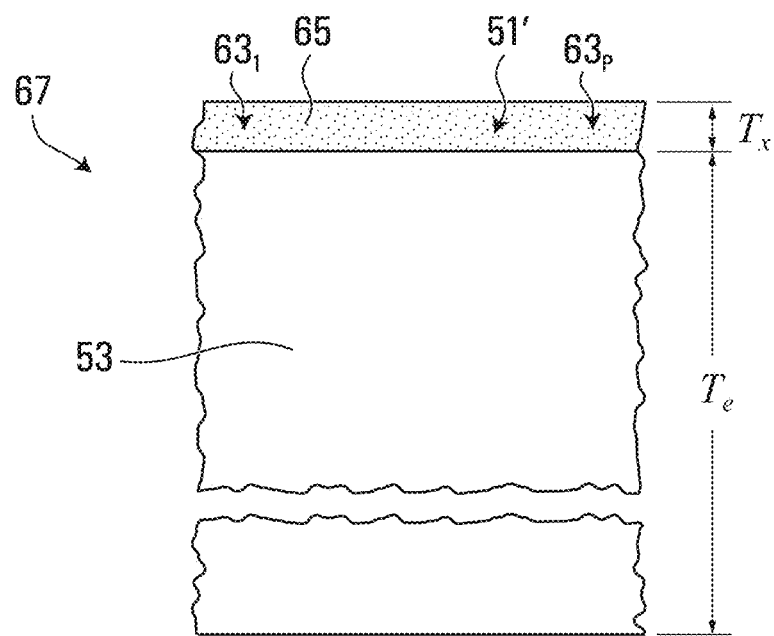
FIG. 42 shows an example of a variant in which the reinforcing material, including a polymeric matrix loaded with reinforcing particles, of the track overlies an elastomeric material of the track.

For instance, in some embodiments, the track 21 may generate less noise than if the layer of reinforcing polymeric material 88 was omitted but the track 21 was otherwise identical. For instance, in some embodiments, a noise level generated by the track 21 at a given speed may be at least 2%, in some cases at least 4%, and in some cases at least 6% less than that which would be generated if the layer of reinforcing polymeric material 88 was omitted. More specifically, tests have been performed to compare the noise generated by a conventional track (i.e., a track without the layer of polymeric reinforcing material 88 but otherwise identical to the track 21) to the noise generated by two variants of the track 21 which include the layer of reinforcing polymeric material 88. As shown in FIG. 40, test data indicates that at a vehicle speed of approximately 27 mph and above, the noise generated by the track 21 (i.e., with the layer of reinforcing polymeric material 88) is less than the noise generated by the conventional track at the same vehicle speed. More particularly, in the vehicle speed range between 38 mph and 60 mph, the noise generated by the track 21 is over 3% less than the noise generated by the conventional track. For instance, the noise generated by the track 21 in this vehicle speed range may be between 3% and 6% less than the noise generated by the conventional track at a similar vehicle speed range.

Where the layer of reinforcing polymeric material 88 is more resistant to wear (e.g., abrasion and/or tearing) than the elastomeric material 38 of the carcass 35, this may help to protect the carcass 35 and reduce wear of the carcass 35 as the track 21 travels on the ground.

This may also help to reduce the thickness $T_c$ of the carcass 35, such as by using less of the elastomeric material 38 of the carcass 35. In turn, this may reduce the weight of the carcass 35 and, thus, the weight of the track 21. For example, in some embodiments, the thickness $T_c$ of the carcass 35 may be no more than 0.2 inches, in some cases no more than 0.018 inches, in some cases no more than 0.016 inches, in some cases no more than 0.014 inches, in some cases no more than 0.012 inches and in some cases even less.

In this embodiment, the layer of reinforcing polymeric material 88 occupies at least a substantial part of each of a plurality of traction-projection-free areas $90_1$-$90_F$ of the ground-engaging outer surface 31, i.e., areas of the ground-engaging outer surface 31 that are disposed between respective ones of the traction projections $58_1$-$58_T$ and that are free of traction projections. For instance, the layer of reinforcing polymeric material 88 may occupy at least a majority (i.e., a majority or an entirety) of the width W of the track 21. More specifically, in this embodiment, the layer of reinforcing polymeric material 88 occupies the entirety of the width W of the track 21. Moreover, the layer of reinforcing polymeric material 88 may occupy at least a majority (i.e., a majority or an entirety) of a dimension $D_F$ of a traction-projection-free area $90_i$ in the longitudinal direction of the track 21. In this embodiment, the layer of reinforcing polymeric material 88 occupies the entirety of the dimension $D_F$.

Furthermore, in this embodiment, the layer of reinforcing polymeric material 88 is thin. For instance, in this embodiment, a thickness $T_1$ of the layer of reinforcing polymeric material 88 is less than the thickness $T_c$ of the carcass 35. For example, in some cases, a ratio of the thickness $T_1$ of the layer of reinforcing polymeric material 88 over the thickness $T_c$ of the carcass 35 may be no more than 0.15, in some cases no more than 0.1, in some cases no more than 0.05, and in some cases even less (e.g., 0.02).

Figure 11:
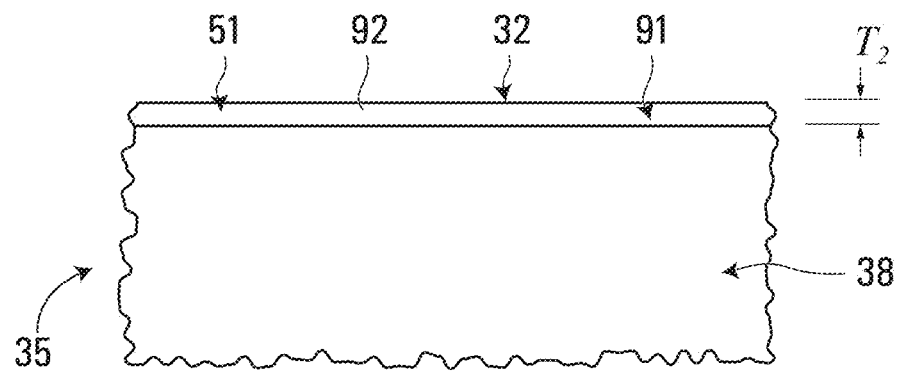
FIG. 11 shows a layer of reinforcing polymeric material of the reinforcing material of the track constituting at least part of an inner surface of the carcass of the track.

As another example, as shown in FIG. 11, the reinforcing polymeric material 51 may comprise a layer of reinforcing polymeric material 92 constituting at least part of the inner surface 32 of the carcass 35.

This may have similar effects as described above in respect of the layer of reinforcing polymeric material 88 constituting at least part of the ground-engaging outer surface 31 of the carcass 35.

In this embodiment, the layer of reinforcing polymeric material 92 may occupy at least a majority (i.e., a majority or an entirety) of the width W of the track 21. More specifically, in this embodiment, the layer of reinforcing polymeric material 92 occupies the entirety of the width W of the track 21.

Also, in this embodiment, the layer of reinforcing polymeric material 92 may occupy at least a substantial part of each of a plurality of drive/guide-lug-free areas $93_1$-$93_F$ of the inner surface 32, i.e., areas of the inner surface 32 that are disposed between respective ones of the drive/guide lugs $34_1$-$34_D$ and that are free of drive/guide lugs. For instance, the layer of reinforcing polymeric material 88 may occupy at least a majority (i.e., a majority or an entirety) of the width W of the track 21. More specifically, in this embodiment, the layer of reinforcing polymeric material 88 occupies the entirety of the width W of the track 21. Moreover, the layer of reinforcing polymeric material 88 may occupy at least a majority (i.e., a majority or an entirety) of a dimension $D_G$ of a drive/guide-lug-free area $93_i$ in the longitudinal direction of the track 21. In this embodiment, the layer of reinforcing polymeric material 92 occupies the entirety of the dimension $D_G$.

Furthermore, in this embodiment, the layer of reinforcing polymeric material 92 is thin. For instance, a thickness $T_2$ of the layer of reinforcing polymeric material 92 is less than the thickness $T_c$ of the carcass 35. For example, in some cases, a ratio of the thickness $T_2$ of layer of reinforcing polymeric material 92 over the thickness $T_c$ of the carcass 35 may be no more than 0.15, in some cases no more than 0.1, in some cases no more than 0.05 and in some cases even less (e.g., 0.02).

Figure 12:
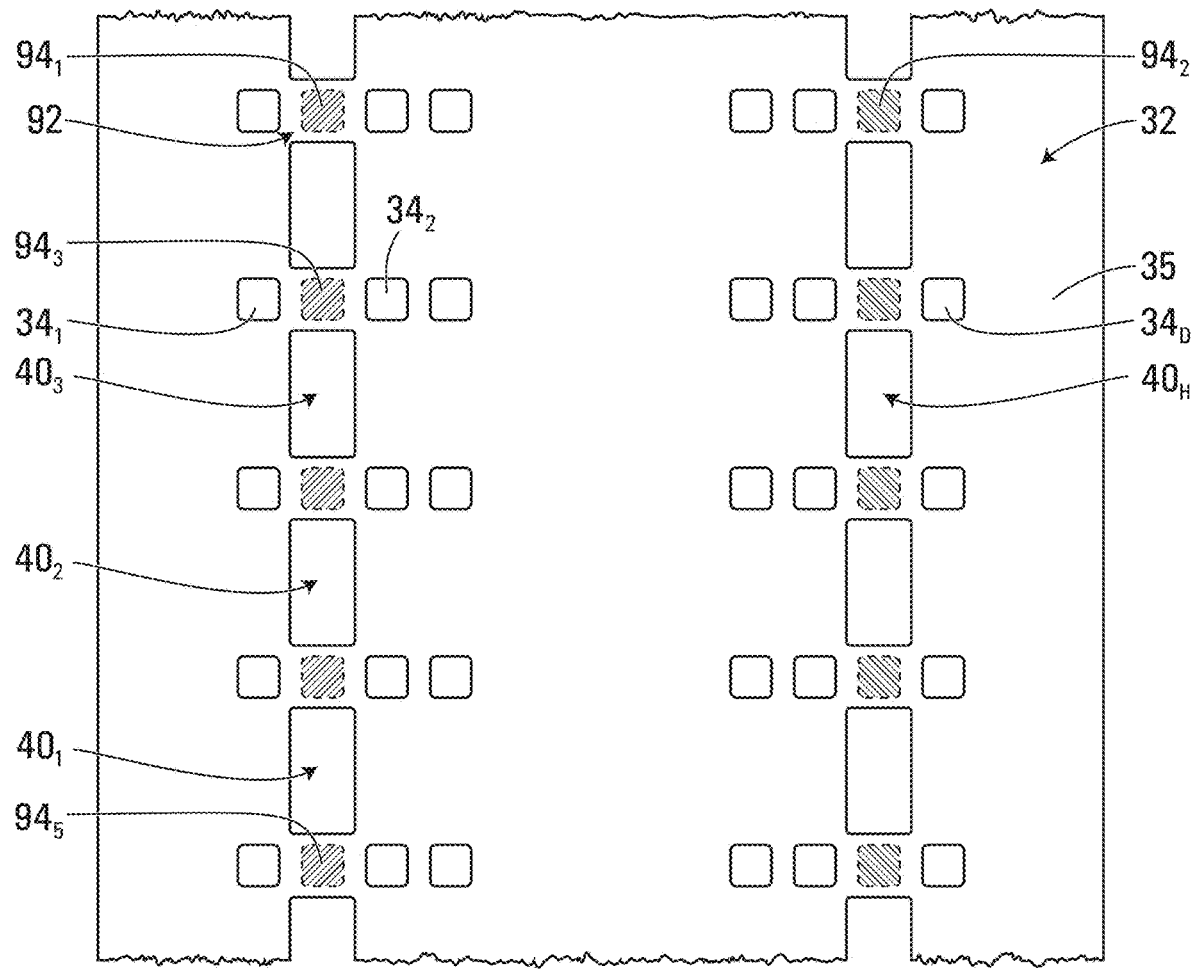
FIG. 12 shows the layer of reinforcing polymeric material of FIG. 11 in accordance with an embodiment in which it includes a plurality of segments that are spaced apart from one another.

As another example, in some embodiments, as shown in FIG. 12, the layer of reinforcing polymeric material 92 may include a plurality of segments $94_1$-$94_s$ that are spaced apart from one another and constitute respective parts of the inner surface 32 of the carcass 35. This may be useful to rigidify, protect and/or otherwise enhance certain regions of the inner surface 32 of the carcass 35.

For instance, in this embodiment, the segments $94_1$-$94_s$ of the layer of reinforcing polymeric material 92 may be disposed to engage the sliding surfaces $77_1$, $77_2$ of the rails $44_1$, $44_2$ and/or the the idler wheels $26_1$, $26_2$, $28_1$-$28_6$ of the track-engaging assembly 24 of the track system 14. This may help to facilitate relative motion (e.g., reduce friction) between the bottom run 66 of the track 21 and the sliding surfaces $77_1$, $77_2$ and/or the the idler wheels $26_1$, $26_2$, $28_1$-$28_6$.

Where a coefficient of friction between the reinforcing polymeric material 51 and the sliding surfaces $77_1$, $77_2$ and/or the the idler wheels $26_1$, $26_2$, $28_1$-$28_6$ is less than a coefficient of friction between the elastomeric material 38 of the carcass 35 and the sliding surfaces $77_1$, $77_2$ and/or the the idler wheels $26_1$, $26_2$, $28_1$-$28_6$, this may help to reduce frictional effects between these components.

More particularly, in this embodiment, the segments $94_1$-$94_s$ of the layer of reinforcing polymeric material 92 are disposed to slide against the sliding surfaces $77_1$, $77_2$ of the rails $44_1$, $44_2$ of the track-engaging assembly 24. This allows the track 21 to be free of slide members (e.g., clips), such as the the slide members $39_1$-$39_S$ discussed above in respect of FIGS. 5 and 6, which could otherwise be used to slide against the sliding surfaces $77_1$, $77_2$ to reduce friction. This freeness from slide members may help to reduce the weight of the track 21.

Figure 13:
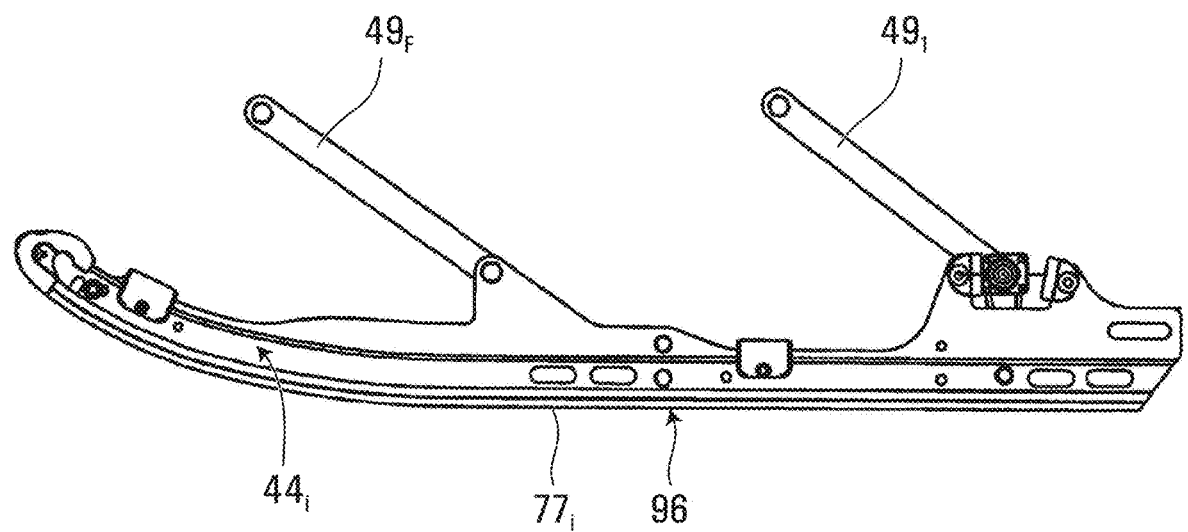
FIG. 13 shows a side elevation view of a rail of the track-engaging assembly of the track system.

In some cases, as shown in FIG. 13, the sliding surfaces $77_1$, $77_2$ of the rails $44_1$, $44_2$ of the track-engaging assembly 24 may be made of a material 96 that slides well against the segments $94_1$-$94_s$ of the inner side 25 of the track 21. For example, in some embodiments, the material 96 of the sliding surfaces $77_1$, $77_2$ of the rails $44_1$, $44_2$ of the track-engaging assembly 24 may be metallic material, such as aluminum.

Figure 14A:
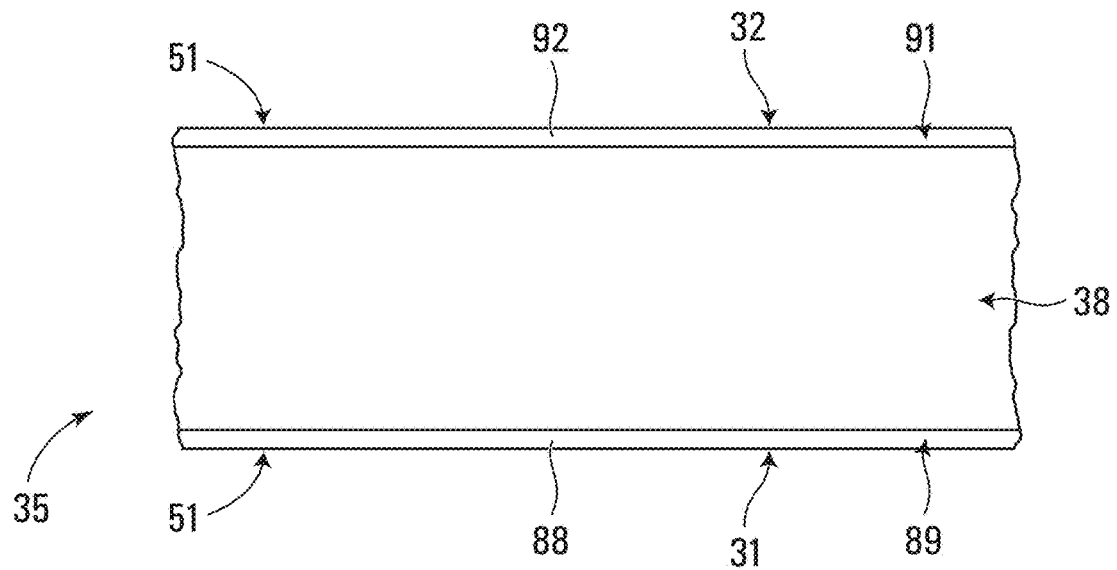
FIGS. 14A to 14C show other embodiments in which the reinforcing material of the track comprises a layer of reinforcing polymeric material constituting at least part of the ground-engaging outer surface of the carcass and a layer of reinforcing polymeric material constituting at least part of the inner surface of the carcass.

As another example, in some embodiments, as shown in FIG. 14A, the reinforcing polymeric material 51 may comprise the layer of reinforcing polymeric material 92 constituting at least part of the inner surface 32 of the carcass 35 and the layer of reinforcing polymeric material 88 constituting at least part of the ground-engaging outer surface 31 of the carcass 35.

In some embodiments, the layer of reinforcing polymeric material 92 constituting at least part of the inner surface 32 of the carcass 35 and the layer of reinforcing polymeric material 88 constituting at least part of the ground-engaging outer surface 31 of the carcass 35 may be substantially identical in thickness and material composition. That is, the thickness $T_1$ of the layer of reinforcing polymeric material 88 is substantially identical to the thickness $T_2$ of the layer of reinforcing polymeric material 92 and a material composition of the layer of reinforcing polymeric material 88 is substantially identical to a material composition of the layer of reinforcing polymeric material 92.

In other embodiments, the layer of reinforcing polymeric material 92 constituting at least part of the inner surface 32 of the carcass 35 and the layer of reinforcing polymeric material 88 constituting at least part of the ground-engaging outer surface 31 of the carcass 35 may differ in thickness and/or material composition. That is, the thickness $T_1$ of the layer of reinforcing polymeric material 88 is different from the thickness $T_2$ of the layer of reinforcing polymeric material 92 and/or the material composition of the layer of reinforcing polymeric material 88 is different from the material composition of the layer of reinforcing polymeric material 92.

For instance, in some embodiments, a stiffness of the layer of reinforcing polymeric material 92 constituting at least part of the inner surface 32 of the carcass 35 may be different from a stiffness of the layer of reinforcing polymeric material 88 constituting at least part of the ground-engaging outer surface 31 of the carcass 35.

Notably, the layer of reinforcing polymeric material 88 constituting at least part of the ground-engaging outer surface 31 of the carcass 35 may be stiffer than the layer of reinforcing polymeric material 92 constituting at least part of the inner surface 32 of the carcass 35. This may be implemented in various ways. For example, the thickness $T_1$ of the layer of reinforcing polymeric material 88 may be greater than the thickness $T_2$ of the layer of reinforcing polymeric material 92. For instance, in some cases, a ratio $T_1/T_2$ of the thickness $T_1$ of the layer of reinforcing polymeric material 88 over the thickness $T_2$ of the layer of reinforcing polymeric material 92 may be at least 1.1, in some cases at least 1.3, in some cases at least 1.5, in some cases at least. 1.7, in some cases at least 2 and in some cases even more.

Alternatively or additionally, a material 89 of the layer of reinforcing polymeric material 88 constituting at least part of the ground-engaging outer surface 31 of the carcass 35 may be stiffer than a material 91 of the layer of reinforcing polymeric material 92 constituting at least part of the inner surface 32 of the carcass 35. For instance, in some cases, a ratio of the modulus of elasticity of the material 89 of the layer of reinforcing polymeric material 88 over the modulus of elasticity of the material 91 of the layer of reinforcing polymeric material 92 may be at least 2, in some cases at least 5, in some cases at least 10, in some cases at least 20, in some cases at least 35 and in some cases even more.

In other embodiments, the layer of reinforcing polymeric material 92 constituting at least part of the inner surface 32 of the carcass 35 may be stiffer than the layer of reinforcing polymeric material 88 constituting at least part of the ground-engaging outer surface 31 of the carcass 35.

For example, the thickness $T_2$ of the layer of reinforcing polymeric material 92 may be greater than the thickness $T_1$ of the layer of reinforcing polymeric material 88. For instance, in some cases, a ratio $T_2/T_1$ of the thickness $T_2$ of the layer of reinforcing polymeric material 92 over the thickness $T_1$ of the layer of reinforcing polymeric material 88 may be at least 1.1, in some cases at least 1.3, in some cases at least 1.5, in some cases at least. 1.7, in some cases at least 2 and in some cases even more.

Alternatively or additionally, the material 91 of the layer of reinforcing polymeric material 92 constituting at least part of the inner surface 32 of the carcass 35 may be stiffer than the material 89 of the layer of reinforcing polymeric material 88 constituting at least part of the ground-engaging outer surface 31 of the carcass 35. For instance, in some cases, a ratio of the modulus of elasticity of the material 91 of the layer of reinforcing polymeric material 92 over the modulus of elasticity of the material 89 of the layer of reinforcing polymeric material 88 may be at least 2, in some cases at least 5, in some cases at least 10, in some cases at least 20, in some cases at least 35 and in some cases even more.

Figure 14B:
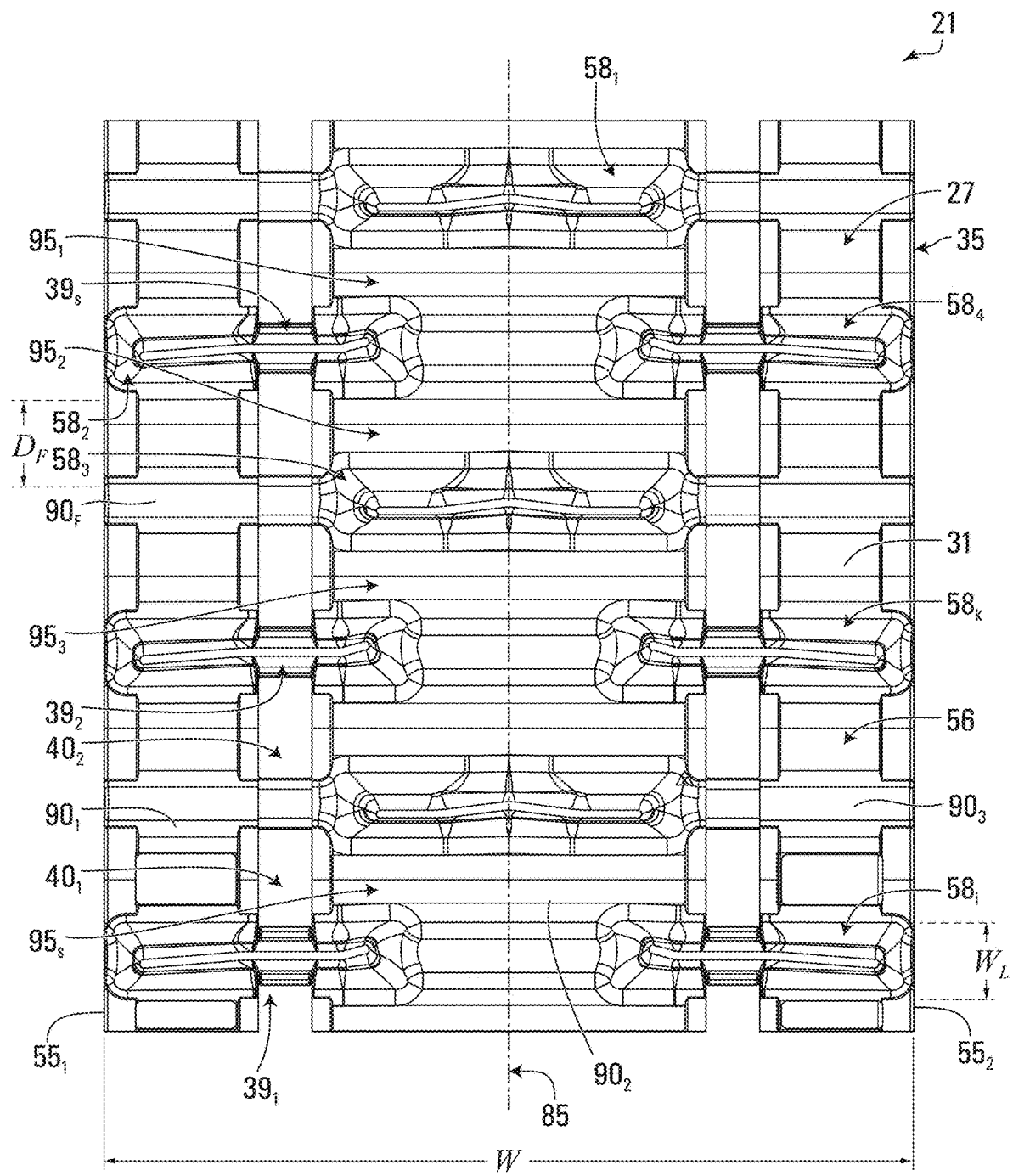
Figure 14C:
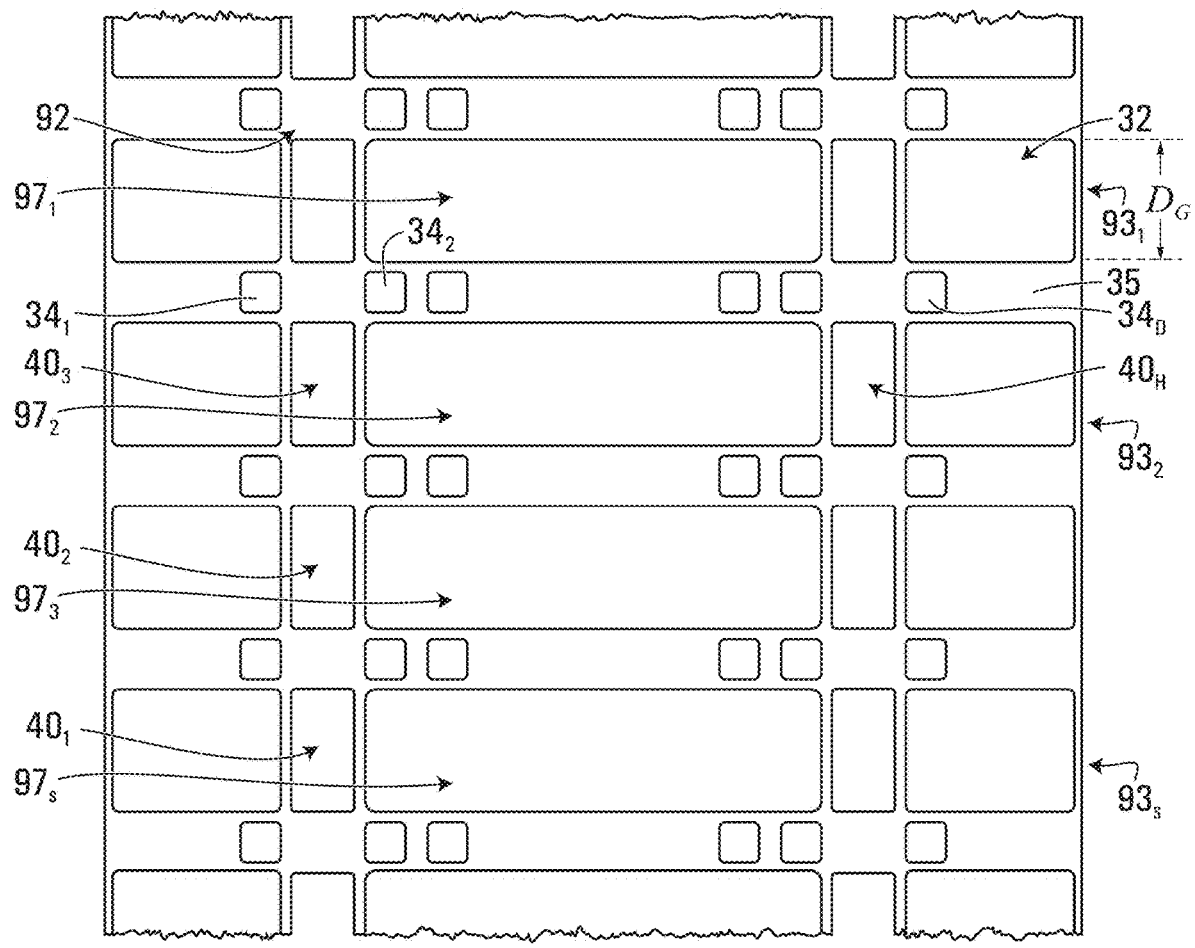

In some embodiments, as shown in FIGS. 14B and 14C, as discussed above, the layer of reinforcing polymeric material 88 may occupy at least a substantial part of each of respective ones of the traction-projection-free areas $90_1$-$90_F$ of the ground-engaging outer surface 31 and the layer of reinforcing polymeric material 92 may occupy at least a substantial part of each of respective ones of the drive/guide-lug-free areas $93_1$-$93_F$ of the inner surface 32. For instance, each of the layer of reinforcing polymeric material 88 and the layer of reinforcing polymeric material 92 may occupy at least a majority (i.e., a majority or an entirety) of the width W of the track 21. More specifically, in this embodiment, each of the layer of reinforcing polymeric material 88 and the layer of reinforcing polymeric material 92 occupies the entirety of the width W of the track 21. Moreover, each of the layer of reinforcing polymeric material 88 and the layer of reinforcing polymeric material 92 may occupy at least a majority (i.e., a majority or an entirety) of each of the dimension $D_F$ of a traction-projection-free area $90_i$ in the longitudinal direction of the track 21 and the dimension $D_G$ of a drive/guide-lug-free area $93_i$ in the longitudinal direction of the track 21. In this embodiment, the layer of reinforcing polymeric material 88 occupies the entirety of the dimension $D_F$ and the layer of reinforcing polymeric material 92 occupies the entirety of the dimension $D_G$. For instance, in this embodiment, the layer of reinforcing polymeric material 88 comprises a plurality of laterally-extending segments $95_1$-$95_S$ (e.g., bands) that are elongated transversally to the longitudinal direction of the track 21 (e.g., in the widthwise direction of the track 21), spaced from one another in the longitudinal direction of the track 21, and disposed between longitudinally-adjacent ones of the traction projections $58_1$-$58_T$, while the layer of reinforcing polymeric material 92 comprises a plurality of laterally-extending segments $97_1$-$97_S$ (e.g., bands) that are elongated transversally to the longitudinal direction of the track 21 (e.g., in the widthwise direction of the track 21), spaced from one another in the longitudinal direction of the track 21, and disposed between longitudinally-successive ones of the drive/guide lugs $34_1$-$34_D$.

2. Traction Projection's Periphery

Figure 15:
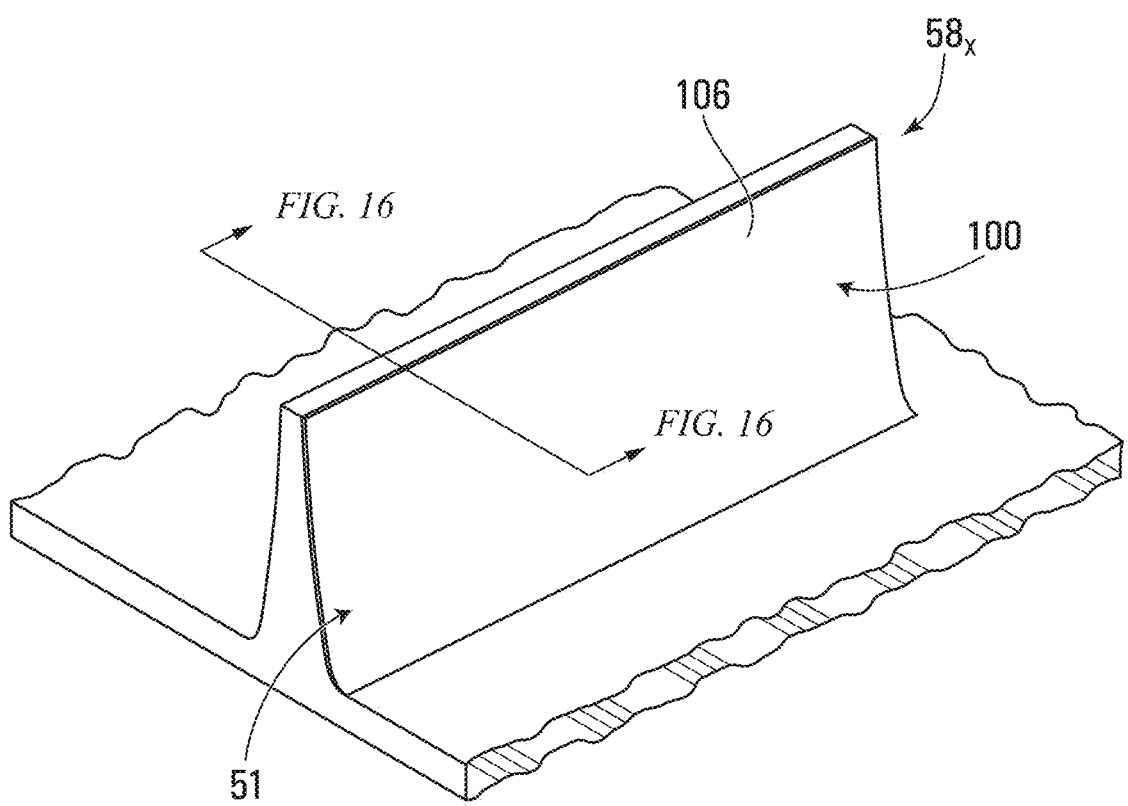
FIG. 15 shows a perspective view of a traction projection of the track where a layer of reinforcing polymeric material of the reinforcing material of the track constitutes at least part of a rear surface of the traction projection.
Figure 16:
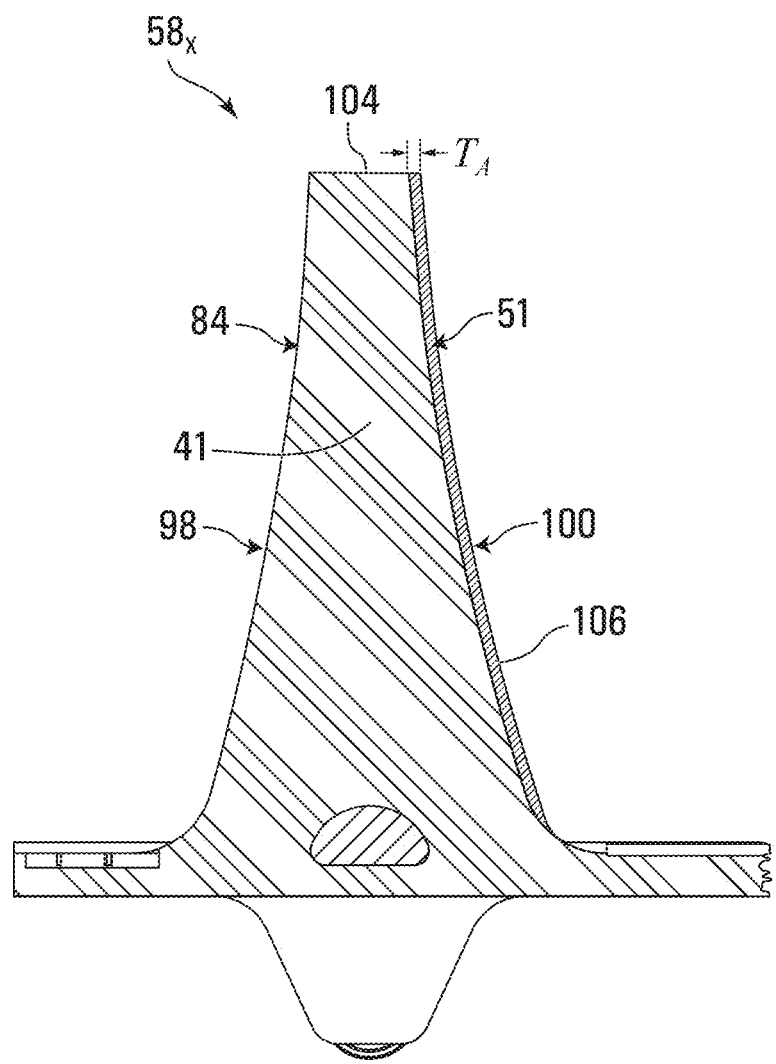
FIG. 16 shows a cross-sectional view of the traction projection as indicated in FIG. 15.

In some embodiments, as shown in FIGS. 15 and 16, the reinforcing polymeric material 51 of the track 21 may constitute at least part of the periphery 84 of a traction projection $58_x$ of the track 21, such as at least part of a front surface 98, a rear surface 100, lateral surfaces $102_1$, $102_2$, and/or a tip 104 of the traction projection $58_x$. This may improve rigidity characteristics of the traction projection $58_x$, improve a resistance to wear of the traction projection $58_x$, and/or reduce a weight of the traction projection $58_x$ and thus the weight of the track 21.

For example, in this embodiment, the reinforcing polymeric material 51 may comprise a layer of reinforcing polymeric material 106 constituting at least part of a given one of the front surface 98 and the rear surface 100 of the traction projection $58_x$, while the other one of the front surface 98 and the rear surface 100 of the traction projection $58_x$ is free of reinforcing polymeric material. More particularly, in this embodiment, the layer of reinforcing polymeric material 106 constitutes at least part of the rear surface 100 of the traction projection $58_x$, while the front surface 98 of the traction projection $58_x$ is free of reinforcing polymeric material.

Where the layer of reinforcing polymeric material 106 is stiffer than the elastomeric material 41 of the traction projection $58_x$, this may help to increase a rigidity of the traction projection $58_x$. Also, in this example, this may make it easier for the traction projection $58_x$ to flex in a given way (e.g., forwardly) in the longitudinal direction of the track 21 than to flex in an opposite way (e.g., rearwardly) in the longitudinal direction of the track 21, thus creating an "asymmetrical" bending stiffness of the traction projection $58_x$.

Where the layer of reinforcing polymeric material 106 is more resistant to wear (e.g., abrasion and/or tearing) than the elastomeric material 41 of the traction projection $58_x$, this may help to protect the traction projection $58_x$ and reduce wear of the traction projection $58_x$ as the track 21 travels on the ground.

This may also help to reduce a size of the traction projection $58_x$, such as by using less of the elastomeric material 41 of the traction projection $58_x$. In turn, this may reduce the weight of the traction projection $58_x$ and, thus, the weight of the track 21.

In this embodiment, the layer of reinforcing polymeric material 106 may occupy at least a majority (i.e., a majority or an entirety) of the length L of the traction projection $58_x$ in the widthwise direction of the track 21. In this embodiment, the layer of reinforcing polymeric material 106 occupies the entirety of the length L.

The layer of reinforcing polymeric material 106 is thin. For instance, in this embodiment, a thickness $T_A$ of the layer of reinforcing polymeric material 106 is less than a dimension $W_L$ of the traction projection $58_x$ in the longitudinal direction of the track 21. For example, in some cases, a ratio $T_A/W_L$ of the thickness $T_A$ of the layer of reinforcing polymeric material 106 over the dimension $W_L$ of the traction projection $58_x$ in the longitudinal direction of the track 21 may be no more than 0.2, in some cases no more than 0.1, in some cases no more than 0.05, in some cases no more than 0.01 and in some cases even less (e.g., 0.004).

Figure 17:
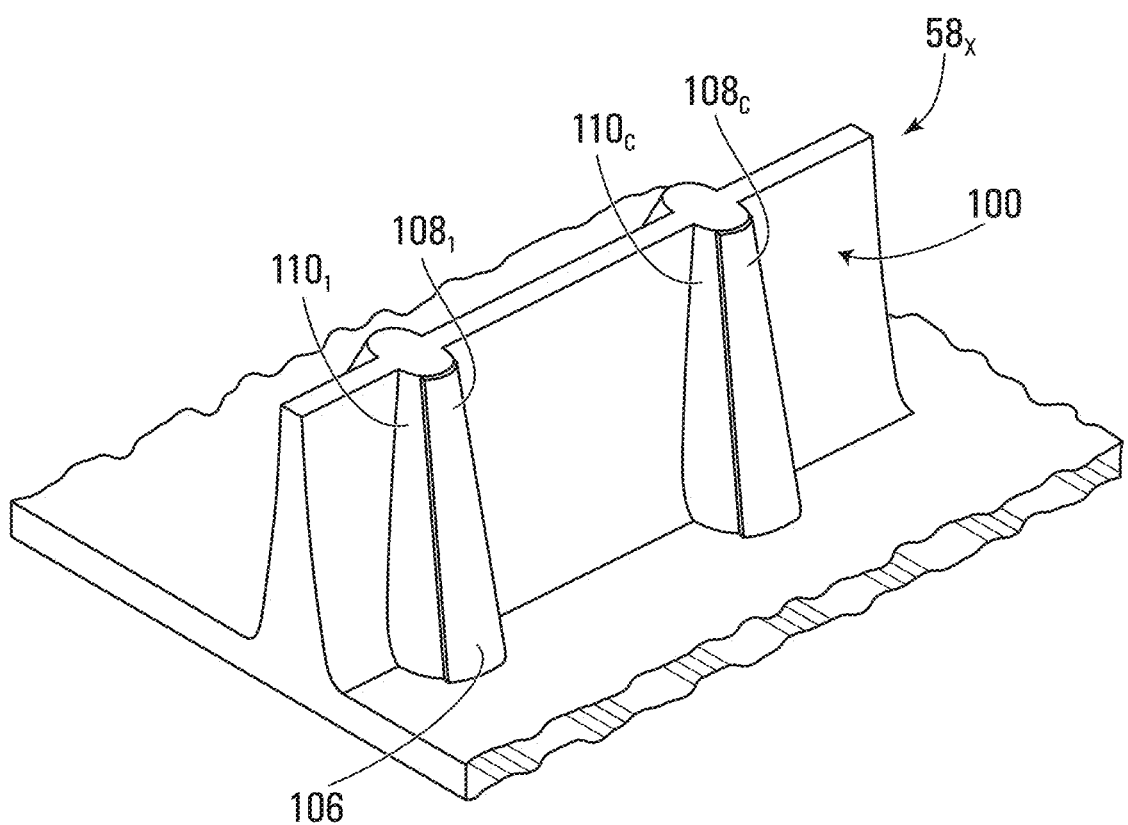
FIG. 17 shows a perspective view of the traction projection of the track in accordance with another embodiment in which a layer of reinforcing polymeric material that constitutes at least part of the rear surface of the traction projection includes a plurality of segments spaced apart from one another.

As another example, in some embodiments, as shown in FIG. 17, the layer of reinforcing polymeric material 106 includes a plurality of segments $108_1$-$108_c$ that are spaced apart from one another and constitute respective parts of the rear surface 100 of the traction projection $58_x$. This may be useful to rigidify, protect and/or otherwise enhance certain regions of the traction projection $58_x$.

Figure 39:
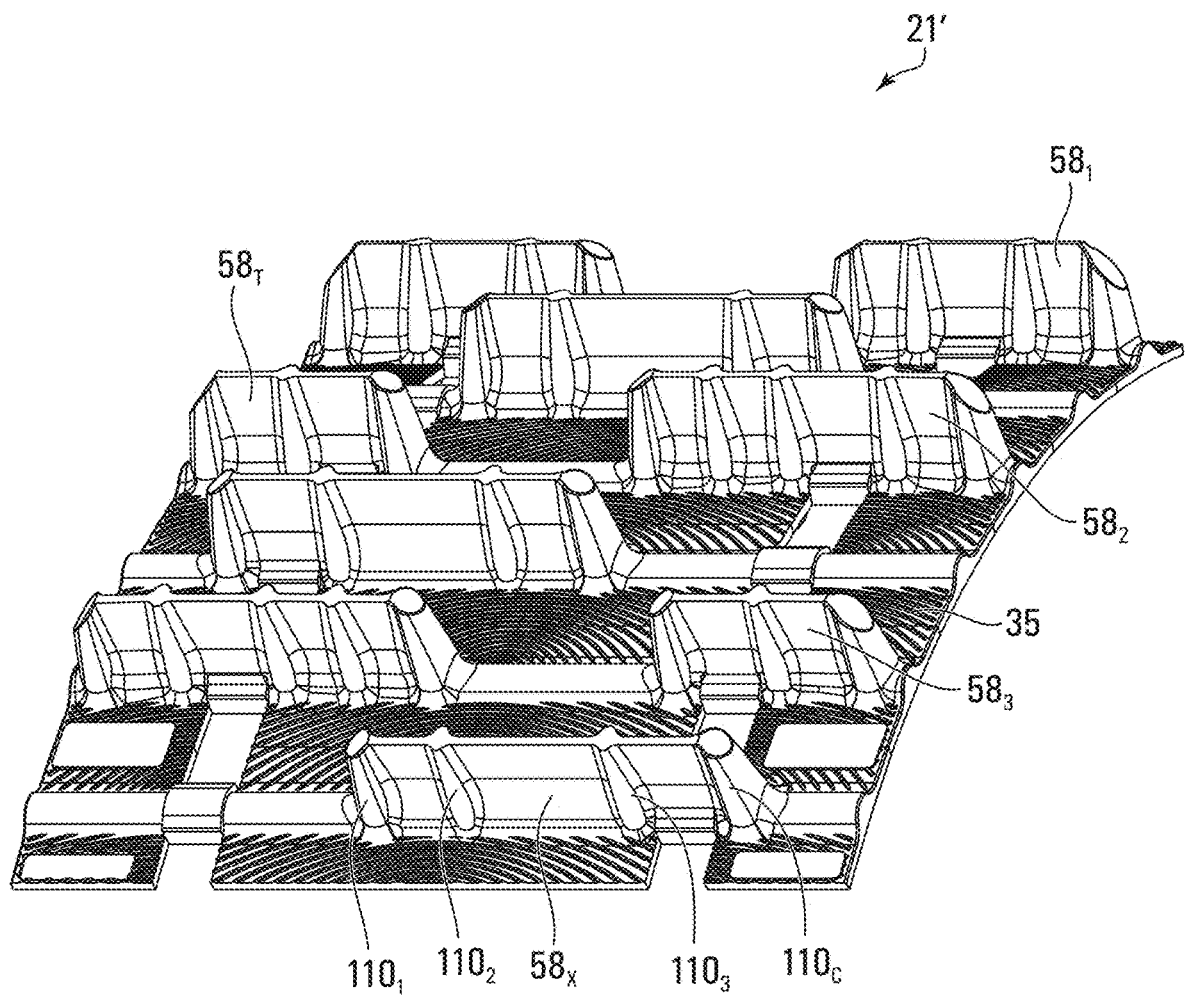
FIG. 39 shows an example of another embodiment in which the traction projections of the track comprise columns.

More particularly, in this embodiment, with additional reference to FIG. 39, the segments $108_1$-$108_c$ are part of columns $110_1$-$110_c$ of the traction projection $58_x$ of a track 21' that is otherwise similar to the track 21. The columns $110_1$-$110_c$ constitute parts of the traction projection $58_x$ that are enlarged relative to a majority of the traction projection $58_x$ in the longitudinal direction of the track 21. In this embodiment, the columns $110_1$-$110_c$ extend in a height direction of the traction projection $58_x$ for a majority (i.e., a majority or an entirety) of the height $H_o$ of the traction projection $58_x$. More specifically, in this embodiment the columns $110_1$-$110_c$ are ribs that rigidify the traction projection $58_x$. The presence of the segments $108_1$-$108_c$ on the columns $110_1$-$110_c$ may further enhance the rigidifying effect that the columns $110_1$-$110_c$ have on the traction projection $58_x$.

Figure 18:
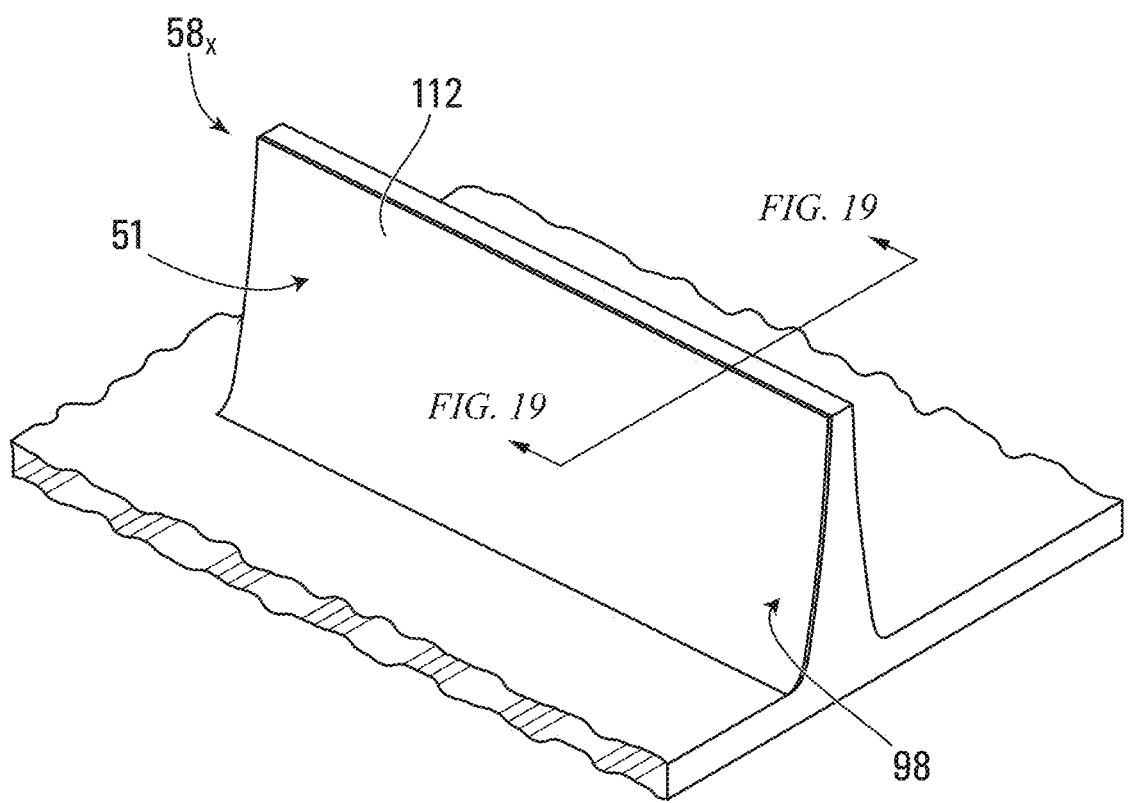
FIG. 18 shows a perspective view of the traction projection of the track in accordance with another embodiment in which a layer of reinforcing polymeric material of the reinforcing material of the track constitutes at least part of a front surface of the traction projection.
Figure 19:
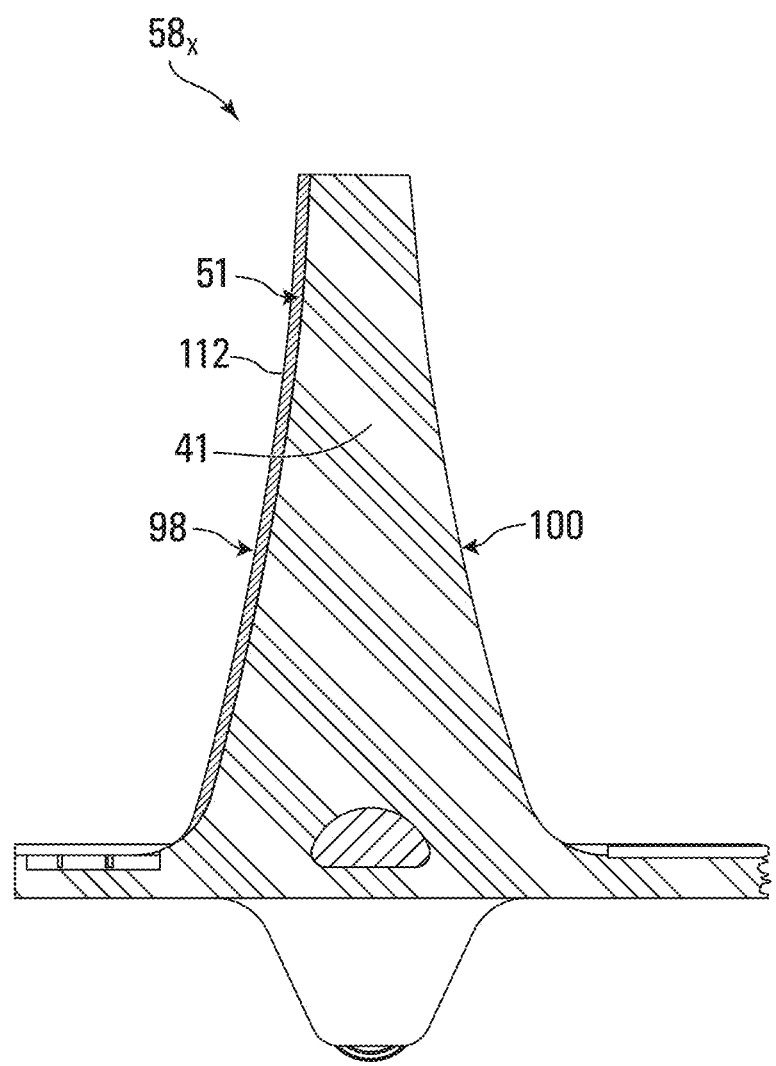
FIG. 19 shows a cross-sectional view of the traction projection as indicated in FIG. 18.
Figure 20:
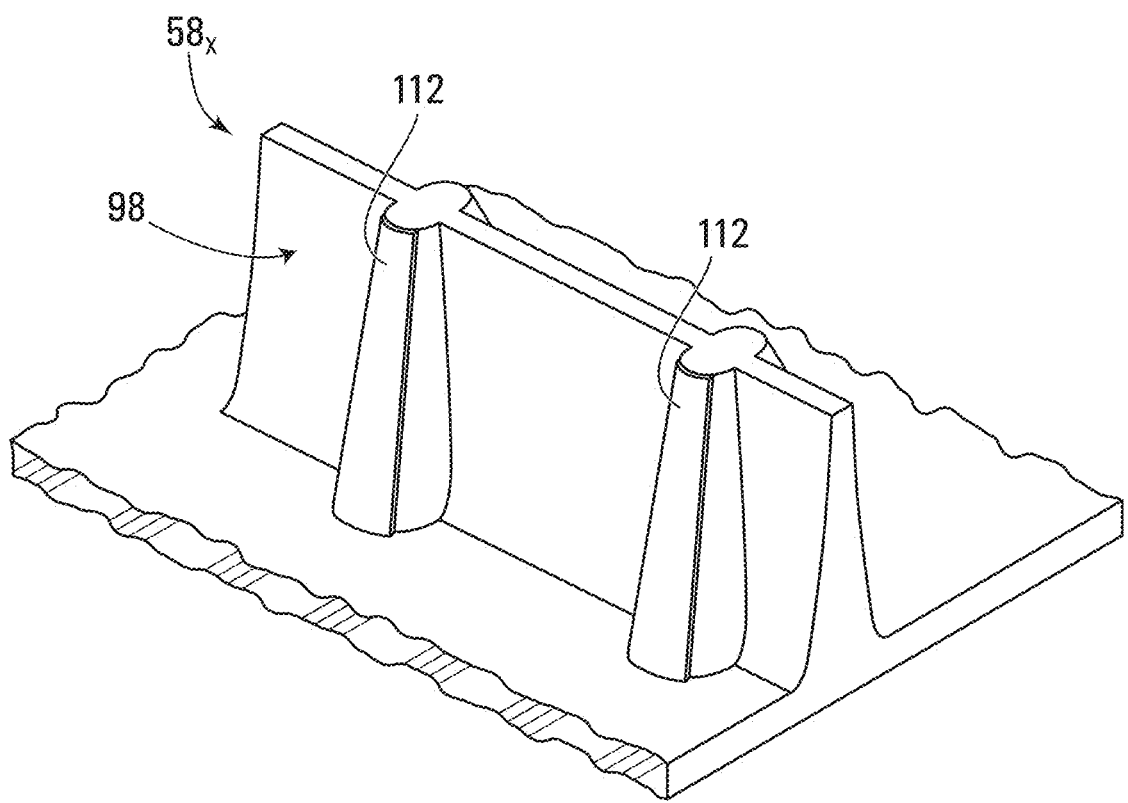
FIG. 20 shows a perspective view of the traction projection of the track in accordance with another embodiment in which a layer of reinforcing polymeric material that constitutes at least part of the front surface of the traction projection includes a plurality of segment spaced apart from one another.

As another example, in some embodiments, as shown in FIGS. 18 to 20, the reinforcing polymeric material 51 may comprise a layer of reinforcing polymeric material 112 constituting at least part of the front surface 98 of the traction projection $58_x$, while the rear surface 100 of the traction projection $58_x$ is free of reinforcing polymeric material. This may have similar effects as described above in respect of the layer of reinforcing polymeric material 106 constituting at least part of the rear surface 100 of the traction projection $58_x$.

Figure 21:
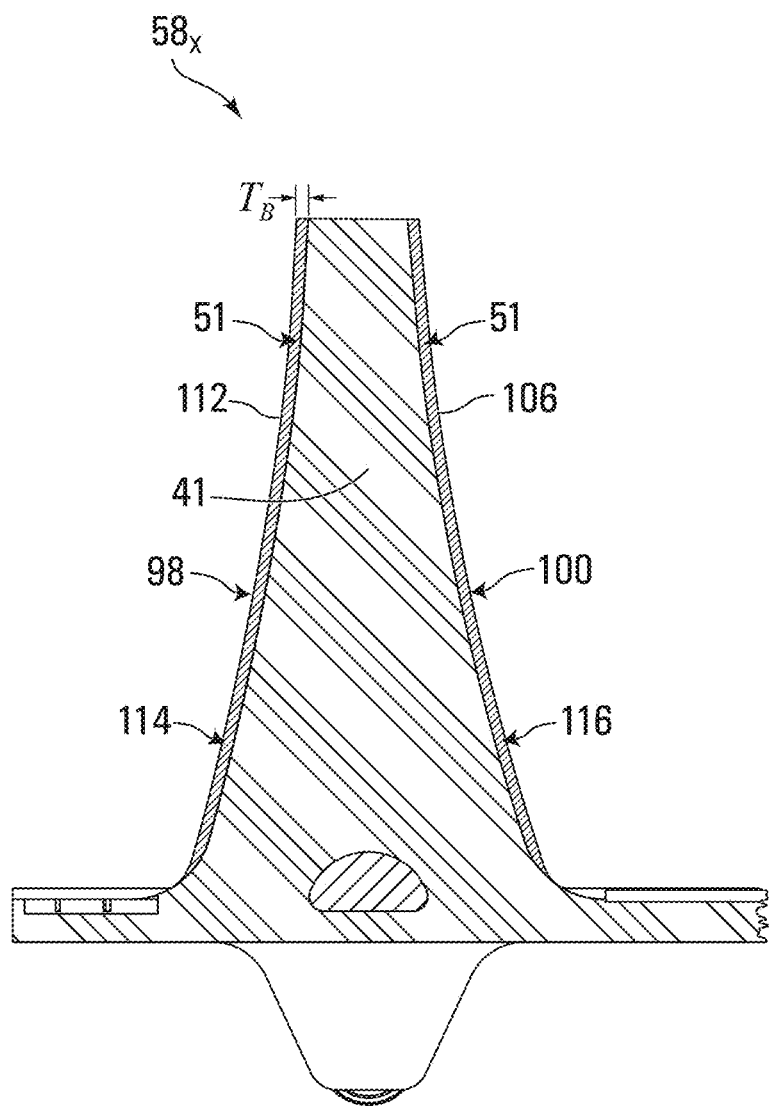
FIG. 21 shows a longitudinal cross-sectional view of the traction projection of the track in accordance with another embodiment in which the reinforcing material of the track comprises a layer of reinforcing polymeric material constituting at least part of the front surface of the traction projection and a layer of reinforcing polymeric material constituting at least part of the rear surface of the traction projection.

As another example, in some embodiments, as shown in FIG. 21, the reinforcing polymeric material 51 may comprise the layer of reinforcing polymeric material 112 constituting at least part of the front surface 98 of the traction projection $58_x$ and the layer of reinforcing polymeric material 106 constituting at least part of the rear surface 100 of the traction projection $58_x$. This may have similar effects as described above.

In some embodiments, the layer of reinforcing polymeric material 106 constituting at least part of the rear surface 100 of the traction projection $58_x$ and the layer of reinforcing polymeric material 112 constituting at least part of the front surface 98 of the traction projection $58_x$ may be substantially identical in thickness and material composition. That is, the thickness $T_A$ of the layer of reinforcing polymeric material 106 is substantially identical to a thickness $T_B$ of the layer of reinforcing polymeric material 112 and a material composition of the layer of reinforcing polymeric material 106 is substantially identical to a material composition of the layer of reinforcing polymeric material 112.

In other embodiments, the layer of reinforcing polymeric material 106 constituting at least part of the rear surface 100 of the traction projection $58_x$ and the layer of reinforcing polymeric material 112 constituting at least part of the front surface 98 of the traction projection $58_x$ may differ in thickness and/or material composition. That is, the thickness $T_A$ of the layer of reinforcing polymeric material 106 is different from the thickness $T_B$ of the layer of reinforcing polymeric material 112 and/or the material composition of the layer of reinforcing polymeric material 106 is different from the material composition of the layer of reinforcing polymeric material 112.

For instance, in some embodiments, a stiffness of the layer of reinforcing polymeric material 106 constituting at least part of the rear surface 100 of the traction projection $58_x$ may be different from a stiffness of the layer of reinforcing polymeric material 112 constituting at least part of the front surface 98 of the traction projection $58_x$.

Notably, the layer of reinforcing polymeric material 112 constituting at least part of the front surface 98 of the traction projection $58_x$ may be stiffer than the layer of reinforcing polymeric material 106 constituting at least part of the rear surface 100 of the traction projection $58_x$. This may be implemented in various ways. For example, the thickness $T_B$ of the layer of reinforcing polymeric material 112 may be greater than the thickness $T_A$ of the layer of reinforcing polymeric material 106. For instance, in some cases, a ratio $T_B/T_A$ of the thickness $T_B$ of the layer of reinforcing polymeric material 112 over the thickness $T_A$ of the layer of reinforcing polymeric material 106 may be at least 1.2, in some cases at least 1.5, in some cases at least 2, in some cases at least 3, in some cases at least 4 and in some cases even more.

Alternatively or additionally, a material 114 of the layer of reinforcing polymeric material 112 constituting at least part of the front surface 98 of the traction projection $58_x$ may be stiffer than a material 116 of the layer of reinforcing polymeric material 106 constituting at least part of the rear surface 100 of the traction projection $58_x$. For instance, in some cases, a ratio of the modulus of elasticity of the material 114 of the layer of reinforcing polymeric material 112 over the modulus of elasticity of the material 116 of the layer of reinforcing polymeric material 106 may be at least 2, in some cases at least 5, in some cases at least 10, in some cases at least 20, in some cases at least 35 and in some cases even more.

In other embodiments, the layer of reinforcing polymeric material 106 constituting at least part of the rear surface 100 of the traction projection $58_x$ may be stiffer than the layer of reinforcing polymeric material 112 constituting at least part of the front surface 98 of the traction projection $58_x$.

For example, the thickness $T_A$ of the layer of reinforcing polymeric material 106 may be greater than the thickness $T_B$ of the layer of reinforcing polymeric material 112. For instance, in some cases, a ratio $T_A/T_B$ of the thickness $T_A$ of the layer of reinforcing polymeric material 106 over the thickness $T_B$ of the layer of reinforcing polymeric material 112 may be at least 1.2, in some cases at least 1.5, in some cases at least 2, in some cases at least 3, in some cases at least 4 and in some cases even more.

Alternatively or additionally, the material 116 of the layer of reinforcing polymeric material 106 constituting at least part of the rear surface 100 of the traction projection $58_x$ may be stiffer than the material 114 of the layer of reinforcing polymeric material 112 constituting at least part of the front surface 98 of the traction projection $58_x$. For instance, in some cases, a ratio of the modulus of elasticity of the material 116 of the layer of reinforcing polymeric material 106 over the modulus of elasticity of the material 114 of the layer of reinforcing polymeric material 112 may be at least 2, in some cases at least 5, in some cases at least 10, in some cases at least 20, in some cases at least 35 and in some cases even more.

Figure 22:
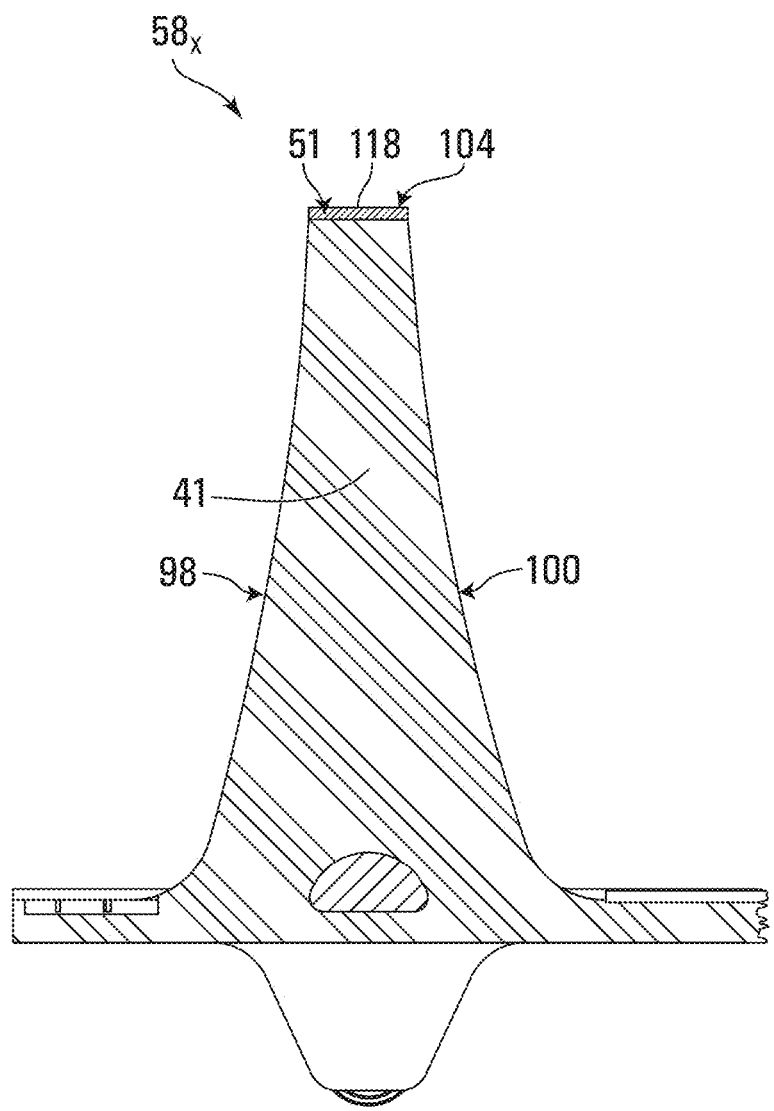
FIG. 22 shows a longitudinal cross-sectional view of the traction projection of the track in accordance with another embodiment in which the reinforcing material of the track comprises a layer of reinforcing polymeric material constituting at least part of a tip of the traction projection.

As another example, in some embodiments, as shown in FIG. 22, the reinforcing polymeric material 51 may comprise a layer of reinforcing polymeric material 118 constituting at least part of the tip 104 of the traction projection $58_x$. This may help to protect the traction projection $58_x$ against wear. This may also help to reduce or avoid markings on the ground by the elastomeric material 41 of the traction projection $58_x$ (e.g., emulating a type of "non-marking" rubber).

Figure 23:
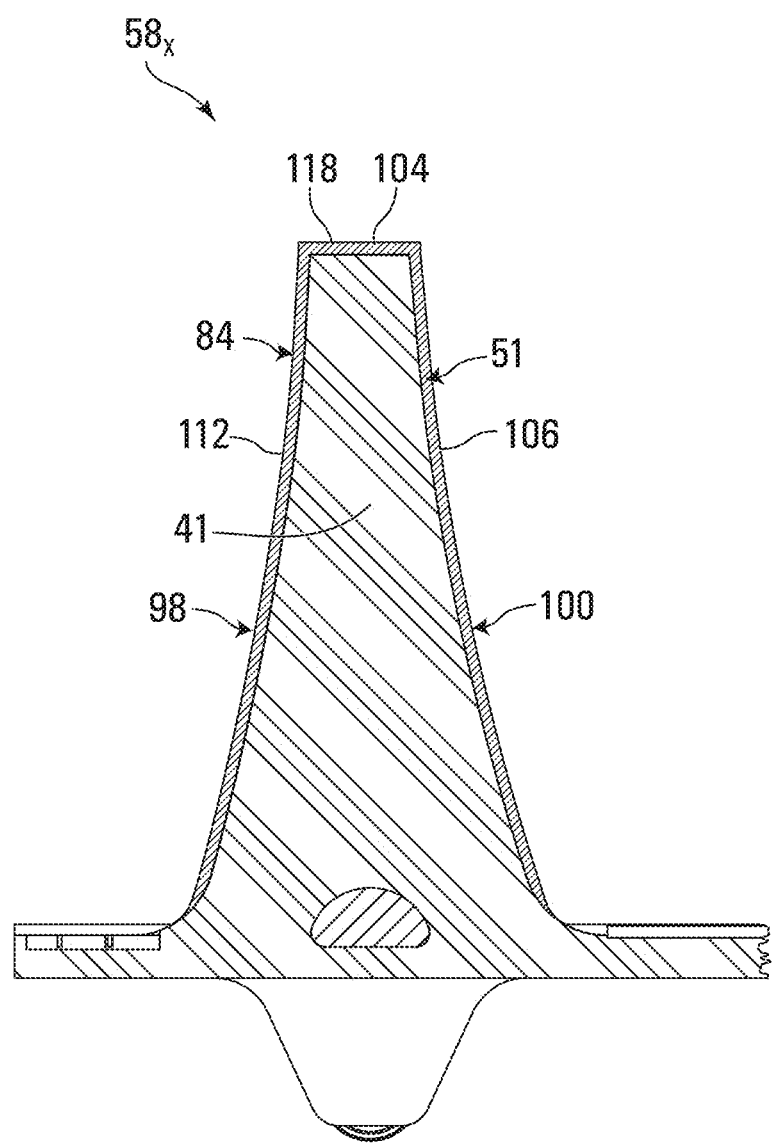
FIG. 23 shows a longitudinal cross-sectional view of the traction projection of the track in accordance with another embodiment in which the reinforcing material of the track comprises a layer of reinforcing polymeric material constituting at least part of the front surface of the traction projection, a layer of reinforcing polymeric material constitutes at least part of the rear surface of the traction projection and a layer of reinforcing polymeric material constitutes at least part of the tip of the traction projection.

As another example, in some embodiments, as shown in FIG. 23, the reinforcing polymeric material 51 may comprise the layer of reinforcing polymeric material 112 constituting at least part of the front surface 98 of the traction projection $58_x$, the layer of reinforcing polymeric material 106 constituting at least part the rear surface 100 of the traction projection $58_x$, and the layer of reinforcing polymeric material 118 constituting at least part of the tip 104 of the traction projection $58_x$.

Figure 24:
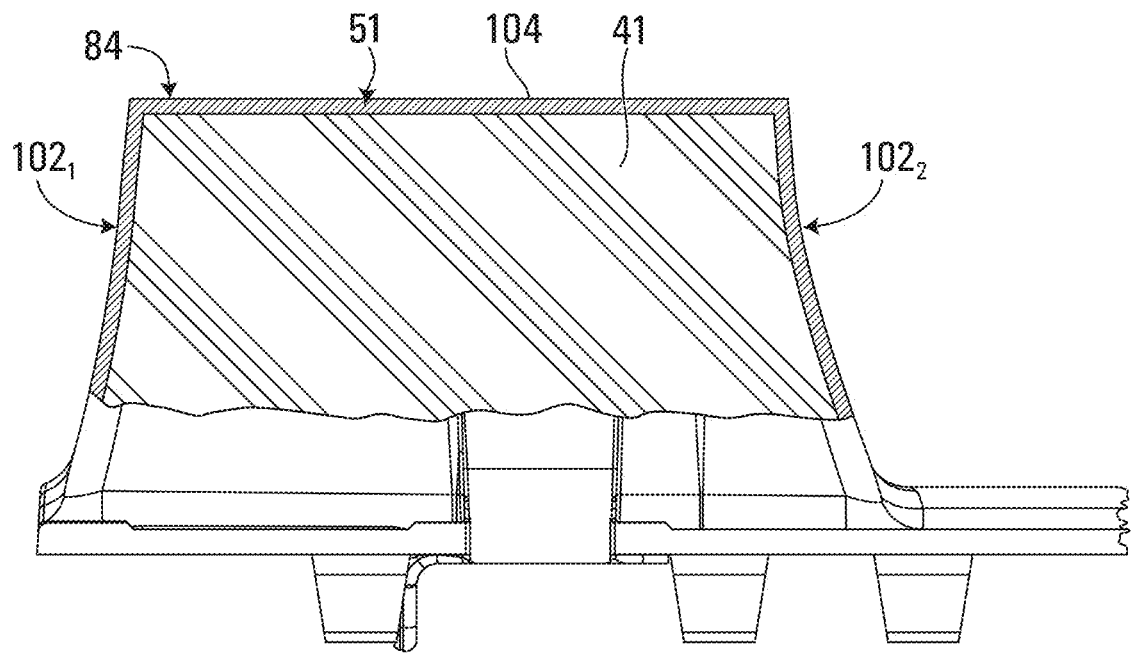
FIG. 24 shows a widthwise cross-sectional view of the traction projection of the track in accordance with another embodiment in which the reinforcing material of the track constitutes an entirety of the periphery of the traction projection.

For instance, in this embodiment, as shown in FIG. 24, the reinforcing polymeric material 51 may constitute at least a majority (e.g. less than an entirety) of the periphery 84 of the traction projection $58_x$. In this example, the reinforcing polymeric material 51 constitutes an entirety of the periphery 84 of the traction projection $58_x$, such that the elastomeric material 41 of the traction projection $58_x$ is completely covered by the reinforcing polymeric material 51.

3. Drive/Guide's Lug Periphery

Figure 25:
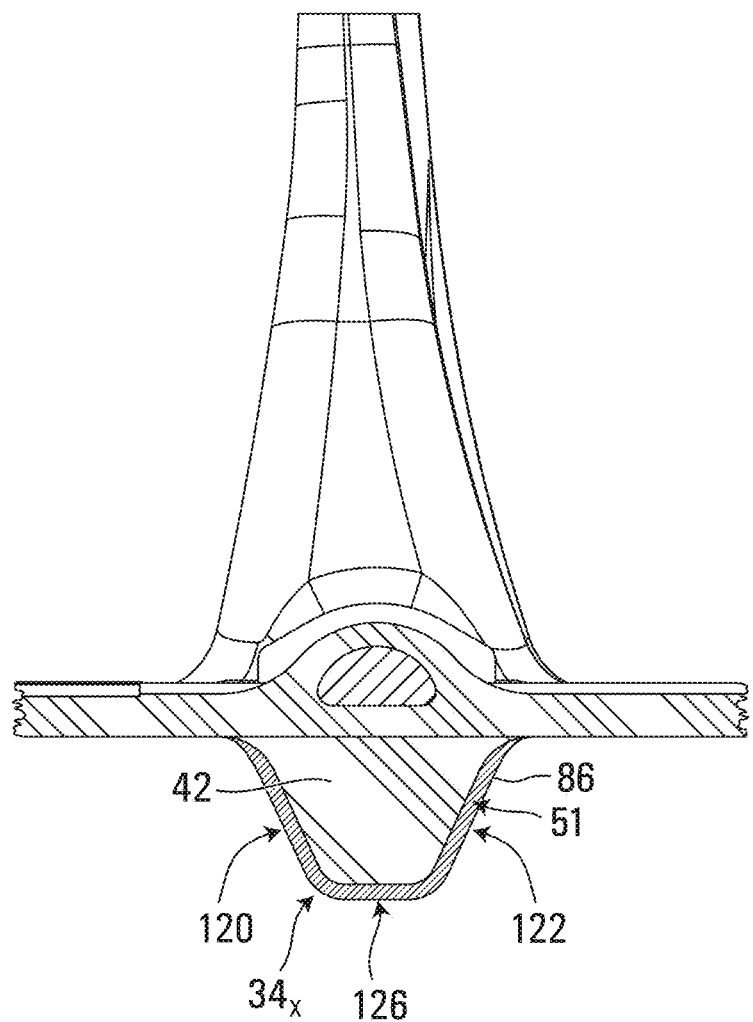
FIGS. 25 and 26 show a longitudinal and a widthwise cross-sectional view of a drive/guide lug of the track in accordance in an embodiment in which the reinforcing material of the track constitutes at least part of a periphery of the drive/guide lug.
Figure 26:
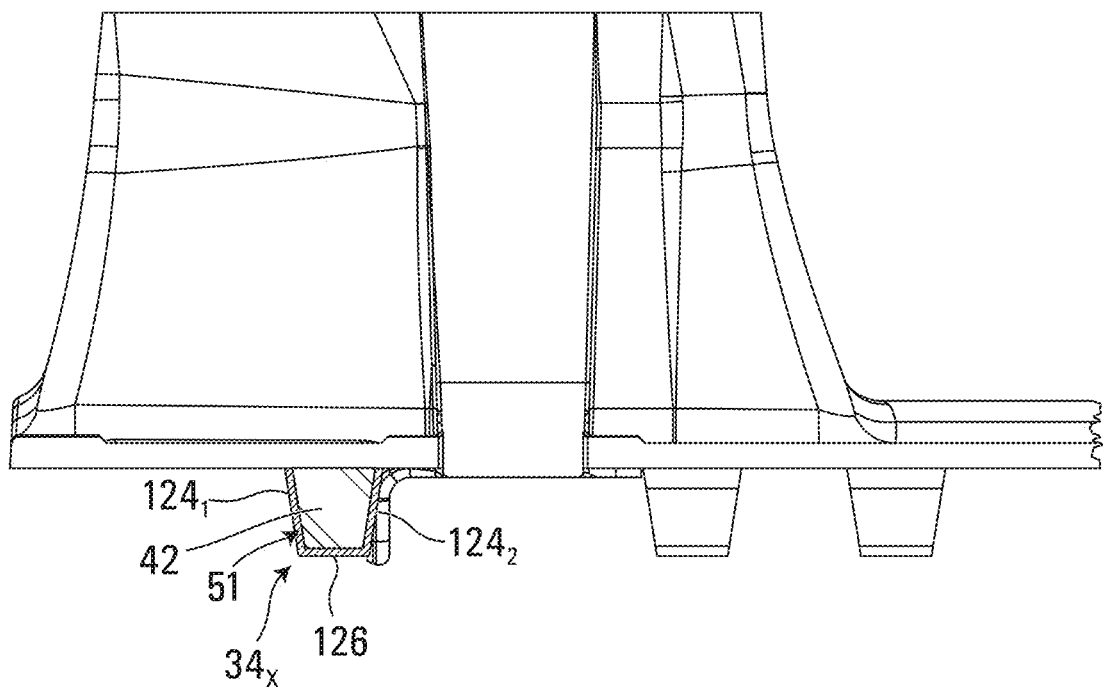

In some embodiments, as shown in FIGS. 25 and 26, the reinforcing polymeric material 51 of the track 21 may constitute at least part of the periphery 86 of a drive/guide lug $34_x$ of the track 21, such as at least part of a front surface 120, a rear surface 122, lateral surfaces $124_1$, $124_2$, and/or a tip 126 of the drive/guide lug $34_x$. This may improve rigidity characteristics of the drive/guide lug $34_x$, improve a resistance to wear of the drive/guide lug $34_x$, and/or reduce a weight of the drive/guide lug $34_x$ and thus the weight of the track 21. This may be effected as discussed above in respect of the reinforcing polymeric material 51 constituting at least part of the periphery 84 of a traction projection $58_x$ of the track 21.

The track 21, including the reinforcing polymeric material 51, may be manufactured in any suitable way.

For example, in some embodiments, as mentioned above, the carcass 35 may be molded into shape in the molding process during which the rubber 38 is cured, such as by consolidating layers of rubber providing the rubber 38 of the carcass 35 in the mold, while the reinforcing cables $37_1$-$37_M$ and the layer of reinforcing fabric 43, and the traction projections $58_1$-$58_T$ and the drive/guide lugs $34_1$-$34_D$ are provided on the ground-engaging outer side 27 and the inner side 25 by being molded with the carcass 35 in the mold. In some examples of implementation, the elastomeric material 41 of one or more of the traction projections $58_1$-$58_T$ and/or the elastomeric material 42 of one or more of the drive/guide lugs $34_1$-$34_D$ may be at least partly formed by the layers of rubber provided in the mold to also provide the rubber 38 of the carcass 35. In other examples of implementation, the elastomeric material 41 of one or more of the traction projections $58_1$-$58_T$ and/or the elastomeric material 42 of one or more of the drive/guide lugs $34_1$-$34_D$ may be at least partly provided by distinct pieces (e.g., blocks) of elastomeric material placed in the mold and spaced in the longitudinal direction of the track 21.

The reinforcing polymeric material 51 may be provided in any suitable way in various embodiments.

Figure 27:
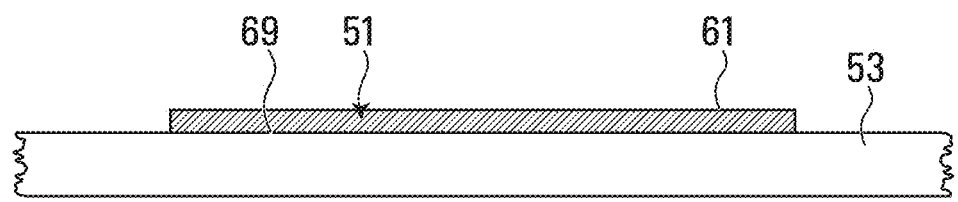
FIG. 27 shows an example of an embodiment in which the reinforcing material of the track is bonded to a portion of an elastomeric material of the track before molding of the track.

For instance, in some embodiments, as shown in FIG. 27, the reinforcing polymeric material 51 may be bonded to a portion 69 of the elastomeric material 53 of the track 21 before molding of the track 21. For instance, in some cases, the layer of reinforcing polymeric material 61 may be provided as a thin sheet bonded to a sheet of the elastomeric material 53. The layer of reinforcing polymeric material 61 may be provided as a thin sheet by calendering or extrusion of the layer of reinforcing polymeric material 61 or in any other suitable manner. The layer of reinforcing polymeric material 61 may be bonded to the sheet of elastomeric material 53 by applying pressure and heat between the layer of reinforcing polymeric material 61 and the sheet of elastomeric material 53. In addition or alternatively, in some cases, an adhesive may be used at an interface between the layer of reinforcing polymeric material 61 and the sheet of elastomeric material 53 in order to bond these to one another.

Figure 28:
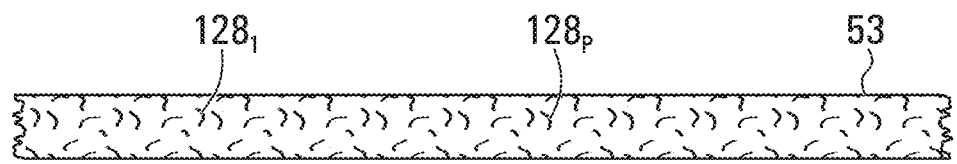
FIG. 28 an example of an embodiment in which the elastomeric material of the track is loaded with particles of reinforcing fabric material.

In some embodiments, as shown in FIG. 28, the elastomeric material 53 of the track 21 may be loaded with particles of reinforcing fabric material $128_1$-$128_P$ that correspond to the reinforcing polymeric material 51 to enhance bonding between the elastomeric material 53 and the reinforcing polymeric material 51. For instance, the rubber 53 may be loaded with the particles of reinforcing fabric material $128_1$-$128_P$ (e.g., in powder form) during manufacturing of the rubber 53. Upon the sheet of reinforcing polymeric material 61 being provided on the sheet of rubber 53 (e.g., during calendering or otherwise), the sheet of reinforcing polymeric material 61 chemically interacts with the particles of reinforcing fabric material $128_1$-$128_P$ in the sheet of rubber 53 to enhance their bonding.

In addition to enhancing the track 21, in some embodiments, the reinforcing polymeric material 51 may act as an unmolding agent (i.e., mold release agent) that facilitates release and removal of the track 21 from the mold upon completion of the molding process.

For instance, a friction coefficient between the reinforcing polymeric material 51 and a material of the mold in which the track 21 is molded may be lower than a friction coefficient between the elastomeric material 53 of the track 21 and the material of the mold. This may allow the molding process of the track 21 to be carried out without or with less of conventional mold release agent such as a silicone based release agent (e.g., a silicone resin) or polytetrafluoroethylene (PTFE).

The track 21, including the reinforcing material 51, may be implemented in various other ways in other embodiments.

For example, the reinforcing material 51 may be disposed elsewhere than at the periphery 80 of the track 21 (e.g., instead of or in addition to being disposed at the periphery 80 of the track 21). For example, the reinforcing material 51 may be disposed internally within the carcass 35, a traction projection $58_x$ or a drive/guide lug $34_x$ As another example, the reinforcing material 51 may include two or more different constituents. For example, the reinforcing material 51 may include a plurality of layers of reinforcing polymeric material $130_1$-$130_L$, where reinforcing polymeric materials of these layers are different from one another.

Figure 29:
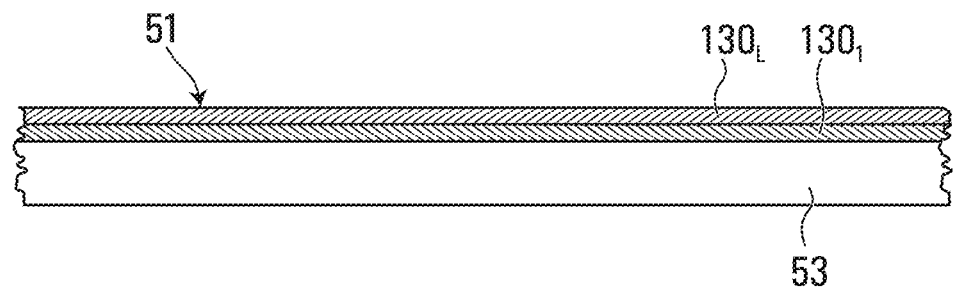
FIG. 29 shows an example of an embodiment in which the reinforcing material of the track includes a plurality of layers of reinforcing polymeric material that are adjacent to one another.
Figure 30:
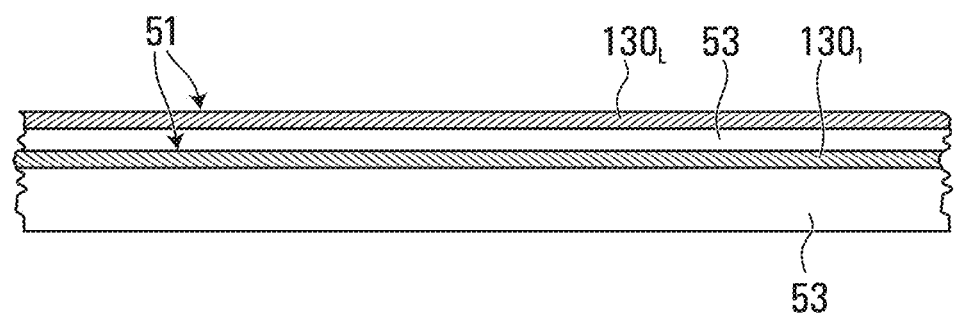
FIG. 30 shows an example of an embodiment in which the reinforcing material of the track includes a plurality of layers of reinforcing polymeric material that are spaced apart from one another.

For instance, in one example of implementation, as shown in FIG. 29, the layers of reinforcing polymeric material $130_1$-$130_L$ may be adjacent to one another (e.g., stacked). Alternatively, in another example of implementation, as shown in FIG. 30, the layers of reinforcing polymeric material $130_1$-$130_L$ may be spaced apart from one another.

Figure 31:
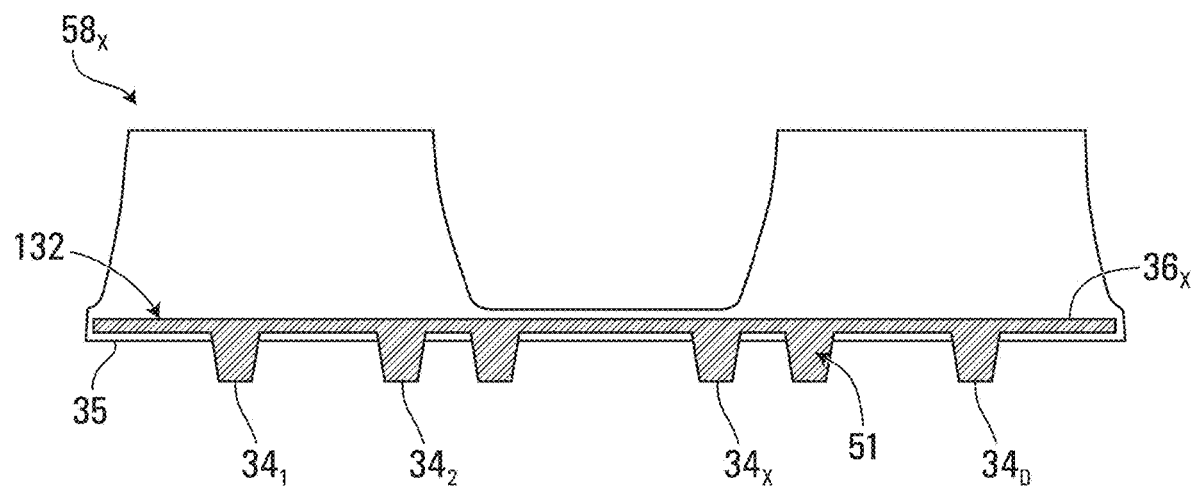
FIG. 31 shows an example of an embodiment in which the reinforcing material of the track constitutes at least part of a reinforcement embedded in the carcass of the track and selected drive/guide lugs of the track.
Figure 32:
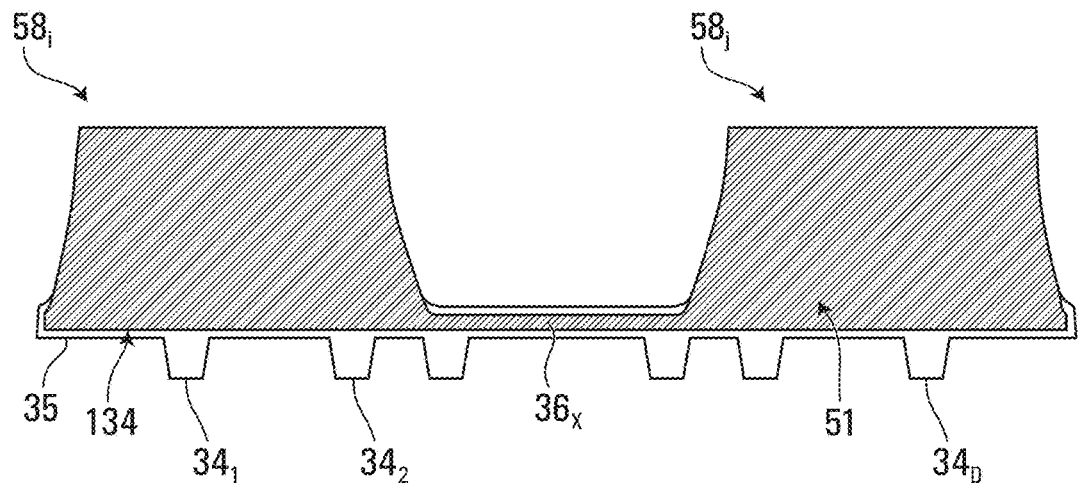
FIG. 32 shows an example of an embodiment in which the reinforcing material of the track constitutes at least part of a reinforcement embedded in the carcass of the track and selected traction projections of the track.
Figure 33:
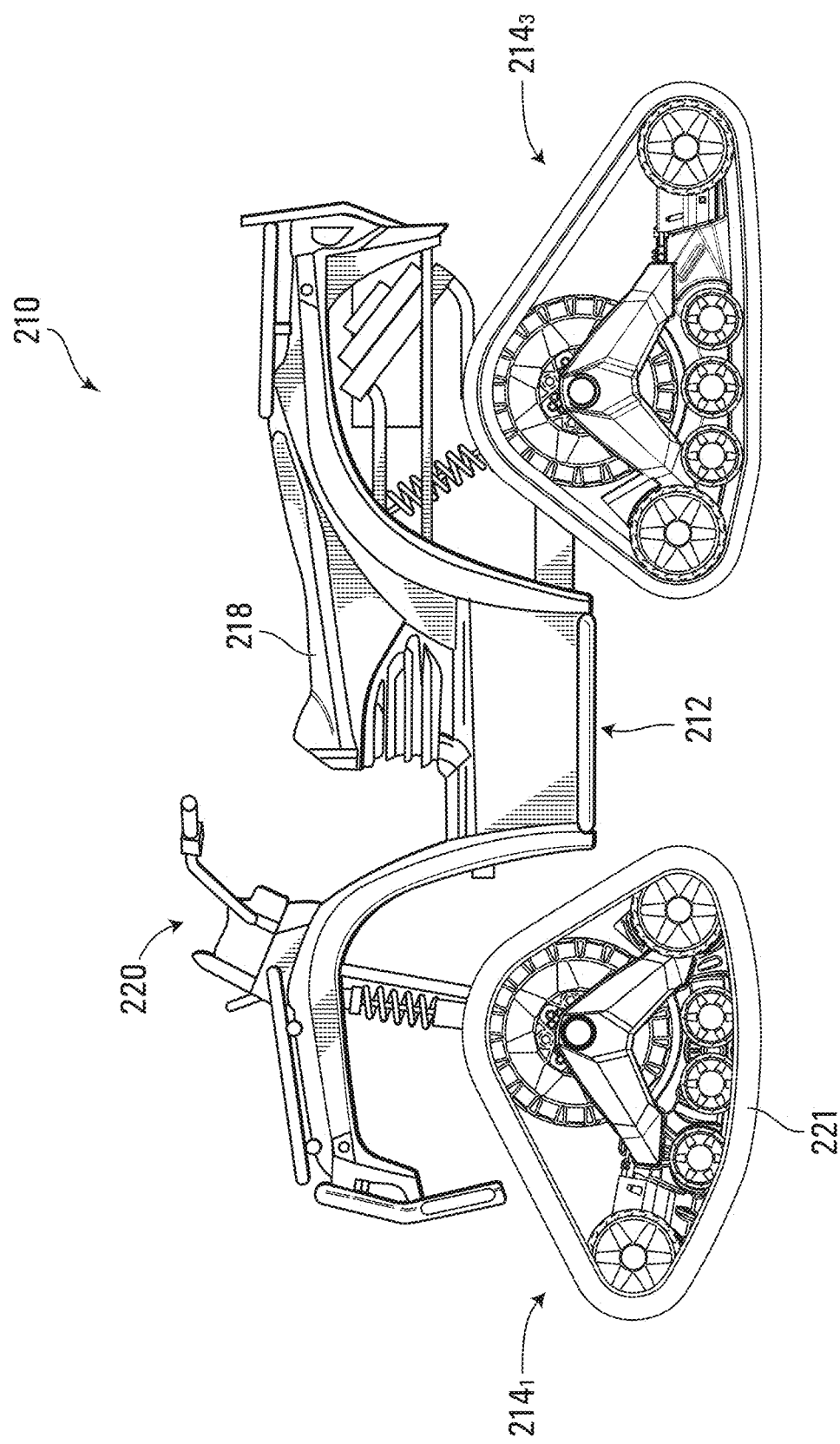
FIGS. 33 to 36 show an example of an all-terrain vehicle (ATV) comprising track systems in accordance with another embodiment of the invention, instead of being equipped with ground-engaging wheels.
Figure 34:
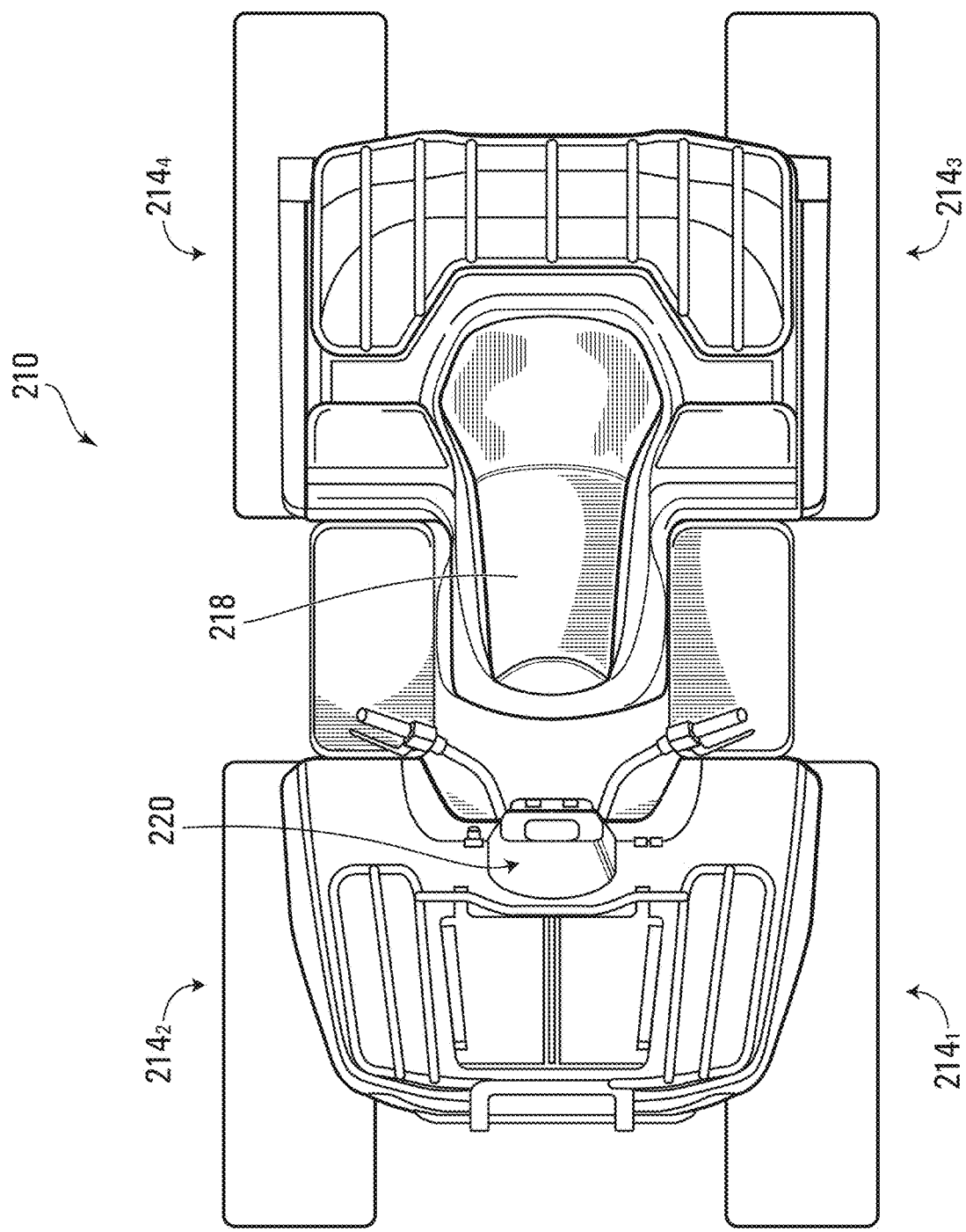
Figure 35:
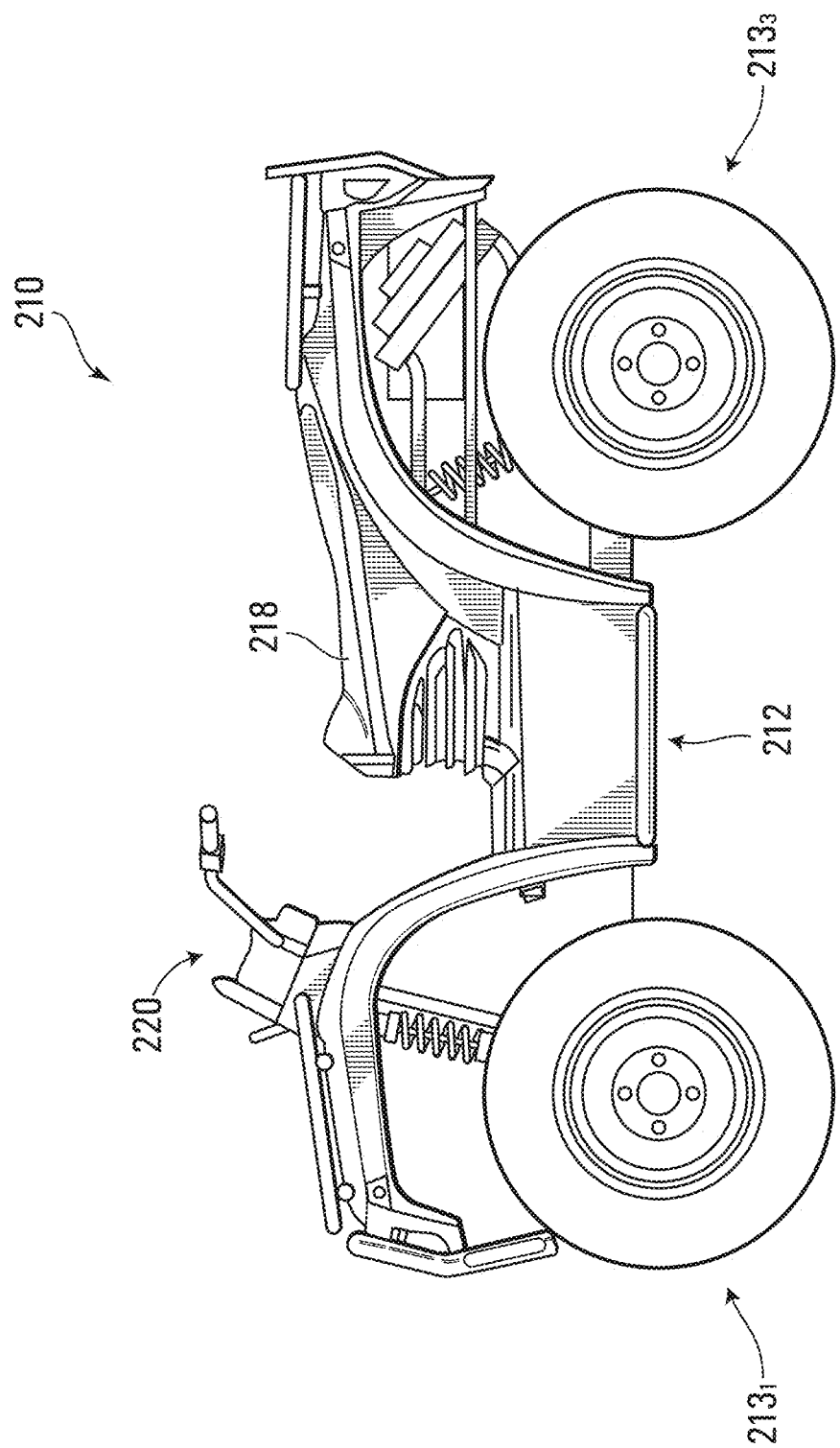
Figure 36:
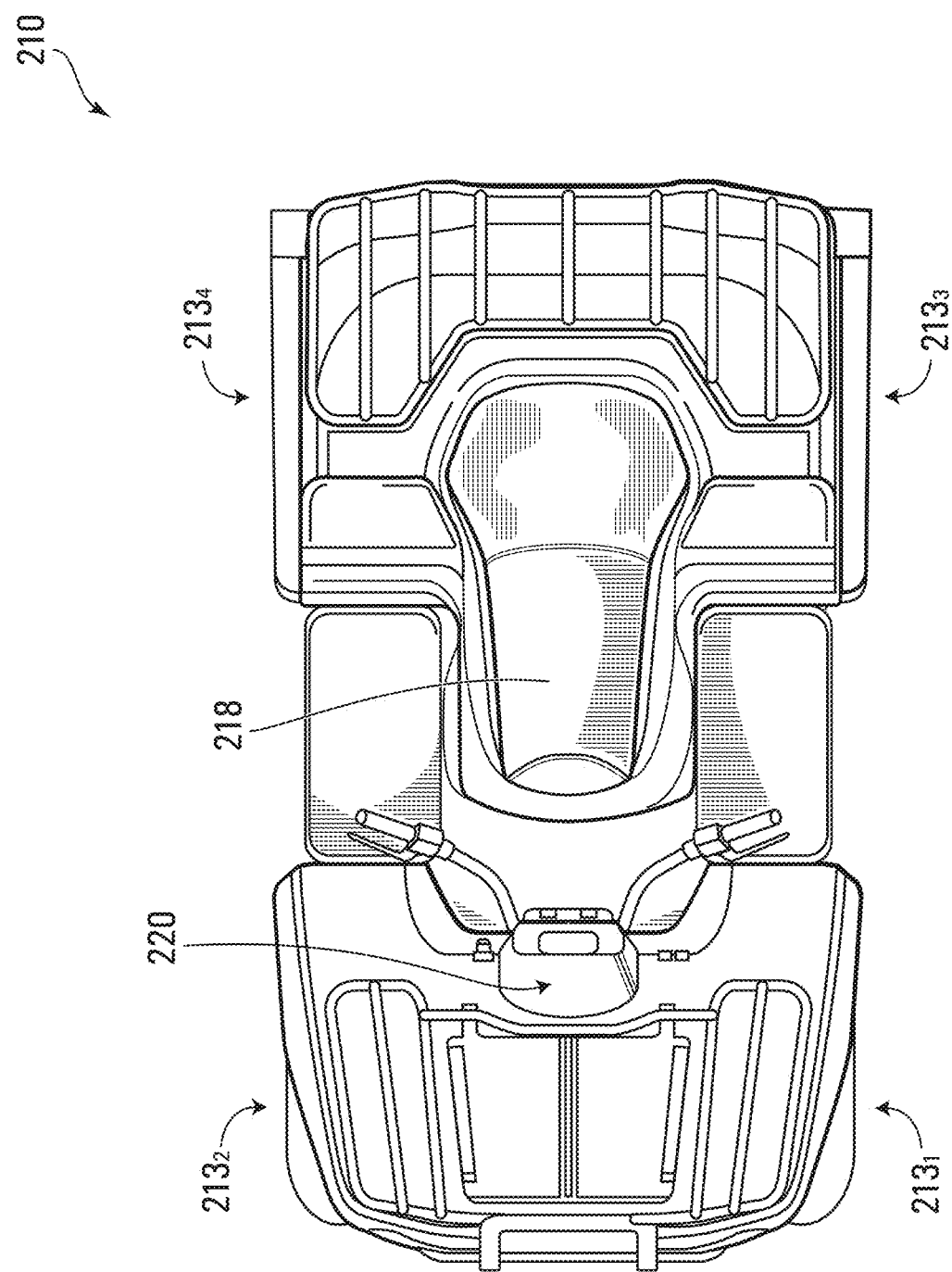

As another example, in some embodiments, as shown in FIGS. 31 and 32, the reinforcing material 51 may constitute (i) at least part of a reinforcement $45_x$ embedded in the rubber 38 of the carcass 35 and (ii) at least part of a drive/guide lug $34_x$ and/or at least part of a traction projection $58_x$ that are integral with one another such that they are a one-piece structure, i.e., (1) the reinforcement $45_x$ and (2) the drive/guide lug $34_x$ and/or the traction projection $58_x$ are a single unitary piece. This may help to enhance the rigidity characteristics of the track 21.

For instance, in this embodiment, the reinforcing material 51 may constitute at least part of a transversal stiffening rod $36_x$ and at least part of the drive/guide lugs $34_1$-$34_D$ that are integral with one another such that they are a one-piece structure. That is, in this example of implementation, as shown in FIG. 31, the transversal stiffening rod $36_x$ and selected ones of the drive/guide lugs $34_1$-$34_D$ aligned with the transversal stiffening rod $36_x$ in the longitudinal direction of the track 21 constitute a single integral component 132 comprising the reinforcing material 51. This may be achieved, for example, by molding the transversal stiffening rod $36_x$ and the selected ones of the drive/guide lugs $34_1$-$34_D$ together out of the reinforcing material 51 to obtain the single integral component 132 which comprises the transversal stiffening rod $36_x$ and the selected ones of the drive/guide lugs $34_1$-$34_D$. The single integral component 132 may then be overmolded by the elastomeric material 53 to form the track 21.

While in the embodiment of FIG. 31, the drive/guide lugs $34_1$-$34_D$ are shown as being made entirely of the reinforcing material 51, this may not necessarily be the case. For instance, in some cases, the reinforcing material 51 may be provided only along the periphery 86 the drive/guide lugs $34_1$-$34_D$ (e.g., as a thin sheet) such as to cover at least partially (or entirely) the elastomeric material 42 of the drive/guide lugs $34_1$-$34_D$. In order to achieve such a configuration, the reinforcing material 51 constituting the transversal stiffening rod $36_x$ and the selected ones of the drive/guide lugs $34_1$-$34_D$ may first be molded over the elastomeric material 42 of the drive/guide lugs $34_1$-$34_D$.

In some embodiments, as shown in FIG. 32, the reinforcing material 51 may constitute at least part of a transversal stiffening rod $36_x$ and at least part of the traction projections $58_1$-$58_T$ that are integral with one another such that they are a one-piece structure. That is, the transversal stiffening rod $36_x$ and selected ones of the traction projections $58_1$-$58_T$ aligned with the transversal stiffening rod $36_x$ in the longitudinal direction of the track 21 constitute a single integral component 134 comprising the reinforcing material 51. This may be achieved, for example, by molding the transversal stiffening rod $36_x$ and the selected ones of the traction projections $58_1$-$58_T$ together out of the reinforcing material 51 to obtain the single integral component 134 which comprises the transversal stiffening rod $36_x$ and the selected ones of the traction projections $58_1$-$58_T$. The single integral component 134 may then be overmolded by the elastomeric material 53 to form the track 21.

While in the embodiment of FIG. 32, the traction projections $58_1$-$58_T$ are shown as being made entirely of the reinforcing material 51, this may not necessarily be the case. For instance, in some cases, the reinforcing material 51 may be provided only along the periphery 84 the traction projections $58_1$-$58_T$ (e.g., as a thin sheet) such as to cover at least partially (or entirely) the elastomeric material 41 of the traction projections $58_1$-$58_T$. In order to achieve such a configuration, the reinforcing material 51 constituting the transversal stiffening rod $36_x$ and the selected ones of the traction projections $58_1$-$58_T$ may first be molded over the elastomeric material 41 of the traction projections $58_1$-$58$-$_T$.

In some variants, the reinforcing material 51 may be used similarly as discussed above with respect to previously-presented embodiments, but may be implemented differently. For instance, in some variants, the reinforcing material 51 may be at least partly elastomeric (i.e., part or all of the reinforcing material 51 may be elastomeric). For example, in some embodiments, the reinforcing material 51 may be at least predominantly (i.e., predominantly or entirely) elastomeric. In some cases, the reinforcing material 51 may include an elastomeric substance, alone or in combination with one or more other materials such as one or more performance additives.

For instance, in some embodiments, this may help to have improved heat dissipation and/or reduced heat build-up, improved resistance to abrasion, cutting, chipping, chunking and/or tearing.

As an example, in some embodiments, in variants shown in FIGS. 41 to 51, the reinforcing material 51, which is denoted 51', is an elastomeric material that is different from the elastomeric material 53 of the track 21 and includes an elastomeric matrix 71 and reinforcing particles $63_1$-$63_P$ embedded in the elastomeric matrix 71. The reinforcing elastomeric material 51' may overly the elastomeric material 53 and constitute at least part of the periphery 80 of the track 21, such as at least part of the periphery 82 of the carcass 35, the periphery 84 of a traction projection $58_x$ and/or the periphery 86 of a drive/guide lug $34_x$, as discussed above.

This may have certain similarities to the embodiment shown in FIG. 28 where the elastomeric material 53 of the track 21 is loaded with the particles of reinforcing fabric material $128_1$-$128_P$, except that, in this embodiment, the elastomeric material 53 of the track 21 is free of (i.e., substantially does not contain) reinforcing particles. That is, the elastomeric material 53 of the track 21 is purely elastomeric without reinforcing particles, while the reinforcing elastomeric material 51', including its reinforcing particles $63_1$-$63_P$, overlies the elastomeric material 53. Thus, in this embodiment, the reinforcing elastomeric material 51', including its reinforcing particles $63_1$-$63_P$, constitutes a much smaller portion of the track 21 than the elastomeric material 53, which has no reinforcing particles and forms a bulk of the track 21. This may help to benefit from desired effects of the reinforcing particles $63_1$-$63_P$ while managing the weight of the track 21.

More particularly, in this variant, the elastomeric matrix 71 of the reinforcing material 51' includes rubber 38. Various rubber compounds may be used and, in some cases, different rubber compounds may be present in the elastomeric matrix 71. For instance, the elastomeric matrix 71 may include a mixture of different rubber compounds in an uncured state, or a plurality of pre-cured layers or parts (e.g. pre-cured calendered layers or parts) of rubber compounds differing (or identical) in their composition such as to form the elastomeric matrix 71 of the reinforcing material 51' once cured. In other variants, the elastomeric matrix 71 may include another elastomer in addition to or instead of rubber 38 (e.g., polyurethane elastomer).

The reinforcing particles $63_1$-$63_P$ enhance overall properties of the reinforcing material 51' compared to the elastomeric matrix 71 alone, and in turn to one or more components of the track 21 that are at least partly constituted of the reinforcing material 51'. For instance, in some cases, this may help to improve heat dissipation, reduce heat build-up, improve a resistance to abrasion, cutting, chipping, chunking and/or tearing of the one or more components of the track 21, such as the carcass 35, the traction projections $58_1$-$58_T$ and/or the drive/guide lugs $34_1$-$34_D$ which may be constituted at least in part of the reinforcing material 51'.

In this variant, the reinforcing particles $63_1$-$63_P$ are polymeric reinforcing particles $63_1$-$63_P$. More particularly, in this variant, the polymeric reinforcing particles $63_1$-$63_P$ comprise ultra-high-molecular-weight polyethylene (UHMW or UHMWPE). The polymeric reinforcing particles $63_1$-$63P$ may comprise any other suitable polymer in other cases, such as polyethylene (PE) (e.g., low-density polyethylene (LDPE) or high-density polyethylene (HDPE)), polypropylene (PP), polytetrafluoroethylene (PTFE), a thermoplastic elastomer (TPE) such as thermoplastic polyurethane (TPU), polyether ether ketone (PEEK) or other polyaryletherketone (PAEK), polycarbonate, nylon or other polyamide, etc.

In other cases, the reinforcing particles $63_1$-$63_P$ may include any other suitable performance additives instead of or in addition to the above materials. For instance, in other cases, the reinforcing particles $63_1$-$63_P$ may comprise fibers (e.g., carbon fibers, aramid fibers (e.g., Kevlar fibers), boron fibers, silicon carbide fibers, etc.).

Some characteristics of the reinforcing particles $63_1$-$63_P$ other than or in addition to their material may affect properties of the reinforcing material 51', and in turn the characteristics of the one or more components of the track 21 that are at least partly constituted of the reinforcing material 51', as discussed below.

The reinforcing particles $63_1$-$63_P$ may be relatively fine and/or compact. For instance, in this variant, the reinforcing particles $63_1$-$63_P$ are provided as powder when combined with the elastomeric matrix 71.

For example, in some embodiments, the reinforcing particles $63_1$-$63_P$ may be non-elongated (e.g., may be spherical-like). For example, in some embodiments, an average sphericity of the reinforcing particles $63_1$-$63_P$ may be at least 0.5, in some cases at least 0.7, in some cases at least 0.9, and in some cases even higher (e.g., close to or equal to 1, in which case the reinforcing particles $63_1$-$63_P$ may be generally spherical particles). Sphericity of a reinforcing particle $63_x$ may be calculated as a ratio of a surface area of a sphere, which has a volume corresponding to that of the reinforcing particle $63_x$, to a surface area of the reinforcing particle $63_x$. Thus, in such embodiments, the reinforcing particles $63_1$-$63_P$ may not be elongated fibers.

In some embodiments, an average aspect ratio of the reinforcing particles $63_1$-$63_P$, which refers to an average ratio of a maximal dimension of each reinforcing particle $63_x$ over a minimal dimension of the reinforcing particle $63_x$, may be no more than 8, in some cases no more than 6, in some cases no more than 4, in some cases no more than 2, and in some cases even less.

Also, in some embodiments, an average diameter $D_x$ of the reinforcing particles $63_1$-$63_P$ may be no more than 200 μm, in some cases no more than 100 μm, in some cases no more than 50 μm, in some cases no more than 25 μm, and in some cases even less. For instance, in some embodiments, the average diameter $D_x$ of the reinforcing particles $63_1$-$63_P$ may range between 100 μm and 200 μm, in some cases between 60 μm and 100 μm, in some cases between 30 μm and 60, and in some cases between 10 μm and 30 μm.

Fineness and/or compactness of the reinforcing particles $63_1$-$63_P$ may provide greater adherence of the reinforcing particles $63_1$-$63_P$ within the elastomeric matrix 71 and/or impart isotropic properties to the reinforcing material 51' composed therewith, as opposed to elongated fibers, which may tend to align (e.g., in a calendering or extruding direction) during manufacturing, thereby imparting anisotropic properties.

There may be any suitable quantity of the reinforcing particles $63_1$-$63_P$ in a given volume of the reinforcing material 51'. This may impact the properties of the reinforcing material 51', and in turn affect the performance of the track 21. For instance, in some cases where the elastomeric matrix 71 of the reinforcing material 51' includes rubber, a concentration C of the reinforcing particles $63_1$-$63_P$ may be measured in parts per hundred rubber (PHR) and may range between 1 and 10 PHR. More particularly, in some cases, the concentration C of the reinforcing particles $63_1$-$63_P$ in the reinforcing material 51' may be at least 1 PHR, in some cases at least 5 PHR, in some cases at least 8 PHR, and in some cases even more, and/or no more than 10 PHR, in some cases no more than 5 PHR, and in some cases no more than 1 PHR.

As discussed above, the reinforcing material 51' may constitute at least part of one or more components of the track 21, such as the carcass 35, the traction projections $58_1$-$58_T$ and/or the drive/guide lugs $34_1$-$34_D$. For example, the reinforcing material 51' of the track 21 may constitute at least part of the periphery 80 of the track 21, such as at least part of the periphery 82 of the carcass 35, the periphery 84 of a traction projection $58_x$ and/or the periphery 86 of a drive/guide lug $34_x$ as discussed above with respect to some embodiments. That is, the reinforcing material 51' of the track 21 may define at least part of the ground engaging outer side 27 of the track, at least part of the inner side 25 of the track 21, or at least part of both the ground engaging outer side 27 and the inner side 25 of the track 21.

The reinforcing material 51' may be provided on at least part of the ground-engaging outer side 27 and/or at least part of the inner side 25 of the track 21 in various ways. For example, in this variant, the reinforcing material 51' is molded with the carcass 35, the traction projections $58_1$-$58_T$ and/or the drive/guide lugs $34_1$-$34_D$ of the track 21. More particularly, in this variant, the reinforcing material 51' constitutes at least a majority (i.e., a majority or an entirety) of the ground-engaging outer surface 31 of the carcass 35 and at least a majority of the periphery 84 of each of the traction projections $58_1$-$58_T$. This may improve a resistance to abrasion, cutting, chipping, chunking and/or tearing of the ground-engaging outer side 27 of the track 21, which may be imparted by repetitive ground contacts during use of the track 21. This may also improve heat dissipation or reduce heat build-up within the track 21, as the reinforcing material 51' may work as a heat barrier or heat diffuser during use, and thus this may also improve indirectly a durability of the track 21.

Figure 43:
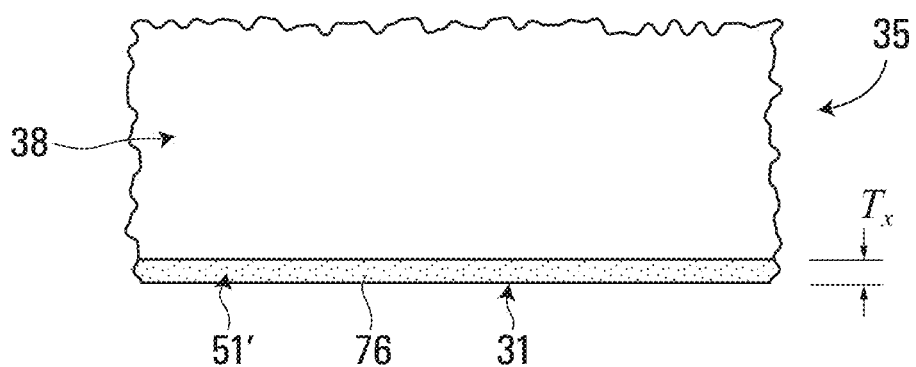
FIG. 43 shows an example of a variant in which a layer of the reinforcing polymeric material of the reinforcing material including a polymeric matrix loaded with reinforcing particles constitutes at least part of a ground-engaging outer surface of a carcass of the track.

For example, in some embodiments, as shown in FIG. 43, the reinforcing material 51' may comprise a layer of reinforcing material 76 constituting at least part of the ground-engaging outer surface 31 of the carcass 35, as discussed above in relation to the layer of reinforcing material 88. The layer of reinforcing material 76 may be a continuous layer or it may include a plurality of segments that are spaced apart from one another and constitute respective areas of the track 21 including the reinforcing material 51'.

The layer of reinforcing material 76 may be thin, notably significantly thinner than the elastomeric material 53 of a given component 67 of the track 21 (e.g., the carcass 35, a traction projection $58_x$ or a drive/guide lug $34_x$). For example, in some cases, a ratio of a thickness $T_x$ of the layer of reinforcing material 76 over a thickness $T_e$ of the elastomeric material 53 of the given component 67 of the track 21 may be no more than 0.3, in some cases no more than 0.2, in some cases no more than 0.1, in some cases no more than 0.05, in some cases no more than 0.01, and in some cases an even smaller ratio. For example, in some cases, the thickness $T_x$ of the layer of reinforcing material 76 may be no more than 1 inch, in some cases no more than 0.5 inch, in some cases no more than 0.25 inch, in some cases no more than 0.1 inch, in some cases no more than 0.05 inch, in some cases no more than 0.025 inch, and in some cases even less.

The layer of reinforcing material 76 may also vary in thickness, depending on respective areas of the track 21 including the reinforcing material 51'. This may help to enhance the durability of the track 21, more particularly in areas of the track 21 that usually wear quicker than the remainder of the track 21, such as the traction projections $58_1$-$58_T$ and/or the traction-projection-free areas $90_1$-$90_F$ due to repetitive ground contacts. For instance, in this variant, a thickness $T_{x1}$ of the layer of reinforcing material 76 constituting at least part of (in this case an entirety of) the periphery 84 of a traction projection $58_x$ is greater than a thickness $T_{x2}$ of the layer of reinforcing material 76 constituting at least part of (in this case an entirety of) the periphery 82 of the carcass 35 at a traction-projection-free area. For example, in some cases, a ratio of the thickness $T_{x1}$ of the layer of reinforcing material 76 constituting at least part of the periphery 84 of a traction projection $58_x$ over the thickness $T_{x2}$ of the layer of reinforcing material 76 constituting at least part of the periphery 82 of the carcass 35 at the traction-projection-free area may be at least 1.1, in some cases at least 1.5, in some cases at least 2, in some cases at least 5, and in some cases an even greater ratio. Also, in other cases, the thickness $T_{x1}$ of the layer of reinforcing material 76 constituting at least part of the periphery 84 of a traction projection $58_x$ is smaller than the thickness $T_{x2}$ of the layer of reinforcing material 76 constituting at least part of the periphery 82 of the carcass 35 at a traction-projection-free area.

The concentration C of the reinforcing particles $63_1$-$63_P$ may also vary in the layer of reinforcing material 76, depending on respective areas of the track 21 including the reinforcing material 51', in addition to or instead of a variation in thickness of the layer of reinforcing material 76. For instance, in some cases, the concentration $C_1$ of the reinforcing particles $63_1$-$63_P$ of the reinforcing material 51' constituting at least part of the periphery 84 of a traction projection $58_x$ may be greater than the concentration $C_2$ of the reinforcing particles $63_1$-$63_P$ in the reinforcing material 51 constituting at least part of the periphery 82 of the carcass 35 in a traction-projection-free area. For instance, in some cases, a ratio of the concentration $C_1$ over the concentration $C_2$ is at least 1.1, in some cases at least 1.2, in some cases at least 1.5, in some cases at least 2.0, and in some cases even more. In other cases, the concentration of $C_i$ of the reinforcing particles $63_1$-$63_P$ in the reinforcing material 51' constituting at least part of the periphery 84 of a traction projection $58_x$ may be smaller than the concentration $C_2$ of the reinforcing particles $63_1$-$63_P$ in the reinforcing material 51' constituting at least part of the periphery 82 of the carcass 35 at a traction-projection-free area.

The concentration of reinforcing particles $63_1$-$63_P$ may also vary in a thickness direction of the layer of reinforcing material 76, such that higher or lower concentrations of reinforcing particles $63_1$-$63_P$ may be voluntarily obtained in selected parts of the track including the reinforcing material 51'. This may be implemented for instance when the layer of reinforcing material 76 includes a plurality of sub-layers of reinforcing material 51' stacked on one another. For instance, in some cases, the concentration C of reinforcing particles $63_1$-$63_P$ within the layer of reinforcing material 76 decreases in the layer of reinforcing material 76 in a given direction (i.e. the concentration of reinforcing particles 76 may be higher in an outer region of the layer of reinforcing material 76 than at an inner region of the layer of reinforcing material 76). This may provide a progressive change in the material properties of the reinforcing layer 51' and thus less stress concentrations at the junction between the reinforcing material 51' and the elastomeric material 53 underlying the reinforcing material 51'. The concentration of reinforcing particles $63_1$-$63_P$ may vary differently in other cases.

Figure 44:
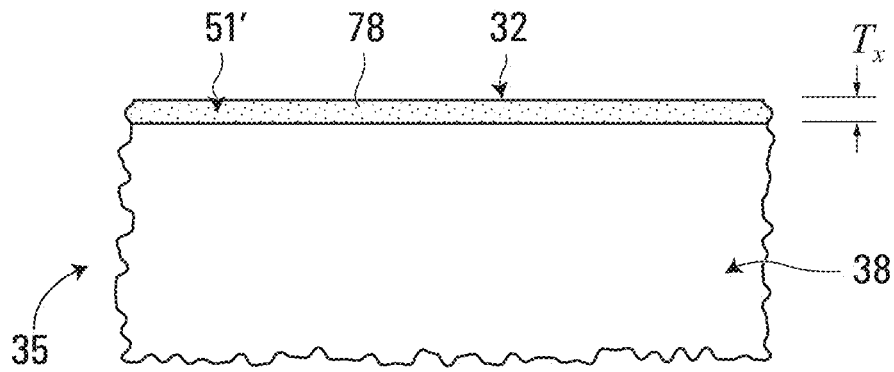
FIG. 44 shows an example of a variant in which a layer of the reinforcing polymeric material of the reinforcing material including a polymeric matrix loaded with reinforcing particles constitutes at least part of an inner surface of the carcass of the track.

In some embodiments, as shown in FIG. 44, the reinforcing polymeric material 51 may comprise a layer of reinforcing polymeric material 78 constituting at least part of the inner surface 32 of the carcass 35, as discussed above in relation to the layer of reinforcing polymeric material 92.

The reinforcing material 51' including the elastomeric matrix 71 loaded with the reinforcing particles $63_1$-$63_P$ may be significantly stronger than the elastomeric material 53 of the track 21 in various ways, and thus the presence of such reinforcing material 51' may help the track 21 to better perform when compared to a similar track free of such reinforcing material 51'. Notably, in some cases:

the reinforcing material 51' including the elastomeric matrix 71 loaded with the reinforcing particles $63_1$-$63_P$ may be stiffer than the elastomeric material 53. For example, in some cases, a ratio of modulus of elasticity (i.e., Young's modulus) of such reinforcing material 51' over a modulus of elasticity of the elastomeric material 53 is at least 2, in some cases at least 5, in some cases at least 10, in some cases at least 20, in some cases at least 40 and in some cases even more. For instance, in some cases, the modulus of elasticity of such reinforcing material 51' is at least 1.5 MPa, in some cases at least 4 MPa, in some cases at least 6 MPa, in some cases at least 8 MPa, in some cases at least 10 MPa and in some cases even more;

the reinforcing material 51' including the elastomeric matrix 71 loaded with the reinforcing particles $63_1$-$63_P$ may be harder than the elastomeric material 53. For instance, in some cases, a ratio of a hardness on a Shore A hardness scale of such reinforcing material 51' over a hardness of the elastomeric material 53 is at least 1.2, in some cases at least 1.5, in some cases at least 2, in some cases at least 2.5 and in some cases even more. For instance, in some cases, the hardness on the Shore A hardness scale of such reinforcing material 51' is at least 50, in some cases at least 60, in some cases at least 70, in some cases at least 80, in some cases at least 90 and in some cases even more; and/or the reinforcing material 51' including the elastomeric matrix 71 loaded with the reinforcing particles $63_1$-$63_P$ may be more resistant to abrasion than the elastomeric material 53. For instance, in some cases, a ratio of a wear resistance of such reinforcing material 51' over a wear resistance of the elastomeric material 53 is no more than 0.95, in some cases no more than 0.8, in some cases no more than 0.7, in some cases no more than 0.6, in some cases no more than 0.5 and in some cases even less. The wear resistance of such reinforcing material 51' can be taken as an abrasion resistance of such reinforcing material 51' and the wear resistance of the elastomeric material 53 can be taken as an abrasion resistance of the elastomeric material 53. For instance, the wear resistance of such reinforcing material 51' and of the elastomeric material 53, expressed as its abrasion resistance, may be measured under ASTM D-5963 conditions (e.g., sample dimensions; loading conditions; etc.). For instance, in some embodiments, the abrasion resistance of such reinforcing material 51' is at least 40 mm$^3$, in some cases at least 60 mm$^3$, in some cases at least 80 mm$^3$, in some cases at least 100 mm$^3$, in some cases at least 120 mm$^3$, in some cases at least 150 mm$^3$ and in some cases even more.

Where the layer of reinforcing polymeric material 76 of the reinforcing material 51' including the elastomeric matrix 71 loaded with the reinforcing particles $63_1$-$63_P$ is stiffer than the elastomeric material 53 of the carcass 35, as discussed above, this may help to increase a longitudinal rigidity of the carcass 35, i.e., a rigidity of the carcass 35 in the longitudinal direction of the track 21 which refers to the carcass's resistance to bending about an axis parallel to the widthwise direction of the track 21, and/or (2) a widthwise rigidity of the carcass 35, i.e., a rigidity of the carcass 35 in the widthwise direction of the track 21 which refers to the carcass's resistance to bending about an axis parallel to the longitudinal direction of the track 21.

Increasing the widthwise rigidity of the carcass 35 may help to improve traction and floatation.

Increasing the longitudinal rigidity of the carcass 35 may help to reduce noise generated by the track system 14, such as in cases where the reinforcing material 51' including the elastomeric matrix 71 loaded with the reinforcing particles $63_1$-$63_P$ defines at least part of the ground engaging outer side 27 of the track, at least part of the inner side 25 of the track 21, or at least part of both the ground engaging outer side 27 and the inner side 25 of the track 21. In other words, the increased longitudinal rigidity of the carcass 35 may reduce deformation of the carcass 35 against impacts such as when the roller wheels $28_1$-$28_6$, $30_1$, $30_2$ roll over the carcass 35. This in turn may cause a reduction in noise generated by the track system 14.

For instance, in some variants where the reinforcing material 51' including the elastomeric matrix 71 loaded with the reinforcing particles $63_1$-$63_P$ defines at least part of the ground engaging outer side 27 of the track, at least part of the inner side 25 of the track 21, or at least part of both the ground engaging outer side 27 and the inner side 25 of the track 21, the track 21 may generate less noise than if the reinforcing polymeric material 51' was omitted but the track 21 was otherwise identical. For instance, in some embodiments, a noise level generated by the track 21 at a given speed may be at least 2%, in some cases at least 4%, and in some cases at least 6% less than that which would be generated if the layer of reinforcing polymeric material 88 was omitted.

Figure 45A:
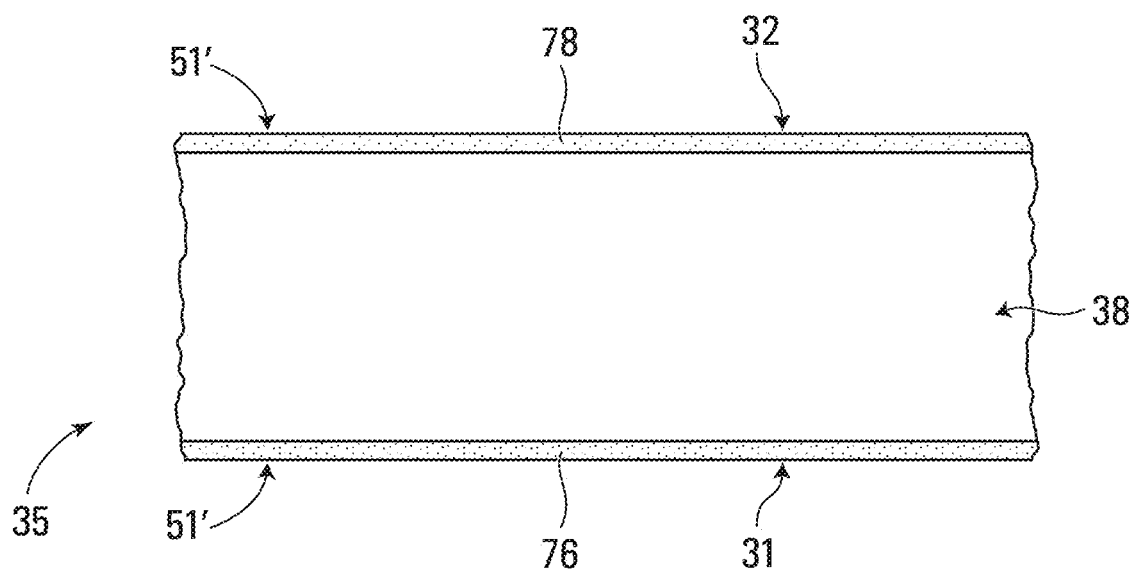
FIGS. 45A to 45C shows examples of variants in which the reinforcing material of the track comprises a layer of reinforcing polymeric material constituting at least part of the ground-engaging outer surface of the carcass and a layer of reinforcing polymeric material constituting at least part of the inner surface of the carcass.
Figure 45B:
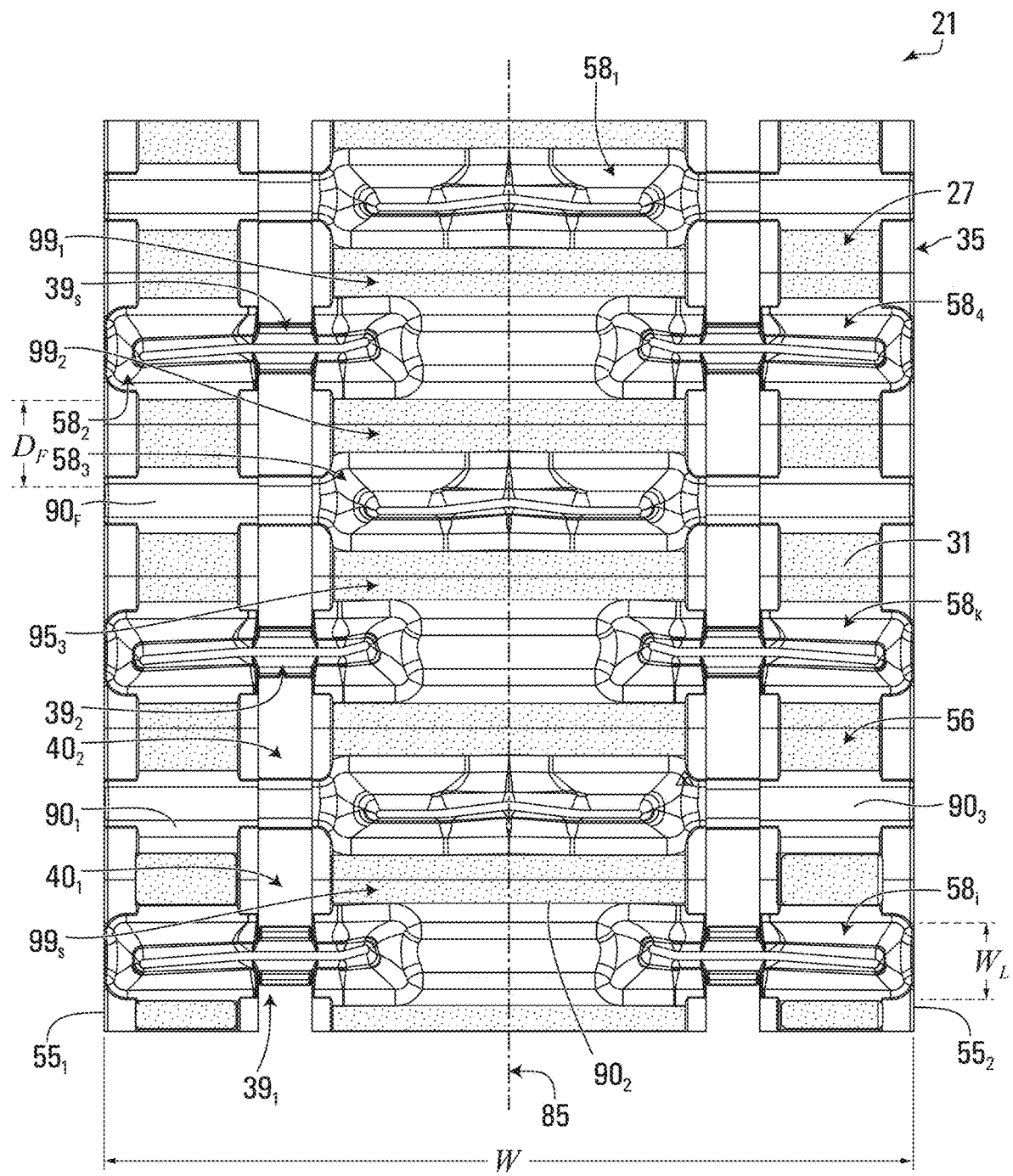
Figure 45C:
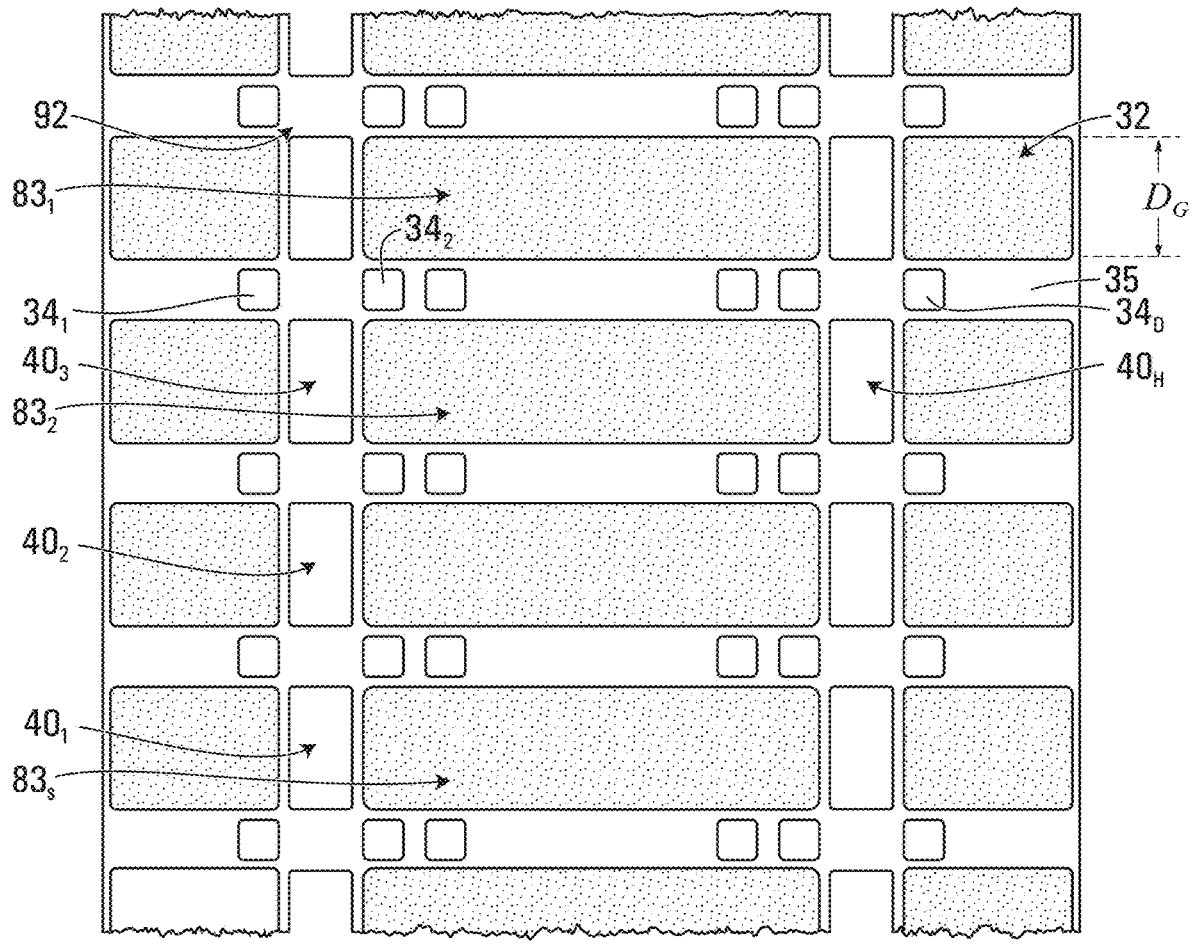
Figure 46:
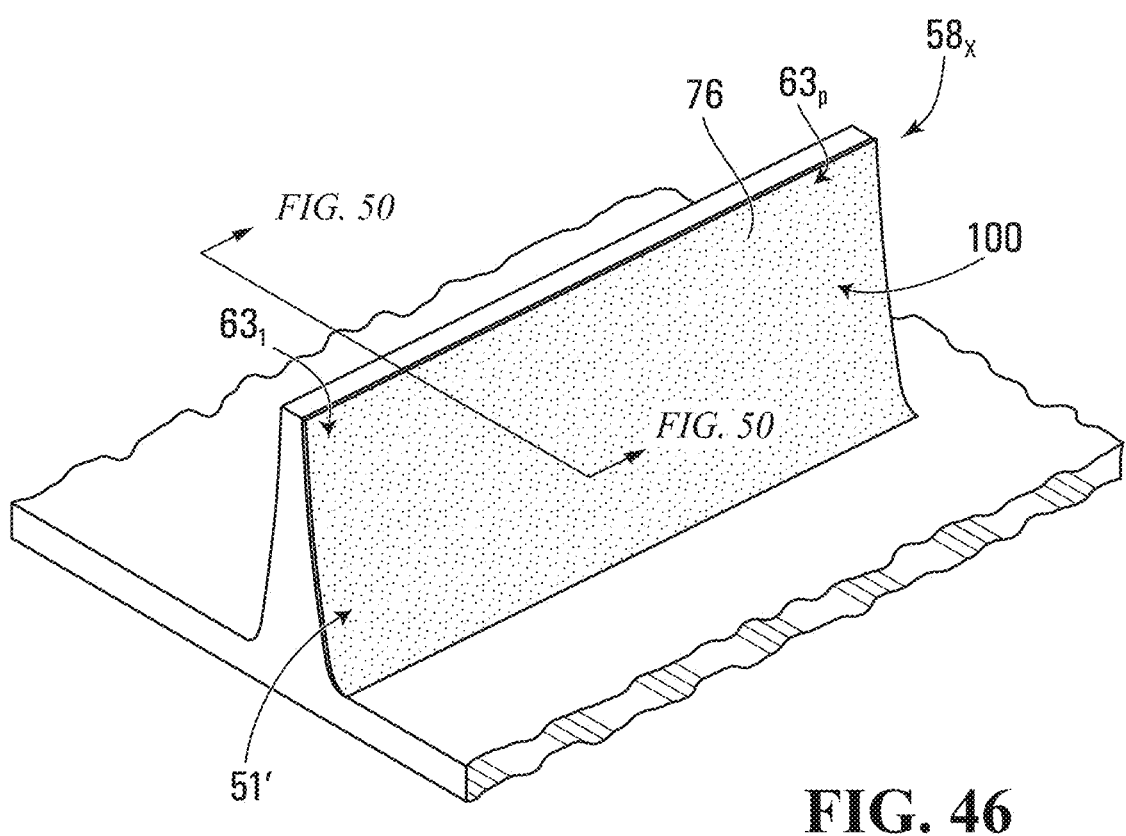
FIG. 46 shows a perspective view of an example of a variant of a traction projection of the track where a layer of reinforcing polymeric material of the reinforcing material, which includes a polymeric matrix loaded with reinforcing particles, of the track constitutes at least part of a rear surface of the traction projection.
Figure 47:
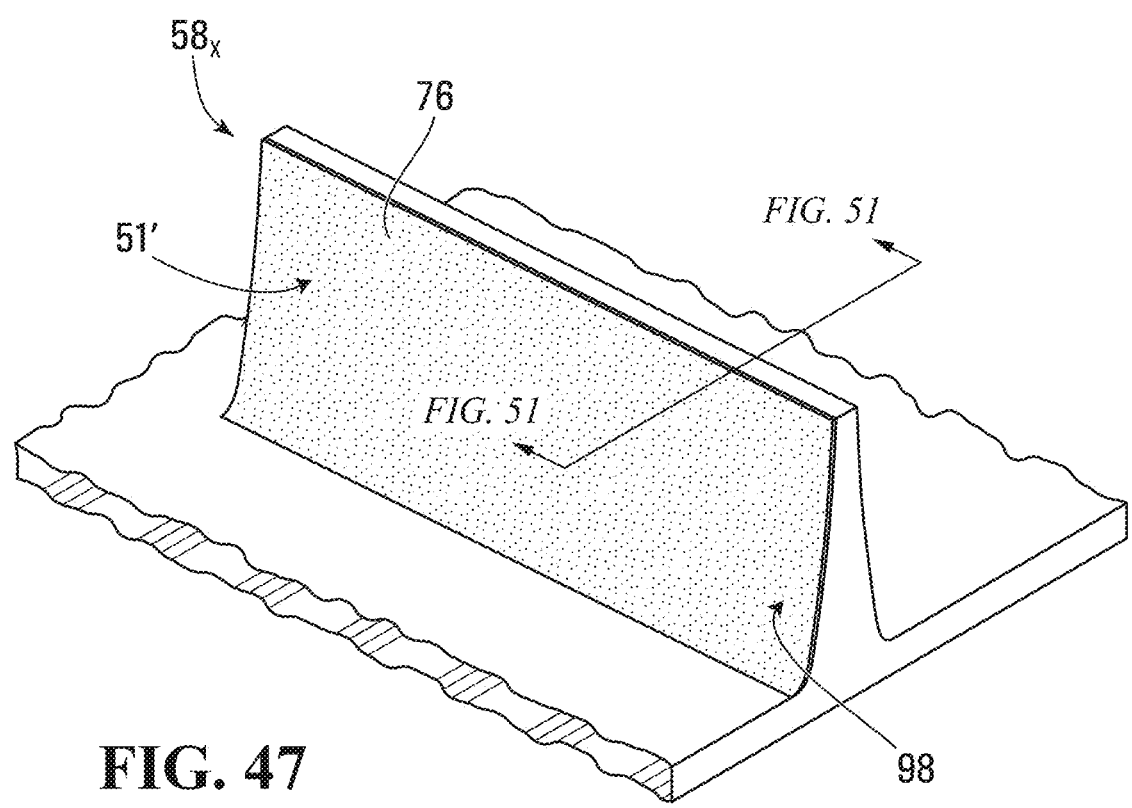
FIG. 47 shows a perspective view of an example of a variant of the traction projection of the track in which a layer of reinforcing polymeric material of the reinforcing material, which includes a polymeric matrix loaded with reinforcing particles, of the track constitutes at least part of a front surface of the traction projection.
Figure 48:
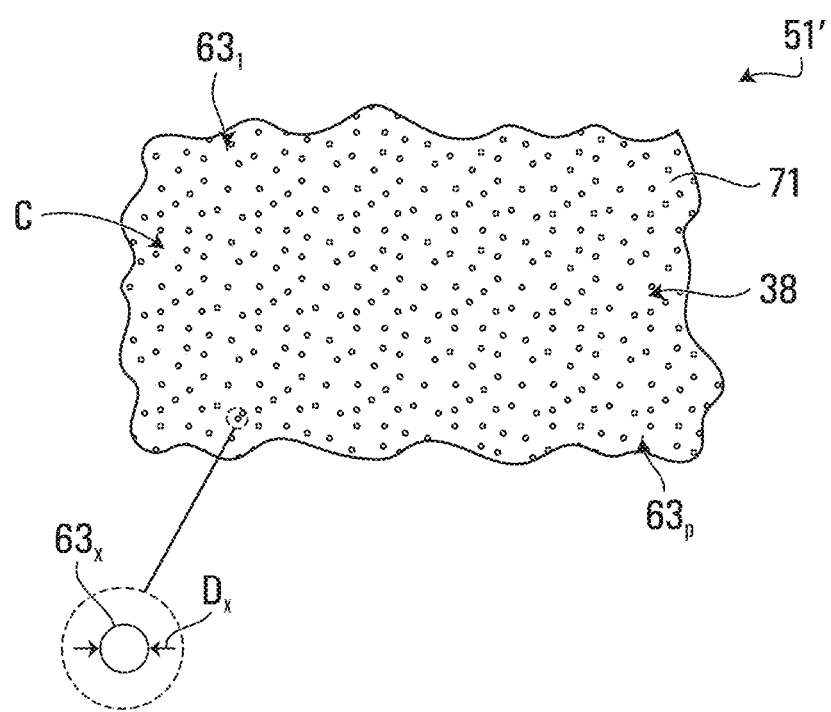
FIG. 48 shows an illustration of an example of reinforcing material which includes a polymeric matrix loaded with reinforcing particles.
Figure 49:
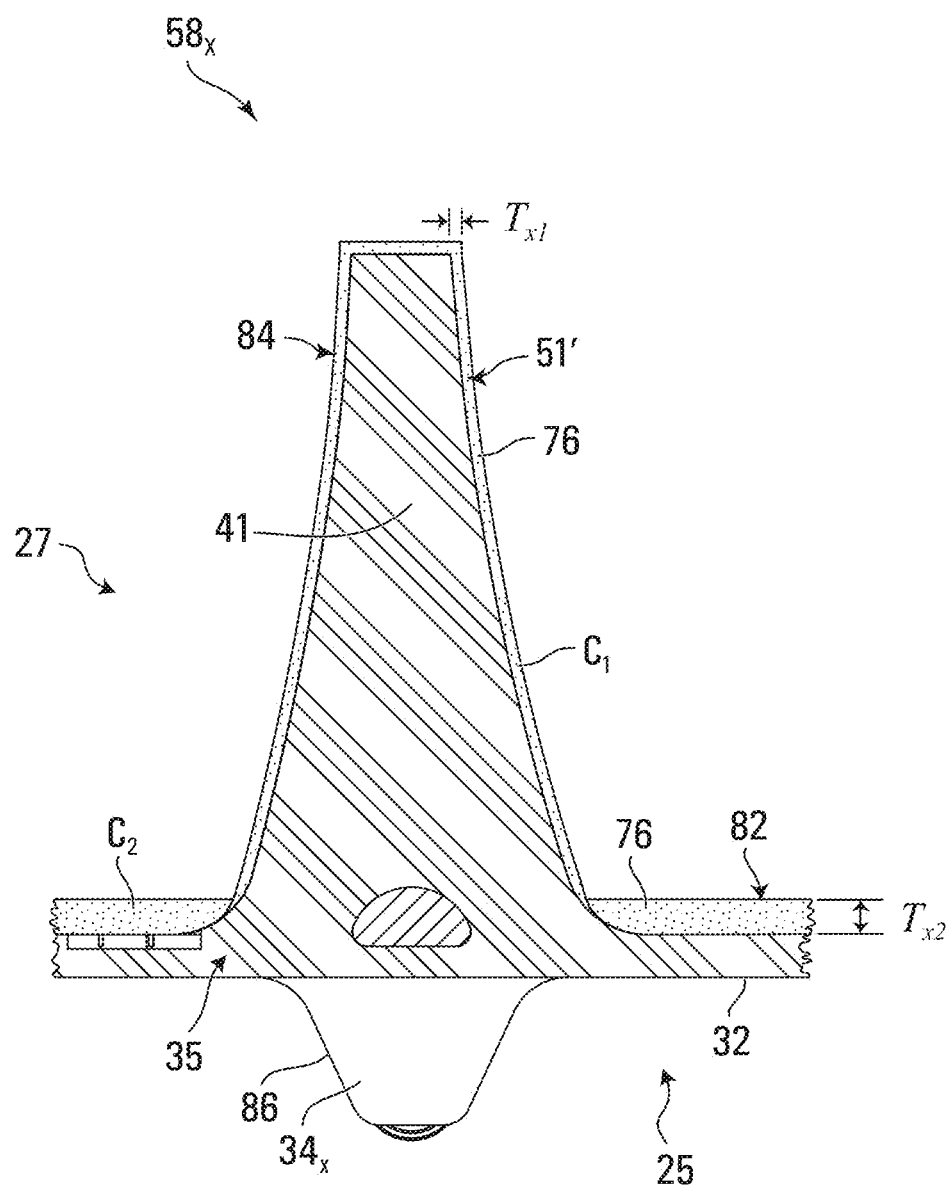
FIG. 49 shows a longitudinal cross-sectional view of an example of a variant of the traction projection of the track in which the reinforcing material includes a polymeric matrix loaded with reinforcing particles of the track and comprises a layer of reinforcing polymeric material constituting at least part of the periphery of the traction projection and a layer of reinforcing polymeric material constituting at least part of the ground-engaging outer surface of the carcass of the track.
Figure 50:
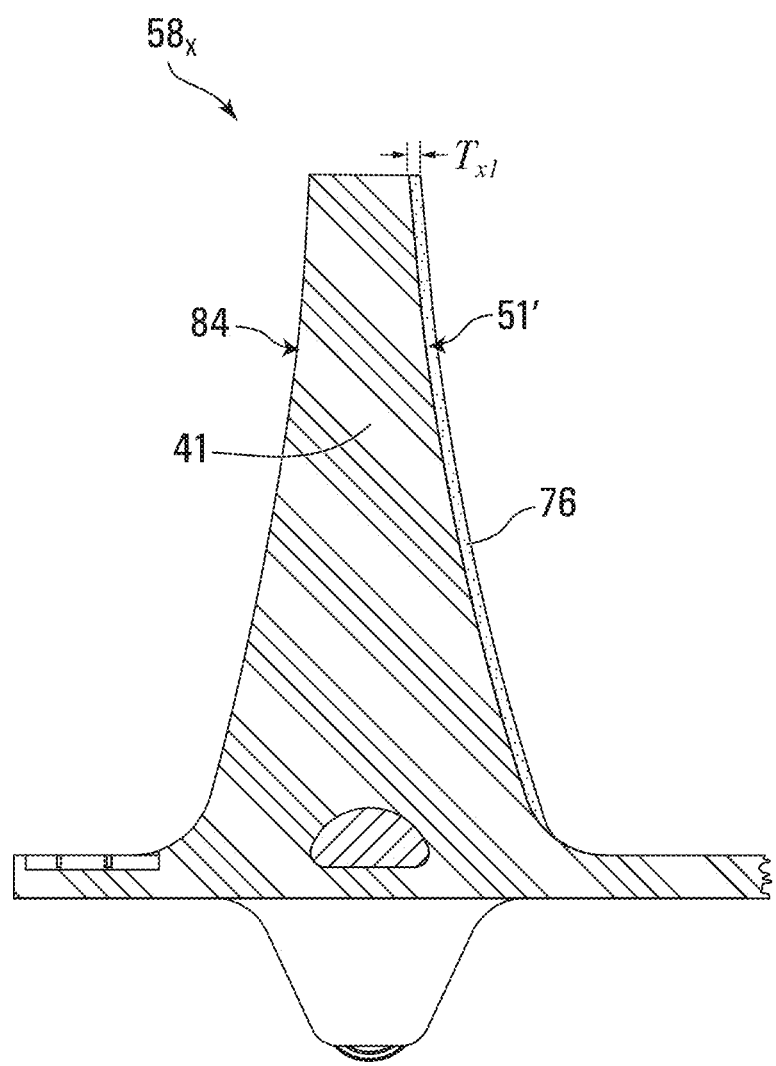
FIG. 50 shows a cross-sectional view of an example of a variant of the traction projection of the track where a layer of reinforcing polymeric material of the reinforcing material, which includes a polymeric matrix loaded with reinforcing particles, of the track constitutes at least part of a rear surface of the traction projection.
Figure 51:
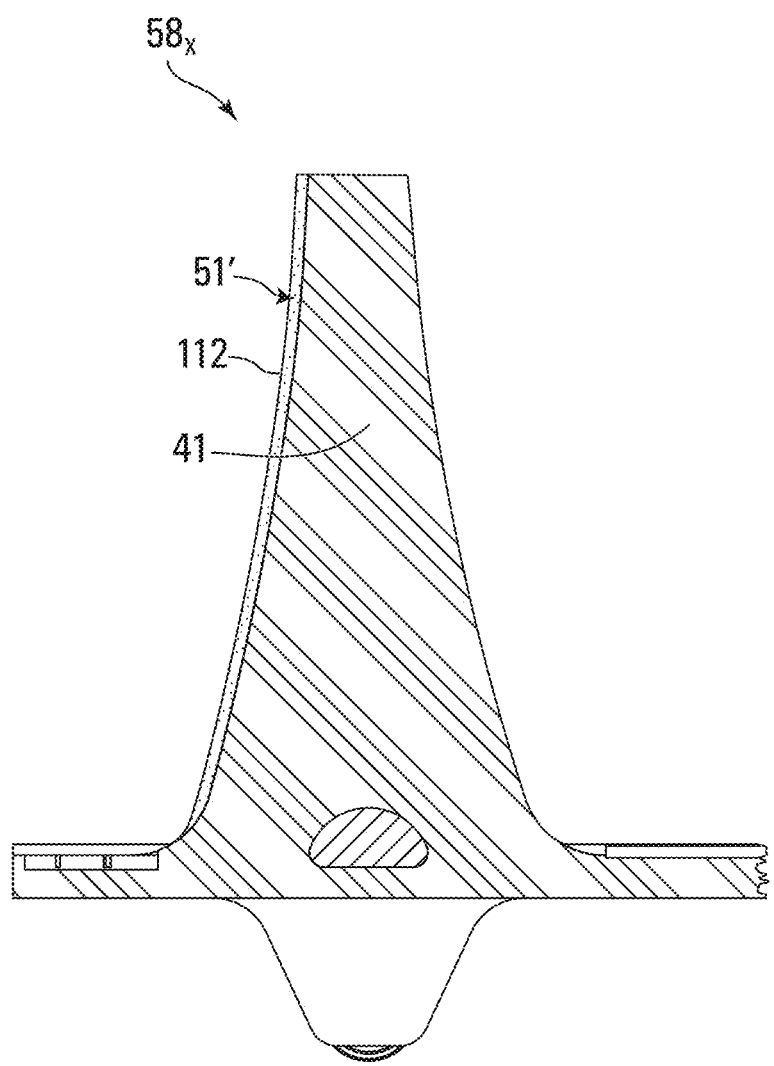
FIG. 51 shows a cross-sectional view of an example of a variant of the traction projection of the track where a layer of reinforcing polymeric material of the reinforcing material, which includes a polymeric matrix loaded with reinforcing particles, of the track constitutes at least part of a front surface of the traction projection.
Figure 52:
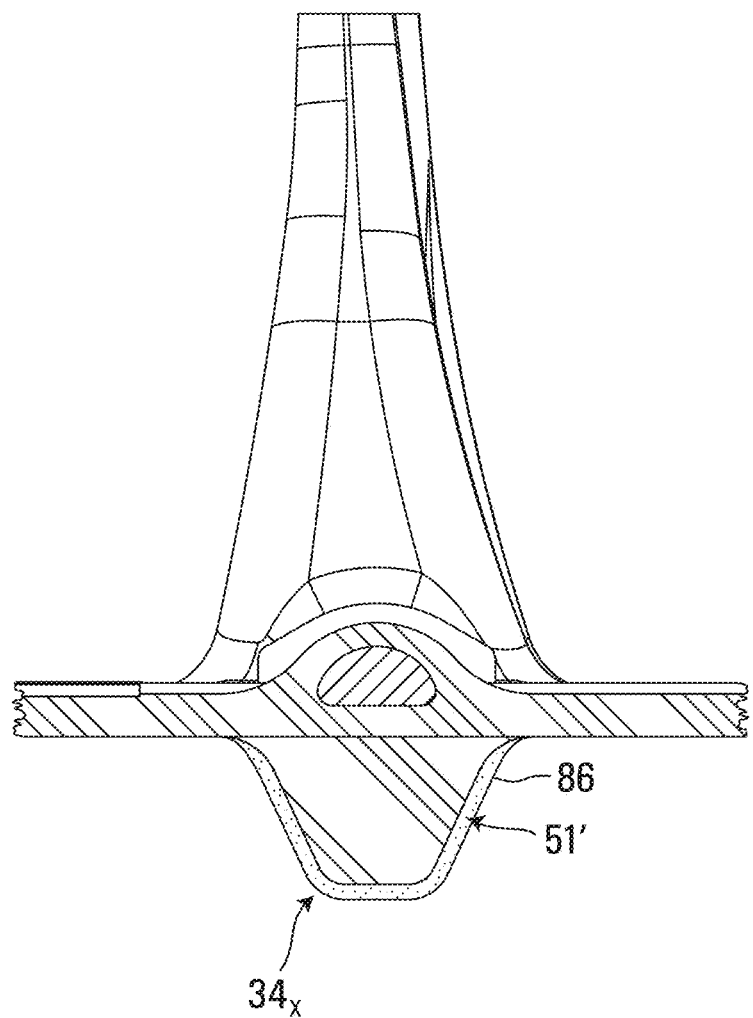
FIG. 52 shows a longitudinal cross-sectional view of an example of a variant of a drive/guide lug of the track in which the reinforcing material of the track includes a polymeric matrix loaded with reinforcing particles and constitutes at least part of a periphery of the drive/guide lug.

In some embodiments, as shown in FIGS. 45B and 45C, as discussed above, the layer of reinforcing polymeric material 76 may occupy at least a substantial part of each of respective ones of the traction-projection-free areas $90_1$-$90_F$ of the ground-engaging outer surface 31 and the layer of reinforcing polymeric material 78 may occupy at least a substantial part of each of respective ones of the drive/guide-lug-free areas $93_1$-$93_F$ of the inner surface 32. For instance, each of the layer of reinforcing polymeric material 76 and the layer of reinforcing polymeric material 78 may occupy at least a majority (i.e., a majority or an entirety) of the width W of the track 21. More specifically, in this embodiment, each of the layer of reinforcing polymeric material 76 and the layer of reinforcing polymeric material 78 occupies the entirety of the width W of the track 21. Moreover, each of the layer of reinforcing polymeric material 76 and the layer of reinforcing polymeric material 78 may occupy at least a majority (i.e., a majority or an entirety) of each of the dimension $D_F$ of a traction-projection-free area $90_i$ in the longitudinal direction of the track 21 and the dimension $D_G$ of a drive/guide-lug-free area $93_i$ in the longitudinal direction of the track 21. In this embodiment, the layer of reinforcing polymeric material 76 occupies the entirety of the dimension $D_F$ and the layer of reinforcing polymeric material 78 occupies the entirety of the dimension $D_6$. For instance, in this embodiment, the layer of reinforcing polymeric material 76 comprises a plurality of laterally-extending segments $99_1$-$99_S$ (e.g., bands) that are elongated transversally to the longitudinal direction of the track 21 (e.g., in the widthwise direction of the track 21), spaced from one another in the longitudinal direction of the track 21, and disposed between longitudinally-adjacent ones of the traction projections $58_1$-$58_T$, while the layer of reinforcing polymeric material 78 comprises a plurality of laterally-extending segments $83_1$-$83_S$ that are elongated transversally to the longitudinal direction of the track 21 (e.g., in the widthwise direction of the track 21), spaced from one another in the longitudinal direction of the track 21, and disposed between longitudinally-successive ones of the drive/guide lugs $34_1$-$34_D$.

Figure 53:
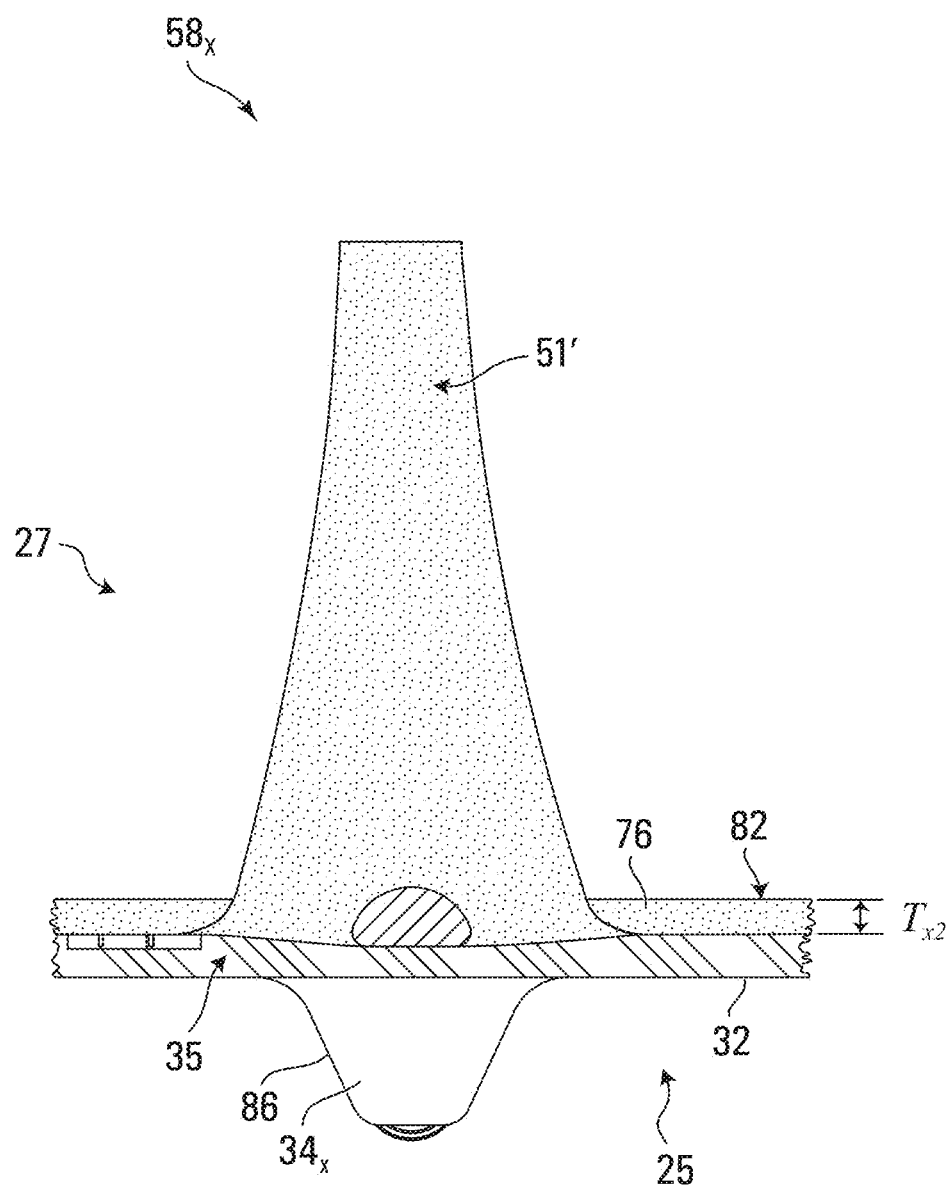
FIG. 53 shows a cross-sectional view of an example of a variant of the traction projection of the track where the reinforcing material, which includes a polymeric matrix loaded with reinforcing particles, of the track constitutes an entirety of a traction projection and a layer of reinforcing polymeric material of the reinforcing material constitutes at least part of the outer surface of the carcass.

In other cases, the reinforcing material 51' may constitute more of a given component 67 of the track 21. For instance, in some embodiments, the reinforcing material 51' may constitute at least a majority (i.e., a majority or an entirety) of a given component 67 of the track 21 instead of the elastomeric material 53. For instance, instead of being provided as a layer of reinforcing material 76, the reinforcing material 51' may be provided as an extruded piece (e.g., bar) of reinforcing material 51', whereby the extruded piece of reinforcing material 51' may be used for forming a given component 67 (e.g. forming a substantial portion of a traction projection $58_x$ or a drive/guide lug $34_x$). In cases where the reinforcing material 51' constitutes a majority (e.g. a majority or an entirety) of a given component 67 of the track 21 such as a traction projections $58_x$, as discussed above, the thickness $T_{x2}$ of the layer of reinforcing material 76 constituting at least part of the periphery 82 of the carcass 35 at a traction-projection-free area may take the same values as discussed above with respect to previously-presented cases. For instance, in some cases, the reinforcing material 51' may constitute at least a bulk (e.g., a majority or an entirety) of a traction projection $58_x$ or drive/guide lug $34_x$ and a layer of reinforcing material 76 forming at least part of the inner surface 32 or the outer surface 31 of the carcass. For instance, in the embodiment shown in FIG. 53, the reinforcing material 51' constitutes an entirety of a traction projection $58_x$ and a layer of reinforcing material 76 forms at least part of the outer surface 31 of the carcass.

In some embodiments, the reinforcing material 51' including the elastomeric matrix 71 and the reinforcing particles $63_1$-$63_P$ may constitute another part of the track 21, in addition to or instead of at least part of the periphery 80 of the track 21, and may be configured as described above, including for the concentration of the reinforcing particles $63_1$-$63_P$, the size and shape of the reinforcing particles, etc. For example, in some embodiments, the reinforcing material 51' may constitute an internal part of the track 21 that underlies the periphery 80 of the track 21, which may be made of elastomeric material (e.g., without any reinforcing particles) or a layer of the reinforcing material 51 previously discussed in other embodiments.

While in embodiments considered above the track system 14 is part of the snowmobile 10, a track system constructed according to principles discussed herein may be used as part of other off-road vehicles in other embodiments.

For example, in some embodiments, a track system constructed according to principles discussed herein may be used as part of an all-terrain vehicle (ATV).

FIGS. 33 to 36 show an ATV 210 comprising a set of track systems $214_1$-$214_4$ providing traction to the ATV on the ground. The ATV 210 comprises a prime mover 212 in a driving relationship with the track systems $214_1$-$214_4$ via the ATV's powertrain, a seat 218, and a user interface 220, which enable a user of the ATV 210 to ride the ATV 210 on the ground. In this case, the seat 218 is a straddle seat and the ATV 210 is usable by a single person such that the seat 218 accommodates only that person driving the ATV 210. In other cases, the seat 218 may be another type of seat, and/or the ATV 210 may be usable by two individuals, namely one person driving the ATV 210 and a passenger, such that the seat 218 may accommodate both of these individuals (e.g., behind one another or side-by-side) or the ATV 210 may comprise an additional seat for the passenger. For example, in other embodiments, the ATV 210 may be a side-by-side ATV, sometimes referred to as a "utility terrain vehicle" or "UTV". The user interface 220 comprises a steering device operated by the user to control motion of the ATV 210 on the ground. In this case, the steering device comprises handlebars. In other cases, the steering device may comprise a steering wheel or other type of steering element. Each of the front track systems $214_1$, $214_2$ is pivotable about a steering axis of the ATV 210 in response to input of the user at the handlebars in order to steer the ATV 210 on the ground.

In this embodiment, each track system $214_i$ is mounted in place of a ground-engaging wheel $213_i$ that may otherwise be mounted to the ATV 210 to propel the ATV 210 on the ground. That is, the ATV 210 may be propelled on the ground by four ground-engaging wheels $213_1$-$213_4$ with tires instead of the track systems $214_1$-$214_4$. Basically, in this embodiment, the track systems $214_1$-$214_4$ may be used to convert the ATV 210 from a wheeled vehicle into a tracked vehicle, thereby enhancing its traction and floatation on the ground.

Any feature described herein with respect to the track system 14 of the snowmobile 10, including its track 21, may be applied to a track system $214_i$ of the ATV 210, including its track 221.

The snowmobile 10 and the ATV 210 considered above are examples of tracked recreational vehicles. While they can be used for recreational purposes, such tracked recreational vehicles may also be used for utility purposes in some cases.

Figure 37:
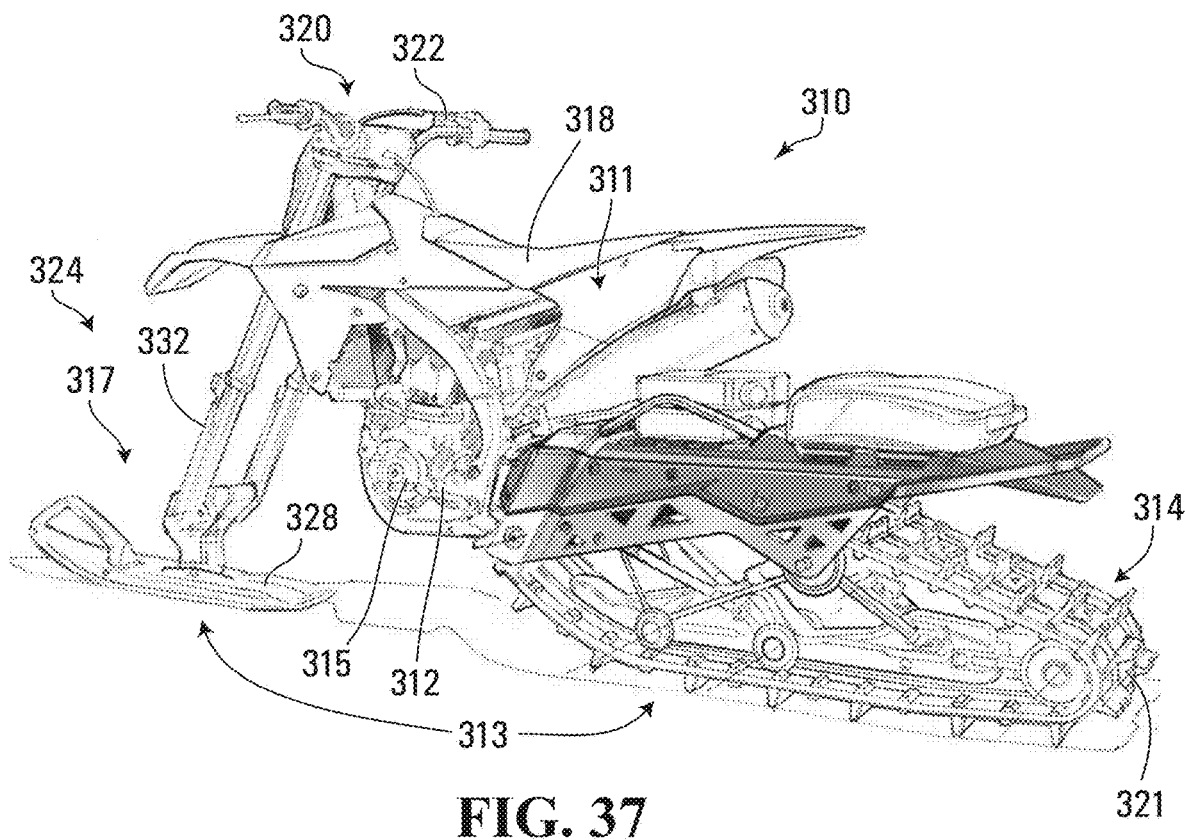
FIGS. 37 and 38 show an example of a snow bike comprising a track system in accordance with another embodiment of the invention, instead of being equipped with a rear wheel.

As another example, in some embodiments, a track system constructed according to principles discussed herein may be used as part of a snow bike. FIG. 37 shows a snow bike 310 comprising a frame 311, a powertrain 312, a ski system 317, a track system 314, a seat 318, and a user interface 320 which enables a user to ride, steer and otherwise control the snow bike 310.

Figure 38:
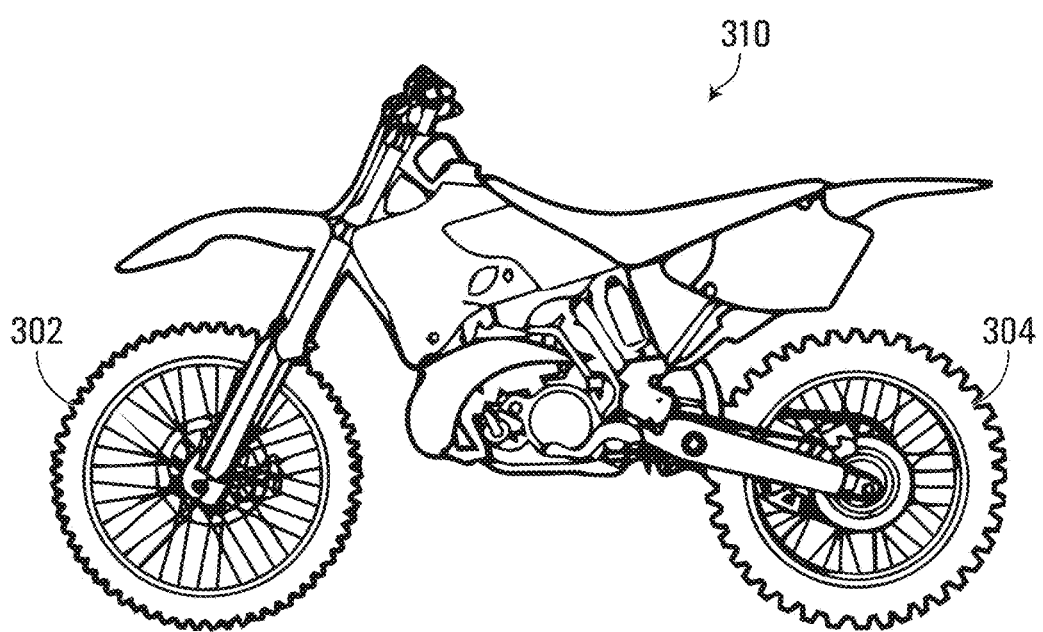

In this embodiment, as shown in FIG. 38, the snow bike 310 is a motorcycle equipped with the ski system 317 mounted in place of a front wheel 302 of the motorcycle 310 and the track system 314 mounted in place of a rear wheel 304 of the motorcycle 310. In this example, the track system 314 also replaces a rear suspension unit (e.g., a shock absorber and a swing arm) of the motorcycle. Basically, in this embodiment, the ski system 317 and the track system 314 are part of a conversion system 313 that converts the motorcycle into a skied and tracked vehicle for travelling on snow.

The powertrain 312 is configured for generating motive power and transmitting motive power to the track system 314 to propel the snow bike 310 on the ground. To that end, the powertrain 312 comprises a prime mover 315, which is a source of motive power that comprises one or more motors (e.g., an internal combustion engine, an electric motor, etc.). For example, in this embodiment, the prime mover 315 comprises an internal combustion engine. In other embodiments, the prime mover 315 may comprise another type of motor (e.g., an electric motor) or a combination of different types of motor (e.g., an internal combustion engine and an electric motor). The prime mover 315 is in a driving relationship with the track system 314. That is, the powertrain 312 transmits motive power from the prime mover 315 to the track system 314 in order to drive (i.e., impart motion to) the track system 314.

The seat 318 accommodates the user of the snow bike 310. In this case, the seat 318 is a straddle seat and the snow bike 310 is usable by a single person such that the seat 318 accommodates only that person driving the snow bike 310. In other cases, the seat 318 may be another type of seat, and/or the snow bike 310 may be usable by two individuals, namely one person driving the snow bike 310 and a passenger, such that the seat 318 may accommodate both of these individuals (e.g., behind one another).

The user interface 320 allows the user to interact with the snow bike 310 to control the snow bike 310. More particularly, in this embodiment, the user interface 320 comprises an accelerator, a brake control, and a steering device comprising handlebars 322 that are operated by the user to control motion of the snow bike 510 on the ground. The user interface 320 also comprises an instrument panel (e.g., a dashboard) which provides indicators (e.g., a speedometer indicator, a tachometer indicator, etc.) to convey information to the user.

The ski system 317 is disposed in a front 324 of the snow bike 310 to engage the ground and is turnable to steer the snow bike 310. To that end, the ski system 14 is turnable about a steering axis of the snow bike 310. The ski system 317 comprises a ski 328 to slide on the snow and a ski mount 330 that connects the ski 328 to a front steerable member 332 of the snow bike 310. In this embodiment where the snow bike 310 is a motorcycle and the ski system 317 replaces the front wheel 302 of the motorcycle, the front steerable member 332 comprises a front fork 334 of the snow bike 310 that would otherwise carry the front wheel 302.

The ski 328 is a sole ski of the snow bike 310. That is, the snow bike 310 has no other ski. Notably, the ski 328 is disposed in a center of the snow bike 310 in a widthwise direction of the snow bike 310. In this embodiment in which the snow bike 310 is a motorcycle and the ski system 317 replaces the front wheel 302 of the motorcycle, the ski 328 contacts the ground where the front wheel 302 would contact the ground.

Any feature described herein with respect to the track system 14 of the snowmobile 10, including its track 21, may be applied to the track system 314 of the snow bike 310, including its track 321.

In other embodiments, a track system constructed according to principles discussed herein may be used as part of an agricultural vehicle (e.g., a tractor, a harvester, etc.), as part of a construction vehicle, forestry vehicle or other industrial vehicle, or as part of a military vehicle.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track being mountable about a plurality of wheels, the track being elastomeric to flex around the wheels, the track comprising a ground-engaging outer side and an inner side opposite to the ground-engaging outer side, the ground-engaging outer side comprising a ground-engaging outer surface and a plurality of traction projections projecting from the ground-engaging outer surface, the track comprising:
   a first elastomeric material; and
   a second elastomeric material overlying the first elastomeric material, constituting at least part of a periphery of the track, and including an elastomeric matrix and reinforcing particles embedded in the elastomeric matrix, the second elastomeric material forming at least part of the ground-engaging outer side.

2. The track claimed in claim 1, wherein a thickness of the second elastomeric material is less than a thickness of the first elastomeric material.

3. The track claimed in claim 2, wherein a ratio of the thickness of the second elastomeric material over the thickness of the first elastomeric material is no more than 0.2.

4. The track claimed in claim 2, wherein a ratio of the thickness of the second elastomeric material over the thickness of the first elastomeric material is no more than 0.1.

5. The track claimed in claim 2, wherein a ratio of the thickness of the second elastomeric material over the thickness of the first elastomeric material is no more than 0.05.

6. The track claimed in claim 2, wherein the thickness of the second elastomeric material is no more than 0.5.

7. The track claimed in claim 2, wherein the thickness of the second elastomeric material is no more than 0.25.

8. The track claimed in claim 2, wherein the thickness of the second elastomeric material is no more than 0.1.

9. The track claimed in claim 1, wherein the second elastomeric material forms less than an entirety of the periphery of the track.

10. The track claimed in claim 1, wherein the first elastomeric material forms a first part of the periphery of the track and the second elastomeric material forms a second part of the periphery of the track.

11. The track claimed in claim 1, wherein the second elastomeric material forms at least part of the ground-engaging outer surface.

12. The track claimed in claim 1, wherein the second elastomeric material forms at least part of a peripheral surface of each of the traction projections.

13. The track claimed in claim 1, wherein the second elastomeric material forms at least part of the inner side.

14. The track claimed in claim 1, wherein a concentration of the reinforcing particles measured in Parts per Hundred Rubber is at least 1 PHR.

15. The track claimed in claim 1, wherein a concentration of the reinforcing particles measured in Parts per Hundred Rubber is at least 5 PHR.

16. The track claimed in claim 1, wherein a concentration of the reinforcing particles measured in Parts per Hundred Rubber is at least 10 PHR.

17. The track claimed in claim 1, wherein a concentration of the reinforcing particles measured in Parts per Hundred Rubber is no more than 1 PHR.

18. The track claimed in claim 1, wherein a concentration of the reinforcing particles measured in Parts per Hundred Rubber is no more than 5 PHR.

19. The track claimed in claim 1, wherein a concentration of the reinforcing particles measured in Parts per Hundred Rubber is no more than 10 PHR.

20. The track claimed in claim 1, wherein the track is configured to generate less noise than if the second elastomeric material was omitted.

21. The track claimed in claim 1, wherein a noise level generated by the track at a given speed is at least 2% less than that which would be generated if the second elastomeric material was omitted.

22. The track claimed in claim 1, wherein the reinforcing particles are polymeric reinforcing particles.

23. The track claimed in claim 22, wherein the polymeric reinforcing particles include ultra-high-molecular-weight polyethylene particles.

24. The track claimed in claim 1, wherein the reinforcing particles are non-elongated particles.

25. The track claimed in claim 1, wherein an average sphericity of the reinforcing particles is at least 0.5.

26. The track claimed in claim 1, wherein an average sphericity of the reinforcing particles is at least 0.7.

27. The track claimed in claim 1, wherein an average sphericity of the reinforcing particles is at least 0.9.

28. The track claimed in claim 1, wherein the elastomeric matrix includes rubber.

29. The track claimed in claim 1, wherein the elastomeric matrix includes a mixture of different rubber compounds.

30. The track claimed in claim 1, wherein the second elastomeric material is molded with the first elastomeric material.

31. The track claimed in claim 1, wherein the elastomeric matrix is a rubber matrix and the reinforcing particles are polymeric reinforcing particles that impart isotropic properties to the second elastomeric material.

32. The track claimed in claim 1, wherein the second elastomeric material comprises a layer of reinforcing material forming at least part of a peripheral surface of each of the traction projections and at least part of the ground-engaging outer surface.

33. The track claimed in claim 32, wherein a thickness of the layer of reinforcing material at the peripheral surface of each of the traction projections is different from a thickness of the layer of reinforcing material forming at least part of the ground-engaging outer surface.

34. The track claimed in claim 33, where a ratio of the thickness the layer of reinforcing material forming at least part of the peripheral surface of each of the traction projections over the thickness of the layer of reinforcing material forming at least part of the ground-engaging outer surface is at least 1.1.

35. The track claimed in claim 33, where a ratio of the thickness the layer of reinforcing material forming at least part of the peripheral surface of each of the traction projections over the thickness of the layer of reinforcing material forming at least part of the ground-engaging outer surface is at least 1.5.

36. The track claimed in claim 33, where a ratio of the thickness the layer of reinforcing material forming at least part of the peripheral surface of each of the traction projections over the thickness of the layer of reinforcing material forming at least part of the ground-engaging outer surface is at least 2.

37. The track claimed in claim 1, wherein the second elastomeric material comprises a layer of reinforcing material, and a concentration of the reinforcing particles in the layer of reinforcing material varies such that the concentration of the reinforcing particles in a first part of the layer of reinforcing material is higher than in a second part of the layer of reinforcing material.

38. The track claimed in claim 11, wherein the second elastomeric material forms at least part of a peripheral surface of each of the traction projections.

39. The track claimed in claim 38, wherein the second elastomeric material forms an entirety of the peripheral surface of each of the traction projections and an entirety of the ground-engaging outer surface.

40. The track claimed in claim 1, wherein an average aspect ratio of the reinforcing particles is no more than 8.

41. The track claimed in claim 1, wherein an average aspect ratio of the reinforcing particles is no more than 4.

42. The track claimed in claim 1, wherein an average aspect ratio of the reinforcing particles is no more than 2.

43. The track claimed in claim 1, wherein the track is a snowmobile track.

44. A track system for traction of a vehicle, the track system comprising the track claimed in claim 1.

45. A vehicle comprising the track claimed in claim 1.

46. The vehicle of claim 45, wherein the vehicle is a snowmobile.

47. A track for traction of a vehicle, the track being mountable about a plurality of wheels, the track being elastomeric to flex around the wheels, the track comprising a ground-engaging outer side and an inner side opposite to the ground-engaging outer side, the ground-engaging outer side comprising a ground-engaging outer surface and a plurality of traction projections projecting from the ground-engaging outer surface, the track comprising:
 a first elastomeric material; and
 a second elastomeric material adjacent to the first elastomeric material and including an elastomeric matrix and reinforcing particles embedded in the elastomeric matrix, the second elastomeric material forming at least part of the ground-engaging outer side.

48. A track for traction of a vehicle, the track being mountable about a plurality of wheels, the track being elastomeric to flex around the wheels, the track comprising a ground-engaging outer surface, an inner surface opposite to the ground-engaging outer surface, and a plurality of traction projections projecting from the ground-engaging outer surface, the track comprising:
 a first elastomeric material; and
 a second elastomeric material overlying the first elastomeric material, constituting at least part of a periphery of the track, and including an elastomeric matrix and reinforcing particles embedded in the elastomeric matrix, the second elastomeric material forming at least part of the ground-engaging outer surface.

* * * * *